(12) United States Patent
Ochi et al.

(10) Patent No.: US 7,996,238 B2
(45) Date of Patent: *Aug. 9, 2011

(54) POWER TRANSMITTING DEVICE, POWER RECEIVING DEVICE, AUTHENTICATION/BILLING PROXY DEVICE, ELECTRICAL CHARGING SYSTEM, POWER TRANSMITTING METHOD, POWER RECEIVING METHOD AND ELECTRICAL CHARGING METHOD

(75) Inventors: Daisuke Ochi, Munich (DE); Akira Kinno, Yokohama (JP); Hiroaki Hagino, Yokohama (JP); Naoki Hashida, Kawasaki (JP); Takashi Yoshikawa, Yokohama (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 329 days.

This patent is subject to a terminal disclaimer.

(21) Appl. No.: 12/252,807

(22) Filed: Oct. 16, 2008

(65) Prior Publication Data

US 2009/0106137 A1    Apr. 23, 2009

Related U.S. Application Data

(62) Division of application No. 11/454,195, filed on Jun. 16, 2006, now Pat. No. 7,761,307.

(30) Foreign Application Priority Data

Jun. 17, 2005 (JP) .................................. 2005-178299

(51) Int. Cl.
*G06Q 10/00* (2006.01)

(52) U.S. Cl. ...................................................... 705/1.1

(58) Field of Classification Search .................. 705/1.1, 705/400, 26.1, 35; 320/108; 307/104; 336/180; 363/21.02
See application file for complete search history.

(56) References Cited

U.S. PATENT DOCUMENTS 5,744,933 A * 4/1998 Inoue et al. ........................................................ 320/110
2005/0127868 A1 6/2005 Calhoon et al.

FOREIGN PATENT DOCUMENTS

EP        0 773 519 A2 *    5/1997
(Continued)

OTHER PUBLICATIONS

"The Seventh Exhibition of Built-in System Developing Techniques", -online-, searched Apr. 12, 2005. Six (6) pages, including partial translation.

*Primary Examiner* — Igor Borissov
(74) *Attorney, Agent, or Firm* — Crowell & Moring LLP

(57) ABSTRACT

An electrical charging system and method is disclosed. A power transmitting device is configured to charge a power source of a portable electronic device in non-contact processing including a predetermined power providing policy including at least one of a fee setting, a billing system setting, an electrical charging system setting, a charging determination setting, and a security setting. The power transmitting device is configured to charge the power source in a non-contact processing operation of at least one of an admission operation and a payment operation with the portable electronic device and processing including at least one of the predetermined power providing policy and a predetermined power receiving policy of the portable electronic device. The admission operation is an operation other than an authorization for the power transmitting device to charge the power source. An authentication/billing proxy device executes billing according to an amount of charging the chargeable power source.

4 Claims, 36 Drawing Sheets

FOREIGN PATENT DOCUMENTS

| | | |
|---|---|---|
| JP | 11-122832 | 4/1999 |
| JP | 2004-222457 A | 8/2004 |
| JP | 2004-320308 A | 11/2004 |
| JP | 2005-110421 A | 4/2005 |
| JP | 2005-143181 A | 6/2005 |
| WO | WO 02/15320 A1 | 2/2002 |
| WO | WO 2004/027955 A2 | 4/2004 |
| WO | WO 2005/001739 A2 | 1/2005 |

\* cited by examiner

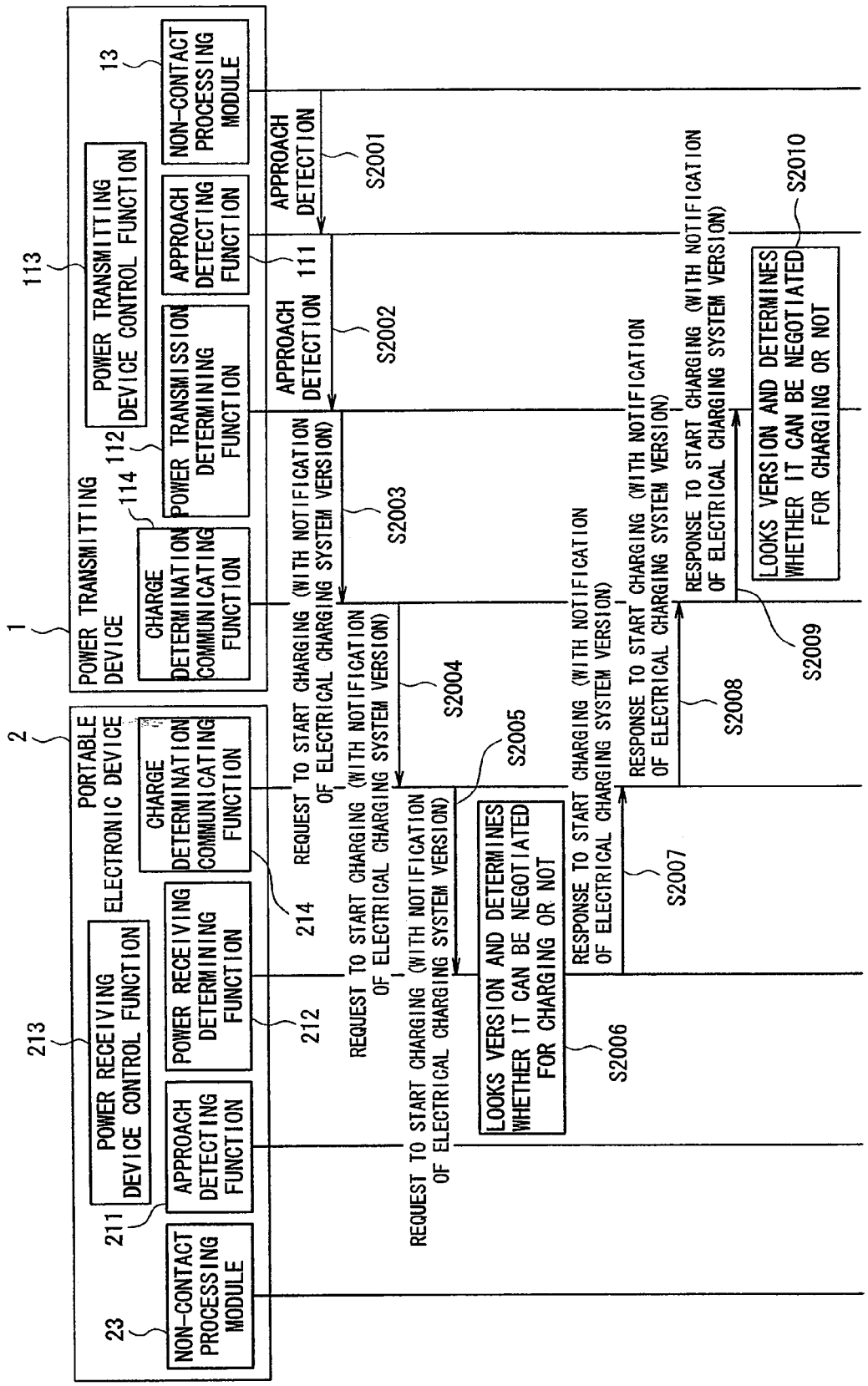

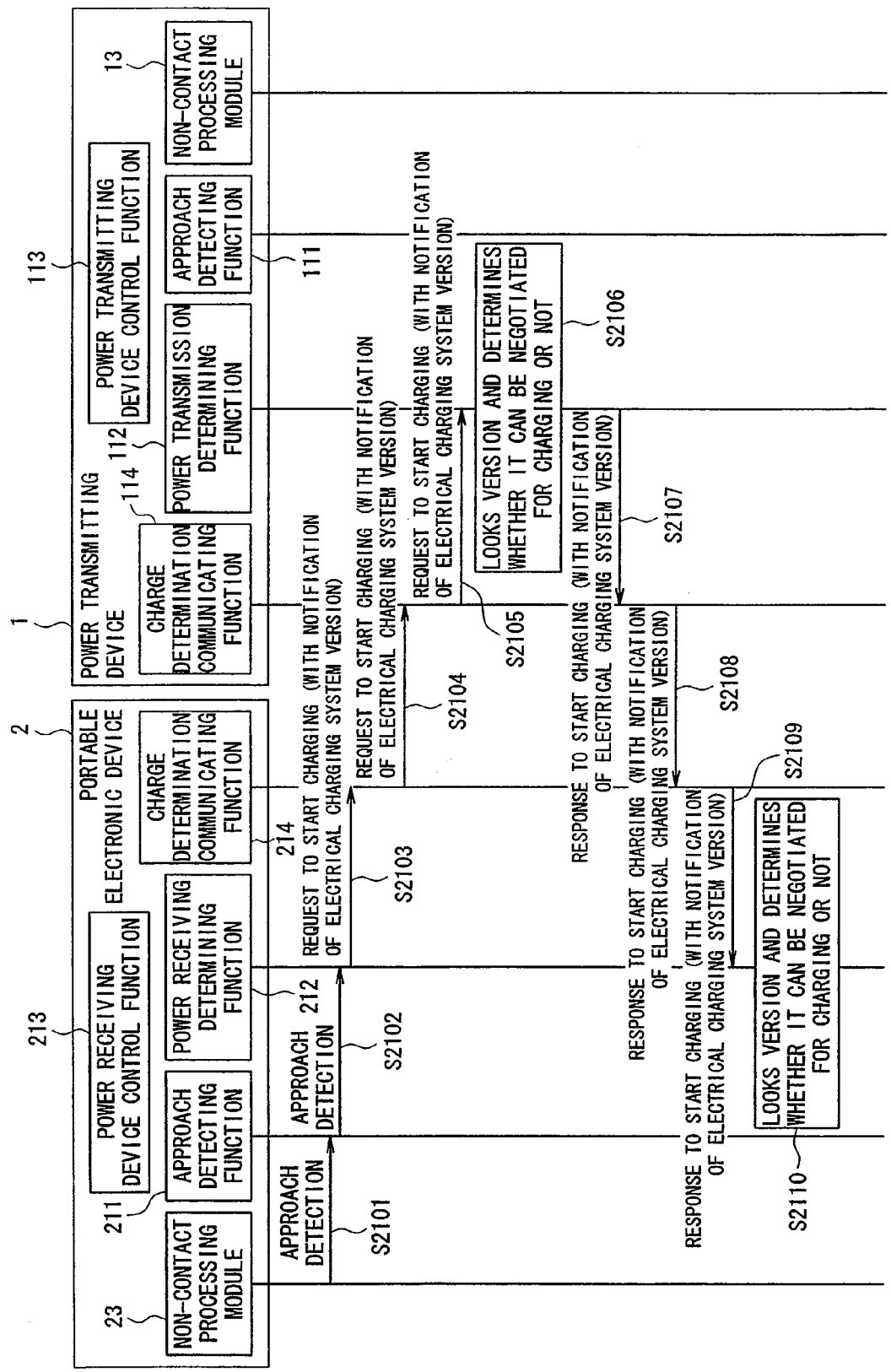

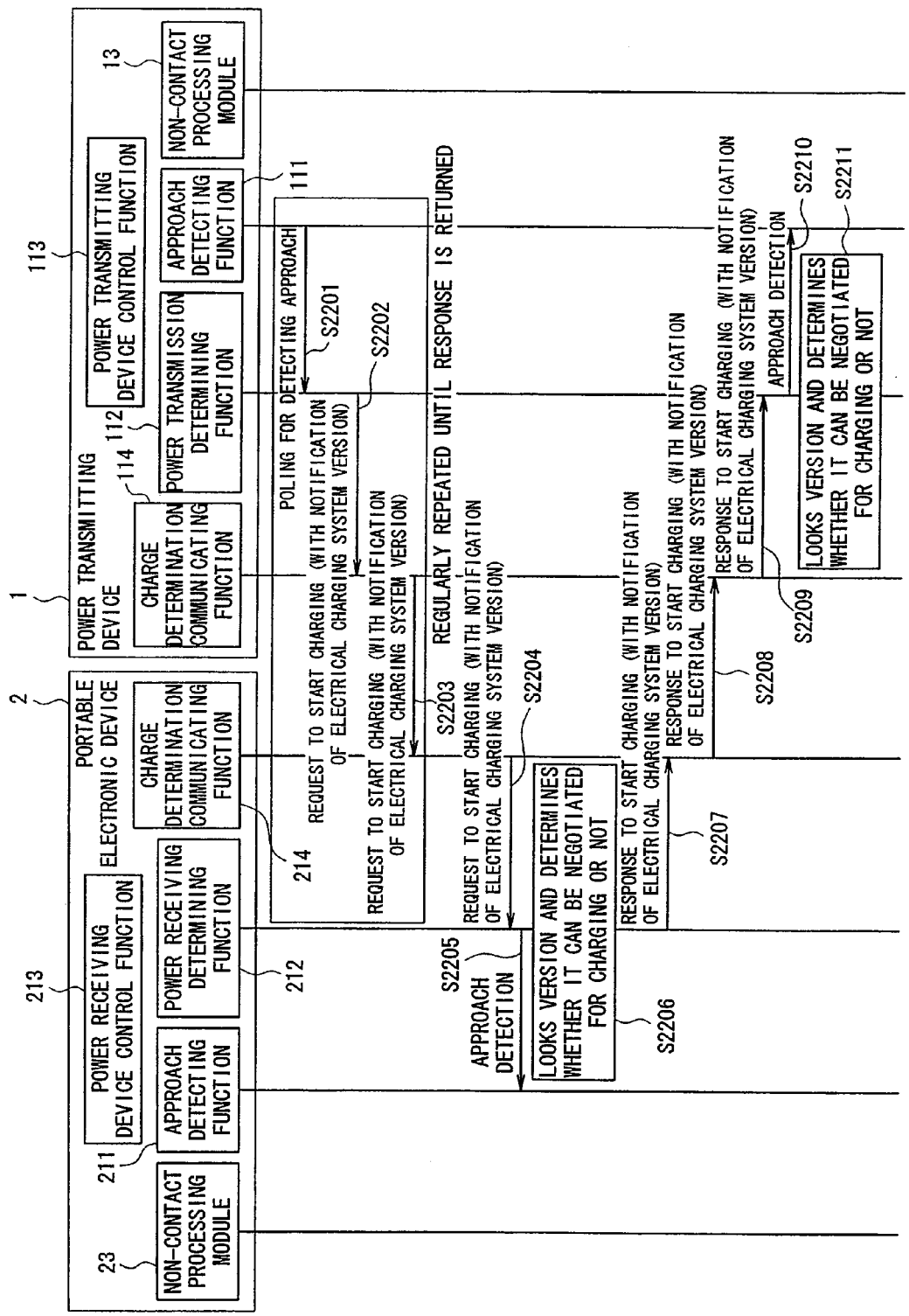

POWER TRANSMITTING DEVICE, POWER RECEIVING DEVICE, AUTHENTICATION/BILLING PROXY DEVICE, ELECTRICAL CHARGING SYSTEM, POWER TRANSMITTING METHOD, POWER RECEIVING METHOD AND ELECTRICAL CHARGING METHOD

BACKGROUND OF THE INVENTION

1. Field of the Invention

The present invention relates to a power transmitting device, a power receiving device, an authentication/billing proxy device, an electrical charging system and an electrical charging method, more specifically to a power transmitting device, a power receiving device, an authentication/billing proxy device, an electrical charging system, a power transmitting method, a power receiving method and an electrical charging method which are used in charging a battery provided for a portable electronic device such as a cellular phone, a notebook PC (Personal Computer) and a PDA (Personal Digital Assistant).

2. Description of the Related Art

Non-contact power transmitting techniques, non-contact processing techniques and high-speed bulk electricity storage techniques have been known. For example, as a non-contact power transmitting technique, a non-contact power transmitting module is known (for example, see "the seventh exhibition of built-in system developing techniques", [online], [searched on Apr. 12, 2005], the Internet <URL: http://k-tai.impress.co.jp/cda/article/event/19610.html>). The module is for supplying power via a non-contact by using a slight electric wave generated by electromagnetic induction of a coil.

As a non-contact processing technique, a technique of a kind of IC cards represented by FeliCa (registered trademark) form SONY (registered trademark) Inc. As a high-speed bulk electricity storage technique, an electric double layer capacitor technique which can rapidly charge by bulk power developed by Japan Electron Optics Laboratory Co., Ltd. or the like. The techniques are advancing day by day.

As a technique with regard to an electrical charging system, a system which is a combination of a charging device and a billing system for prompting a user to charge a portable electronic device in response to a lowered electronic amount of a battery of the portable electronic device, letting the user charge the portable electronic device at a convenience store or the like and billing for the electricity as disclosed in JP2004-222457A (hereinafter referred to as Patent Document 1) is proposed.

The electrical charging system mentioned above also has problems below:

(Problem 1)

In the conventional electrical charging systems mentioned above, a user needs to be attentive to charging a portable electronic device. The problem to be solved by the present invention is to provide a using environment of a portable electronic device more natural and suitable to living of a user in which a user has a fewer loads to be attentive to charging.

The object of the present invention is to provide a power transmitting device, a power receiving device, an authentication/billing proxy device, an electrical charging method, a power transmitting method, a power receiving method and an electrical charging method which enable a user to charge a device without being attentive to charging the device by realizing the charging of the device in non-contact processing operation for the purpose other than charging.

(Problem 2)

In the conventional electrical charging system mentioned above, neither an authenticated electrical charging method/system nor a billing method/system is present when a charging time for the portable electronic device is short (about one to three seconds). Although Patent Document 1 discloses a basic authenticated electrical charging method and billing method, a charging time cannot be reserved enough in non-contact processing operation time for the purpose other than charging as charging starts after authentication at a server which is at a remote site with much load so that communication and processing take much time.

Another object of the present invention is to provide a power transmitting device, a power receiving device, an authentication/billing proxy device, an electrical charging system, a power transmitting method, a power receiving method, and an electrical charging method which can reserve much more charging time in a short time of non-contact processing operation by reducing a charging determination processing, precedence charging before charging determination, and reducing an authentication processing.

SUMMARY OF THE INVENTION

The power transmitting device in accordance with an embodiment of the present invention comprises: detecting means for detecting an approach of a power receiving device with a chargeable power source; and charging control means for transmitting power for charging said power source, in response to detecting the approach of said power receiving device by said detecting means; wherein said device charges said power source in non-contact processing for the purpose other than charging.

By adapting a power transmitting device like that, charging of a power receiving device can be realized while in non-contact processing operation for the purpose other than charging such as authentication or making a payment. By using a non-contact power transmitting technique and a high-speed bulk electricity storage technique, charging can be rapidly executed bit by bit in a short time of a non-contact processing operation about one to three seconds. That can reduce a load to a user to be attentive to charging.

In an embodiment of the power transmitting device, said charging control means transmits power for charging said power source according to a result of referring to a predetermined power providing policy. That configuration enables charging to be executed according to a power providing policy. For example, an exclusive power providing policy such as "cellular phones manufactured by company A can be charged up to three minutes, and cellular phones manufactured by the other companies can be charged up to 0.5 seconds" can be set. Charging can be executed according to the policy.

In an embodiment of the power transmitting device, said charging control means transmits power for charging said power source according to a history of the power providing policy referred to when power was transmitted before. By administrating a result of matching policy version information or the like with the previous policy, the device can reduce a time for notifying or matching policies after the first time and reserve a longer charging time.

The power receiving device in accordance with an embodiment of the present invention is a power receiving device with a chargeable power source comprising: detecting means for detecting an approach to a power transmitting device; and charging means for receiving power transmitted from the power transmitting device that detected by said detecting means and charging said power source, wherein said device charges said power source in non-contact processing for the purpose other than charging. The power receiving device corresponds to a portable electronic device in FIGS. 1, 9, and 33, for example.

By configuring a power receiving device like that, the power receiving device can be charged in non-contact processing operation for the purpose other than charging such as authentication, making a payment or the like. By using a non-contact power transmitting technique and a high-speed bulk electricity storage technique, charging can be rapidly executed bit by bit in a short time of non-contact processing operation about one to three seconds. That can reduce a load to a user to be attentive to charging.

In an embodiment of the power receiving device, said charging means charges said power source according to a result of referring to a predetermined power receiving policy. That configuration enables charging according to a power receiving policy. For example, an exclusive power receiving policy such as "can be charged only if it is free of charge" can be set and charging can be executed according to the policy.

In an embodiment of the power receiving device, said charging means charges said power source according to a history of the power receiving policy referred to when power was transmitted before. By administrating a policy version information and a result of matching with the previous policy, the device can reduce a time for notifying or matching policies after the first time and reserve a longer charging time.

In an embodiment of the power receiving device, the device further comprises authenticating means for causing another device to execute authentication of a user of the power receiving device, wherein said charging means charges said power source when said another device authenticates the user. That enables charging of a power receiving device of an identified user.

In an embodiment of the power receiving device, said authenticating means issues authentication information to eliminate the next authentication if the authentication normally ends, and executes rapid authentication which is processing for executing authentication by using the authentication information. That configuration can reduce a time for executing authentication.

In an embodiment of the power receiving device, the device further comprises billing means for executing billing according to the amount of said charging when said authenticating means normally authenticated the user. That can bill for the charging.

In an embodiment of the power receiving device, said device makes a payment for the bill by said billing means by using electronic money corresponding to said device. That enables fee for the charging to be paid by using electronic money.

The authentication/billing proxy device in an embodiment of the present invention comprises authenticating means for executing authentication by exchanging data with a power receiving device having a chargeable power source for a user of the power receiving device; wherein said authenticating means issues authentication information to eliminate the next authentication when the authentication normally ends, and executes rapid authentication which is authentication by using the authentication information. That configuration can reduce a time for authentication.

In an embodiment of the authentication/billing proxy device, the device further comprises billing means for executing billing according to the amount of charging said power source when said authenticating means authenticated the user. By using such an authentication/billing proxy device, a fee can be collected as a proxy of the power transmitting device, i.e., a proxy of the electrical power supplier.

The authentication/billing proxy device in an embodiment of the present invention comprises authenticating means for executing authentication by exchanging data with a power receiving device having a chargeable power source for a user of the power receiving device; and billing means for executing billing according to the amount of charging said power source when said authenticating means authenticated the user. That configuration enables a fee for the authenticated user to be collected as a proxy of the power transmitting device, i.e., a proxy of the electrical power supplier.

In an embodiment of the authentication/billing proxy device, said billing means executes billing according to at least one of the settings of the number of charging, a charging time, and a fixed amount of money without regard for an amount of charging, instead of executing billing according to the amount of charging said power source. That enables a fee to be collected based on various settings without regard for an actual amount of charging.

In an embodiment of the authentication/billing proxy device, said billing means executes billing according to one of the amount of charging that is notified from said power receiving device and the amount of charging that is notified from the device that transmitted power to said power source. That enables a fee to be collected according to a notified amount of transmitted power.

The electrical charging system in an embodiment of the present invention comprises a power transmitting device comprising: detecting means for detecting an approach of a power receiving device with a chargeable power source; and charging control means for transmitting power for charging said power source, in response to detecting the approach of said power receiving device by said detecting means; and an authentication/billing proxy device comprising: billing means for executing billing according to the amount of charging a chargeable power source provided for said receiving device. By configuring the electrical charging system like that, charging can be executed in non-contact processing operation for the purpose other than charging such as authentication, making a payment or the like. By using a non-contact power transmitting technique and a high-speed bulk electricity storage technique, a charging can be rapidly executed bit by bit in short time of non-contact processing operation about one to three seconds. That can reduce a load to a user to be attentive to charging.

The power transmitting method in an embodiment of the present invention comprises a detecting step of detecting an approach of a power receiving device with a chargeable power source; and a charging control step of transmitting power for charging said power source, in response to detecting the approach of said power receiving device at said detecting step; wherein charging of said power source is executed in non-contact processing for the purpose other than charging. That can realize charging a power receiving device while in non-contact processing operation for the purpose other than charging such as authentication, making a payment or the like. By using a non-contact power transmitting technique and a high-speed bulk electricity storage technique, charging can be rapidly executed bit by bit in a short time of non-contact processing operation about one to three seconds. That can reduce a load to a user to be attentive to charging.

The power receiving method in an embodiment of the present invention is a power receiving method for charging a chargeable power source comprising a detecting step of detecting an approach to a power transmitting device; and a charging step of receiving power transmitted from the power transmitting device that is detected at said detecting step and charging said power source, wherein said power source is charged in non-contact processing for the purpose other than charging. That can realize charging of a power receiving device while in non-contact processing operation for the purpose other than charging such as authentication, making a payment or the like. By using a non-contact power transmitting technique and a high-speed bulk electricity storage technique, charging can be rapidly executed bit by bit in a short time of non-contact processing operation about one to three seconds. That can reduce a load to a user to be attentive to charging.

The electrical charging method in an embodiment of the present invention comprises a detecting step of detecting an approach of a power receiving device with a chargeable power source; a charging control step of transmitting power for charging said power source, in response to detecting the approach of said power receiving device at said detecting step; and a billing step of executing billing according to the amount of charging of said power source; wherein said power source is charged in non-contact processing for the purpose other than charging. That can realize charging while in non-contact processing operation for the purpose other than charging such as authentication, making a payment or the like. By using a non-contact power transmitting technique and a high-speed bulk electricity storage technique, charging can be rapidly executed bit by bit in a short time of non-contact processing operation about one to three seconds. That can reduce a load to a user to be attentive to charging the device.

The present invention can reduce a load to a user to be attentive to charging by executing rapid charging in a non-contact processing operation for the purpose other than charging, while a portable electronic device in the prior art requires a user to be attentive to charging (first electrical charging system to be described later).

By using charging policies of a user of an portable electronic device and an electrical power provider in determining electric charging, detailed fee settings and security settings can be done and charging can be executed in a flexible way without requiring a user to explicitly grant charging successively (second electrical charging system to be described later). With the charging policies, new business models such as advertisement distribution during charging can be established.

With omitting transmitting and matching of policies by matching policy version (third electrical charging system to be described later), precedence charging before authentication (fourth electrical charging system to be described later), or rapid authentication by using rapid authentication key information (fifth electrical charging system to be described later), a longer charging time can be reserved in a short time of non-contact processing operation about one to three seconds.

The abovementioned systems can provide an environment for a user to use a portable electronic device more natural and suitable to living with fewer loads to the user to be attentive to charging the device. By using the authentication/billing proxy device, the present invention enables a new business such as electric sales by the third party to be developed without increasing a load of bill to a user.

BRIEF DESCRIPTION OF THE DRAWINGS

FIG. 4 is a sequence diagram showing processing where a power transmitting device detects an approach of a portable electronic device and works with a non-contact processing module;

FIG. 5 is a sequence diagram showing processing where a portable electronic device detects an approach of the power transmitting device and works with a non-contact processing module;

FIG. 6 is a sequence diagram showing processing where a power transmitting device detects an approach of a portable electronic device without working with a non-contact processing module;

DETAILED DESCRIPTION OF THE PREFERRED EMBODIMENTS

Figure 1:
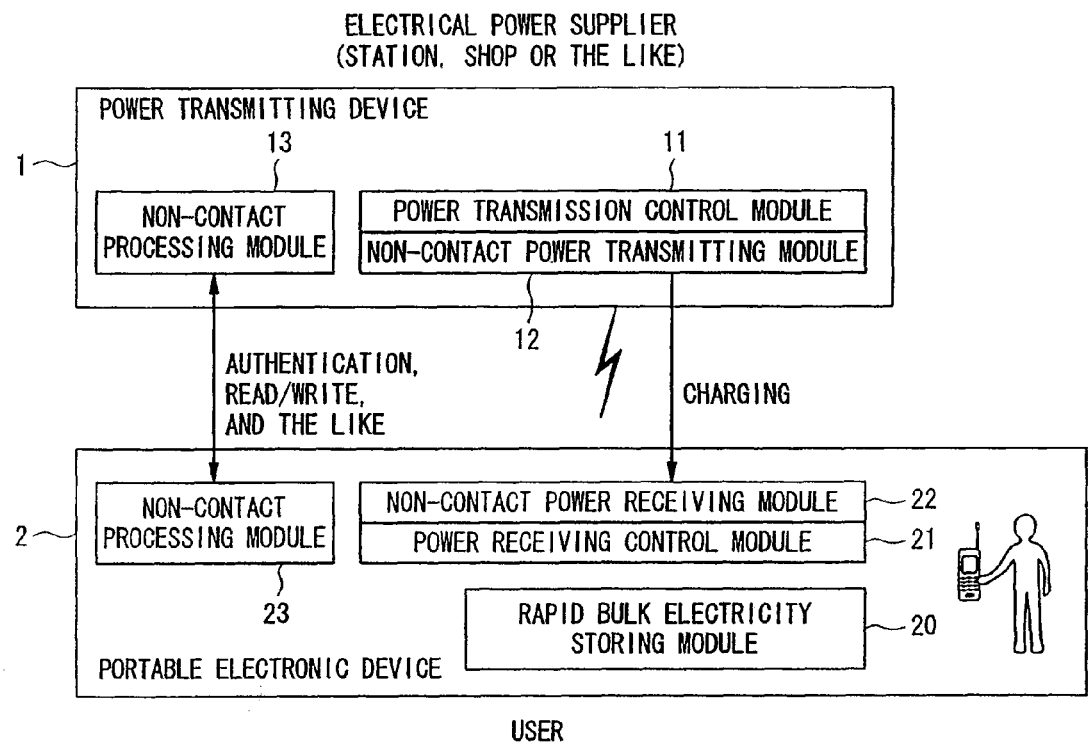
FIG. 1 is a block diagram showing an exemplary configuration of the first electrical charging system that adopts an electrical charging system according to the present invention.

Embodiments of the present invention will be described with reference to the drawings. The same reference numerals denote the equivalent parts in each drawing in the description below to those in the other drawings.

In the present invention, a portable electronic device is charged in operation for authentication in a non-contact manner. That is, the present invention charges a power source when it operates authentication or the like in a non-contact manner by making a portable electronic device driven by a chargeable power source approach to the side of an authentication device.
(Overview of Electrical Charging System)

An overview of an electrical charging system which can be realized by the present invention will be described below, followed by description of an embodiment for realizing each system.
(First Electrical Charging System: Basic)

In order to solve the abovementioned problem 1, the first electrical charging system realizes charging while in non-contact processing operation for the purpose other than charging such as authentication, making a payment or the like. By using a non-contact power transmitting technique and a high-speed bulk electricity storage technique, charging can be rapidly executed bit by bit in a short time of non-contact processing operation about one to three seconds. That can reduce a load to a user to be attentive to charging.

Trial calculation of the abovementioned operation by using a current technique is as below. That is, if charging of one to three seconds is repeated for fifteen to twenty-five times in a day, electricity consumed by a portable electronic device for a day can be compensated. If a portable electronic device is used as a key of a house or a car, as an admission card, a ticket, or for money payment, about twenty times of non-contact processing operation can be expected for a day.

Specifically, the first electrical charging system is an electrical charging system of a portable electronic device which can execute non-contact processing, including a portable electronic device including a non-contact charging module, a non-contact processing module, a rapid bulk electricity storing module, further including a power receiving control module consisting of a charge determination communicating function, a power receiving determining function, a power receiving control function, an approach detecting function and the like; and a power transmitting device including a non-contact charging module and a non-contact processing module as opposed to the abovementioned modules, further including a power transmission control module consisting of a charge determination communicating function, a power transmission determining function, a power transmission control function, an approach detecting function and the like. The approach detecting function needs not to be included in both of the portable electronic device and the power transmitting device, and may be included in either of them. The approach detecting function may detect an approaching state in conjunction with a non-contact processing module.

The first electrical charging system includes processing for executing rapid charging in non-contact processing operation between a portable electronic device and a power transmitting device.

Specifically, an approach detecting function of a portable electronic device or a power transmitting device detects an approach of the portable electronic device and the power transmitting device, each of the portable electronic device and the power transmitting device checks each other that the counterpart includes an electrical charging system of the present invention, and then charging starts. When it is detected that the portable electronic device is separated from the power transmitting device or that the amount of charging reaches a certain amount, the charging ends.

The above configuration can solve the abovementioned problem 1.
(Second Electrical Charging System: Automatic Authentication, Charging and Billing by Using a Policy)

The second electrical charging system uses a portable electronic device including a power receiving control module of the portable electronic device in the abovementioned first electrical charging system with a user's policy added, and arbitrarily with user identification information, portable electronic device identification information, and authentication information for certifying their validity (electronic signature, PIN (Personal Identity Number) code or the like), attribute information of a user and a portable electronic device (manufacturer or telecommunications carrier) and an authentication/billing proxy device communicating function.

The second electrical charging system uses a power transmitting device including a power transmission control module of the power transmitting device in the above-mentioned first electrical charging system, as opposed to the power receiving control module, with an electrical power supplier side policy added, and arbitrarily with electrical power provider identification information, power transmitting device identification information, authentication information for certifying their validity, attribute information of the electrical power supplier and the power transmitting device, and an authentication/billing proxy device communicating function. If required, the second electrical charging system includes an authentication/billing proxy device including a portable electronic device authentication function, an authentication record saving function, and a function of communicating with a power transmitting device, arbitrarily including a power transmitting device authentication function, a function of communicating with a portable electronic device and a billing function.

The user's policy describes a condition for a device to be charged when a user automatically charges a portable electronic device. Similarly, the electrical power supplier side policy describes a condition for a device to transmit power when an electrical power supplier automatically provides power for a portable electronic device.

As the portable electronic device includes a user side charging policy and the power transmitting device includes an electrical power supplier side power transmitting policy in the second electrical charging system, the system can check both of the devices and matches both of the policies so that the device can be charged without successively obtaining explicit grant for charging from the user and the electrical power supplier. An electrical charging system can arbitrarily include the above-mentioned user identification information, portable electronic device identification information, attribute information of a user and a portable provider, as well as electrical power supplier identification information, power transmitting device identification information, attribute information of an electrical power supplier and a power transmitting device. The user's policy and the electrical power supplier side policy can describe a policy by arbitrarily using the information above. For example, the user's policy can exclusively describe "can be charged only if it is free of charge", while the electrical power supplier side policy can exclusively describe "free of charge for a cellular phone from company A, and 1 yen/second for cellular phones from the other companies".

The user's policy can describe a fee setting, a billing system setting, an electrical charging system setting, a charging determination setting, a security setting and the like. Similarly, the electrical power provider side policy can describe a fee setting, a billing system setting, an electrical charging system setting, an electrical charging system setting, a charging determination setting, a security setting and the like. The user's policy and the electrical power supplier side policy will be described in detail with reference to embodiments later.

Further in the second electrical charging system, the power transmitting device can arbitrarily use the authentication/billing proxy device to determine validity of the user or the portable electronic device and request a proxy billing. Similarly, the portable electronic device can arbitrarily use the authentication/billing proxy device to determine validity of the electrical power supplier or the power transmitting device. The authentication/billing proxy device administrates information for assuring validity including an electronic signature or a PIN code of a portable electronic device or a power transmitting device and administrates billing information or charging history information of each device. Then, each time the system is required from each of the devices, it authenticates the device's validity or bills the device.

The second electrical charging system may need to authorize a user or a portable electronic device, and an electrical power supplier or a power transmitting device and checks validity when the system matches a user's policy and an electrical power supplier side policy and determines about charging. The cases may be that the system authenticates a user or a portable electronic device, that the system authenticates an electrical power supplier or a power transmitting device, or that the system authenticates both of the above-mentioned ones. Although proxy authentication at the above-mentioned authentication/billing proxy device is one of the methods, closed authentication between a portable electronic device and a power transmitting device may be taken without using the authentication/billing proxy device when a power transmitting device has an authentication function of the authentication/billing proxy device if only a combination of a portable electronic device and a power transmitting device is fixed.

The second electrical charging system divides a phase of charging determination into two: One is a primary charging determination for matching a user's policy and an electrical power provider side policy. Another is called a secondary charging determination, which is a phase for executing processing which cannot be determined only by matching policies such as executing authentication after the primary charging determination is succeeded.

With the second electrical charging system, automatic authentication, charging and billing according to policies can be executed without requiring to be explicitly granted for a user or an electrical power supplier.

(Third Electrical Charging System: Policy Notification and Matching can be Omitted)

In the third electrical charging system, in order to solve the abovementioned problem 2, the power transmission control module of the power transmitting device and the power receiving control module of the portable electronic device in the second electrical charging system includes a function for administrating identification information on a user and an electrical power supplier at past charging as authentication history information, version information of respective policies, and a previous matching result of policies, as well as a charging determination procedure which is improved to make a time for notifying or matching policies after the first time can be shortened. That is called the third electrical charging system.

The third electrical charging system is a system for reserving much more charging time in a short time of non-contact processing operation about one to three seconds.

A portable electronic device and a power transmitting device keep version information of a user's policy and an electrical power supplier side policy at past charging and a result of matching them as authentication information. When the devices determine charging, they exchange policy versions, checks the versions, and if the versions are the same, they refer to a result of their past policy matching and determines charging by omitting matching process of the policies.

The third electrical charging system can omit the primary charging determination of two-steps in charging determination in the second electrical charging system, but cannot omit the secondary charging determination.

As a time spent for notifying and matching policies can be shortened in the third electrical charging system, much time can be reserved for a charging time to solve the abovementioned problem 2.

(Fourth Electrical Charging System: Precedence Charging)

In order to solve the above mentioned problem 2, the fourth electrical charging system includes a charging determination procedure which is improved to enable precedence charging before authentication into the power receiving control module of the power transmitting device and the portable electronic device in the second and the third electrical charging system. That is called the fourth electrical charging system.

Similar to the third and the fifth electrical charging systems, the fourth electrical charging system is a system for reserving much more charging time in a short time of non-contact processing operation about one to three seconds. When an outside authentication/billing proxy device is used, communication is established with a remote site and processing advances under a heavy load. That causes a delay. In order to reserve much more charging time in one to three seconds under such circumstances, the number of authentication executed outside the system needs to be reduced or authentication needs not to be waited. The fourth electrical charging system is a system for eliminating waiting for authentication.

If authentication is needed for charging determination, the second electrical charging system starts charging after the secondary charging determination, while the fourth electrical charging system enables charging to be preferentially started after the primary charging determination by providing a setting to grant precedence charging in the electrical power supplier side policy. At the secondary charging determination thereafter, stricter authentication is executed in parallel with charging. That enables some policy to execute charging only by the primary charging determination, and much more charging time to be reserved.

That enables the maximum charging time of a portable electronic device to be reserved and solve the above-mentioned problem 2.

(Fifth Electrical Charging System: Authentication in the Authentication/Billing Proxy Device can be Omitted)

In order to solve the abovementioned problem 2, the fifth electrical charging system further includes a charging determination procedure which is improved to enable rapid authentication by including a function for administrating information of rapid authentication key information as authentication history information in a power receiving control module of a power transmitting device and a portable electronic device in each of the second, third, and fourth electrical charging systems. The rapid authentication key information assures that the devices having the rapid authentication key information are authenticated at the authentication/billing proxy device in a predetermined period of time. That is called the fifth electrical charging system. The fifth electrical charging system can coexist with the third and fourth electrical charging systems.

Similar to the third and fourth electrical charging systems, the fifth electrical charging system is a system for reserving much more charging time. In order to reserve much more charging time, the number of authentication executed outside the system needs to be reduced or authentication needs not to be waited. The fifth electrical charging system is a system for reducing the number of authentication outside the system.

A portable electronic device and a power transmitting device keep information of rapid authentication key information in authentication history information. If the same portable electronic device frequently executes non-contact processing on a fixed power transmitting device, an inquiry for authentication to an authentication/billing proxy device may be omitted and a time for authentication may be shortened.

Specifically, if an authentication/billing proxy device succeeds in authenticating a portable electronic device, the authentication/billing proxy device issues rapid authentication key information and delivers it to the portable electronic device and the power transmitting device to speed up the authentication thereafter. The authentication/billing proxy device issues the rapid authentication key information. The portable electronic device and the power transmitting device can control the usage of the rapid authentication key information by a security setting for their policies.

The rapid authentication key information is used at authentication after the first time. Here, each of the portable electronic device and the power transmitting device authenticates by checking whether the counterpart has desired rapid authentication key information or not without notifying the rapid authentication key information itself to the counterpart.

That enables the power transmitting device to rapidly execute authentication without requesting the authentication/billing proxy device for authentication so as to reserve the maximum of a charging time of the portable electronic device and solve the abovementioned problem 2.

Relationship between the abovementioned electrical charging systems is as below. That is, the first electrical charging system is a basic electrical charging system and the second electrical charging system is an advanced first electrical charging system. Further, the third, fourth and fifth systems are advanced second electrical charging systems. The third, fourth and fifth electrical charging systems can coexist with each other into a single system.

The embodiments of the present invention will be described below. Among a plurality of embodiments described below, a first embodiment is a simple embodiment provided with the first electrical charging system. A second embodiment is a complex embodiment provided with all the elements of the present invention. A third embodiment is an embodiment regarding charging between portable electronic devices. A fourth embodiment is an embodiment regarding the charging which is free of charge and a fifth embodiment is an embodiment regarding a fixed rate.

First Embodiment

Description of Electrical Charging System

FIG. 1 is a block diagram showing an exemplary configuration of the first electrical charging system that adopts an electrical charging system according to the present invention. In the figure, the system consists of a power transmitting device 1 that is provided for an electrical power provider side such as a railway station or a shop, and a portable electronic device 2 carried by a user. In the system, the portable electronic device 2 is charged by the power transmitting device 1.

The power transmitting device 1 consists of a non-contact processing module 13 such as FeliCa (registered trademark) reader, a non-contact power transmitting module 12 and a power transmission control module 11.

The portable electronic device 2 consists of a non-contact processing module 23 for non-contact processing operation such as FeliCa (registered trademark), a non-contact power receiving module 22 for charging, a power receiving control module 21 for determining and controlling charging, and a bulk electricity storing module 20 which can rapidly charge.

(Description of a Power Transmission Control Module and a Power Receiving Control Module)

The power transmission control module 11 in the power transmitting device 1 and the power receiving control module 21 in the portable electronic device 2 are modules which simply check whether the counterpart has the first electrical charging system or not and execute charging.

Figure 2:
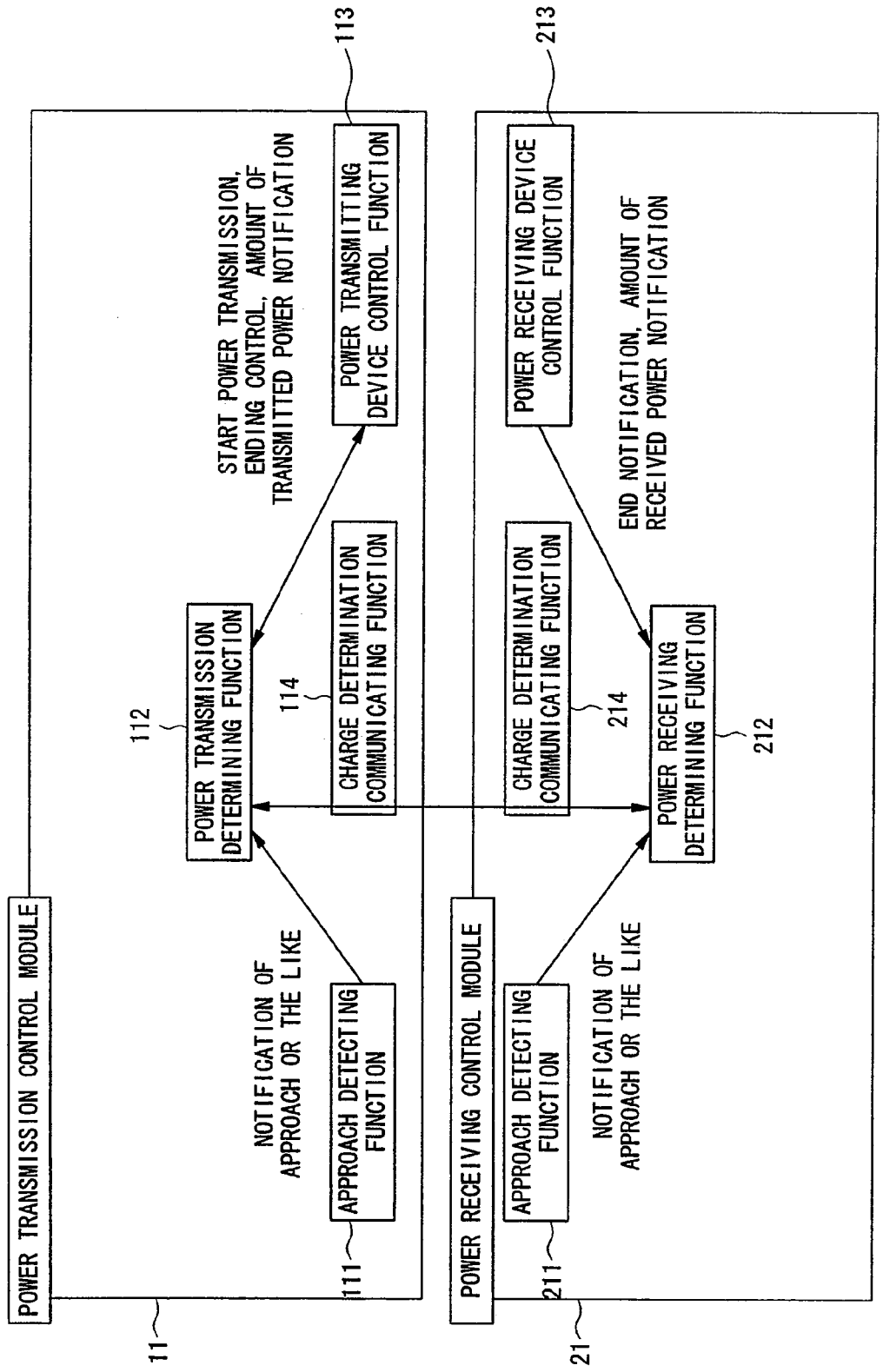
FIG. 2 is a block diagram showing components of each of the power transmission control module and the power receiving control module in FIG. 1.

FIG. 2 is a block diagram showing components of each of the power transmission control module 11 and the power receiving control module 21 in FIG. 1.

The power receiving control module 21 at the side of the portable electronic device 2 consists of an approach detecting function 211 for detecting an approach of an external device, a power receiving determining function 212, a charge determination communicating function 214, and a power receiving control function 213. The power receiving determining function 212 is a function of checking whether the approaching power transmitting device has the first electrical charging system or not. Actual communication with the power transmitting device is executed via the charge determination communicating function 214, and actual power receiving is executed via the power receiving device control function 213.

The power transmission control module 11 at the side of power transmitting device 1 consists of an approach detecting function 111 for detecting an approach of an external device, a power transmission determining function 112, a power transmitting device control function 113, and a charge determination communicating function 114. The power transmission determining function 112 is a function for checking whether the approaching portable electronic device has the first electrical charging system or not. Actual communication with a portable electronic device is executed via the charge determination communicating function 114, and actual power transmission is executed via the power transmission control function 113.

(Charging Flow)

Figure 3B:
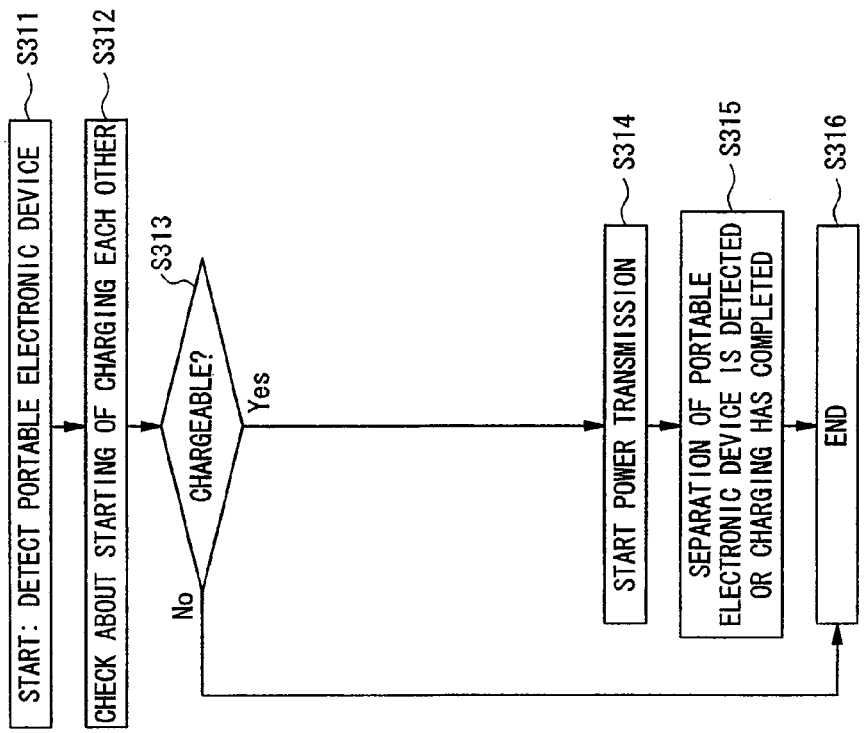
FIGS. 3A and 3B are flowcharts showing processing of the first electrical charging system with FIG. 3A showing processing at the side of the portable electronic device and FIG. 3B showing processing at the side of the power transmitting device.
Figure 3A:
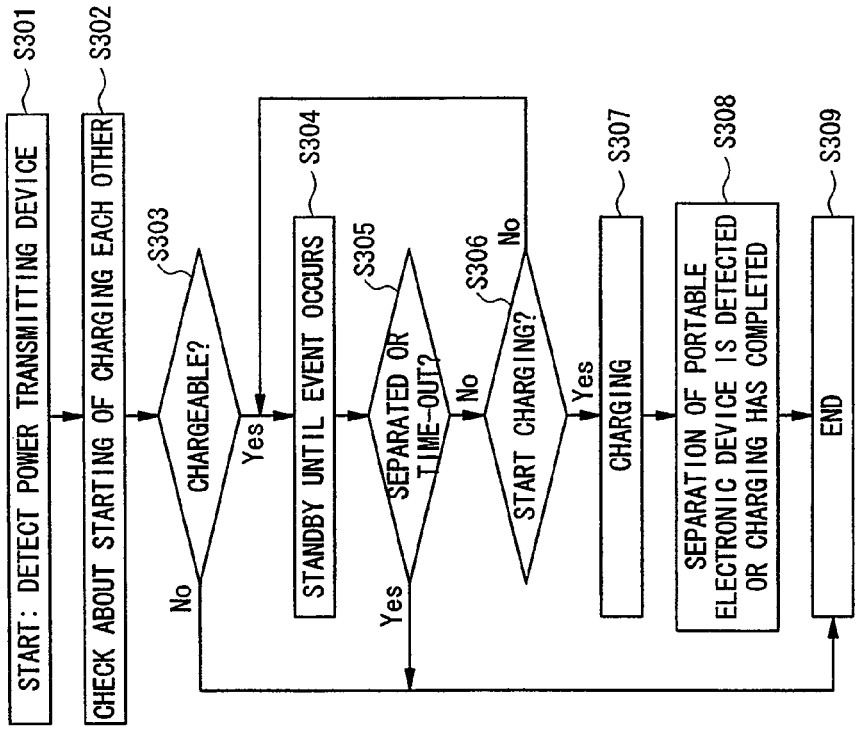

FIGS. 3A and 3B are flowcharts showing processing of the first electrical charging system with FIG. 3A showing processing at the side of the portable electronic device and FIG. 3B showing processing at the side of the power transmitting device.

In FIG. 3A, processing at the side of the portable electronic device starts when the power transmitting device is detected (step S301). First, it checks about starting of the charging with a power transmitting device (step S302). If it is determined as chargeable (step S303), it goes through a standby state until an event occurs (step S304) and determines whether the devices are separated from each other or not or whether a predetermined time has passed and time-out occurs or not (step S305) Thereafter, it enters into a standby state until charging starts (step S306→S304→S305).

If it is determined that the charging starts, the charging is executed (step S307). The charging is executed until separation of the portable electronic device from the power transmitting device is detected or until the charging has completed (step S308). The processing ends here (step S309).

If it is determined as not chargeable at step S303, the processing ends there as it is (step S303→S309). It is the same when the devices are separated from each other or when time-out occurs at step S305 (step S303→S309).

On the other hand, in FIG. 3B, processing at the side of the power transmitting device starts if a portable electronic device is detected (step S311). First, it checks about starting of the charging with a portable electronic device (step S312). If it is determined as chargeable (step S313), power transmission starts (step S314). The power transmission is executed until separation of the portable electronic device from the power transmitting device is detected or until the charging has completed (step S315). The processing ends here (step S316).

If it is determined as not chargeable at step S313, the processing ends there as it is (step S313→S316).

In the system, charging is triggered by a plurality of events. For example, the events include a case where a power transmitting device regularly sends a beacon and a portable electronic device sends out a request to start charging in response to the beacon, or a case where that a power transmitting device and a portable electronic device started non-contact processing such as FeliCa (registered trademark) is detected and the portable electronic device sends out a request to start charging. To the contrary, the power transmitting device may send a request to start charging to the portable electronic device. In either case, both the portable electronic device and the power transmitting device check whether the counterparts have the first electrical charging system or not and check the start of charging as mentioned above (the above steps S302, S312).

If start of charging is checked, the power transmitting device starts power transmission as mentioned above (the above step S313), and the portable electronic device starts charging (the above step S307). If it is not checked, it is determined that the power transmitting device or the portable electronic device does not have the first electrical charging system and the charging stops (the above steps S303→S309, steps S313→S316).

Then, if separation of the portable electronic device is detected or a certain amount of charging is reached, the charging ends (the above steps S308, S315).

In the abovementioned manner, a portable electronic device can be charged in the non-contact processing operation between the portable electronic device and a power transmitting device.

(Detecting of a Trigger to Start Charging)

Next, a method for detecting a trigger to start charging will be described with reference to FIG. 4 to FIG. 6. The figures show operation of each of the non-contact processing module 13, the approach detecting function 111, the power transmission determining function 112, and the charge determination communicating function 114 in the power transmitting device 1, and operation of each of the non-contact processing module 23, the approach detecting function 211, the power receiving determining function 212 and the charge determination communicating function 214 in the portable electronic device 2.

FIG. 4 is a sequence diagram showing processing where a power transmitting device detects an approach of a portable electronic device and works with a non-contact processing module. In the figure, when the non-contact processing module 13 detects the approach, an approach detecting signal is inputted into the power transmission determining function 112 via the approach detecting function 111 (S2001, S2002). The power transmission determining function 112 outputs a request to start charging including notification of the electrical charging system version (S2003). The request to start charging is sent to the power receiving determining function 212 via the charge determination communicating function 114 and the charge determination communicating function 214 (S2004, S2005). The power receiving determining function 212 looks a version of the electrical charging system included in the received request to start charging and determines whether it can be negotiated for charging or not (S2006).

Then, the power receiving determining function 212 outputs a response to start charging, which includes notification of the electrical charging system version (S2007) The response to start charging is sent to the power transmission determining function 112 via the charge determination communicating function 214 and the charge determination communicating function 114 (S2008 and S2009). The power receiving determining function 112 looks a version of the electrical charging system included in the received response to start charging and determines whether it can be negotiated for charging or not (S2010).

FIG. 5 is a sequence diagram showing processing where a portable electronic device detects an approach of the power transmitting device and works with a non-contact processing module. In the figure, when the non-contact processing module 23 detects the approach, an approach detecting signal is inputted into the power receiving determining function 212 via the approach detecting function 211 (S2101, S2102). The power receiving determining function 212 outputs a request to start charging, which includes notification of the electrical charging system version (S2103). The request to start charging is sent to the power receiving determining function 112 via the charge determination communicating function 214 and the charge determination communicating function 114 (S2104, S2105). The power transmission determining function 112 looks a version of the electrical charging system included in the received request to start charging and determines whether it can be negotiated for charging or not (S2106).

Then, the power transmission determining function 112 outputs a response to start charging, which includes notification of the electrical charging system version (S2107). The response to start charging is sent to the power receiving determining function 212 via the charge determination communicating function 114 and the charge determination communicating function 214 (S2108, S2109). The power receiving determining function 212 looks a version of the electrical charging system included in the received response to start charging and determines whether it can be negotiated for charging or not (S2110).

FIG. 6 is a sequence diagram showing processing where a power transmitting device detects an approach of a portable electronic device without working with a non-contact processing module. In the figure, the approach detecting function 111 in the power transmitting device 1 outputs a poling signal for detecting an approach of the portable electronic device (S2201). The poling signal is inputted into the power transmission determining function 112. The power transmission determining function 112 outputs a request to start charging, which includes notification of the electrical charging system version (S2202). The request to start charging is sent to the charge determination communicating function 214 via the charge determination communicating function 114 (S2203). The abovementioned processing is regularly repeated until a response is returned.

The charge determination communicating function 214 outputs a request to start charging, which includes notification of the electrical charging system version (S2204). The power receiving determining function 212 received the request to start charging outputs an approach notifying signal to the approach detecting function 211 (S2205). The power receiving determining function 212 looks a version of the electrical charging system included in the received request to start charging and determines whether it can be negotiated for charging or not (S2206).

Then, the power receiving determining function 212 outputs a response to start charging, which includes notification of the electrical charging system version (S2207). The response to start charging is sent to the power transmission determining function 112 via the charge determination communicating function 214 and the charge determination communicating function 114 (S2208, S2209). The power transmission determining function 112 that received the response to start charging outputs an approach notifying signal to the approach detecting function 111 (S2210). The power transmission determining function 112 looks a version of the electrical charging system included in the received response to start charging and determines whether it can be negotiated for charging or not (S2111).

(Processing where Devices are Separated from Each Other)

Next, processing between the functions when the devices are separated from each other after the charging started will be described with reference to FIG. 7. The figure shows operation of each of the approach detecting function 111, the power transmission determining function 112 and the charge determination communicating function 114 in the power transmitting device 1 and operation of each of the approach detecting function 211, the power receiving determining function 212 and the charge determination communicating function 214 in the portable electronic device 2.

In the figure, after a sequence for detecting the abovementioned trigger to start charging is executed (any one of the processing shown in FIG. 4 to FIG. 6) (S2300), the power transmission determining function 112 arbitrarily outputs a signal that sets a start charging power or the like (S2301) The setting signal is inputted into the power receiving determining function 212 via the charge determination communicating function 114 and the charge determination communicating function 214 (S2302, S2303).

The power receiving determining function 212 arbitrarily outputs a response signal such as power or the like (S2304). The response signal is inputted into the power transmission determining function 112 via the charge determination communicating function 214 and the charge determination communicating function 114 (S2305, S2306). The power transmission determining function 112 received the response signal outputs a request to start power transmission to the power transmitting device control function 113 (S2307). The power receiving determining function 212 outputs a power receiving standby signal to the power receiving device control function 213 (S2308). Then, the power transmitting device control function 113 transmits power to the power receiving device control function 213 (S2309). With the power transmission, a power source, i.e., a rapid bulk electricity storing module is charged.

If it is detected that the approach detecting function 211 in the portable electronic device 2 and the approach detecting function 111 in the power transmitting function 1 are separated from each other during charging (S2310, S2311), a separation notification is outputted from the approach detecting function 211 to the power receiving determining function 212 and from the approach detecting function 111 to the power transmission determining function 112, respectively (S2312, S2313).

Then, the power transmitting device control function 113 stops power transmission (S2315) and outputs power transmission stop notification to the power transmission determining function 112 (S2316). The power transmission stop notification arbitrary includes notification of the amount of transmitted power. The power receiving device control function 213 detects stop of the power receiving (S2317) and outputs power receiving stop notification to the power receiving determining function 212 (S2318). The power receiving stop notification arbitrary includes notification of an amount of received power.

(Processing in a Charging Full State)

Next, processing between the functions in a charging full state after the charging started will be described with reference to FIG. 8. The figure shows operation of each of the approach detecting function 111, the power transmission determining function 112 and the charge determination communicating function 114 in the power transmitting device 1 and operation of each of the approach detecting function 211, the power receiving determining function 212 and the charge determination communicating function 214 in the portable electronic device 2.

In the figure, after a sequence of detecting the abovementioned trigger to start charging is executed (any one of the processing shown in FIG. 4 to FIG. 6) (S2300), the power transmission determining function 112 arbitrarily outputs a signal that sets a start charging power or the like (S2401). The setting signal is inputted into the power receiving determining function 212 via the charge determination communicating function 114 and the charge determination communicating function 214 (S2402, S2403).

The power receiving determining function 212 arbitrary outputs a response signal such as power or the like (S2404). The response signal is inputted into the power transmission determining function 112 via the charge determination communicating function 214 and the charge determination communicating function 114 (S2405, S2406).

Figure 7:
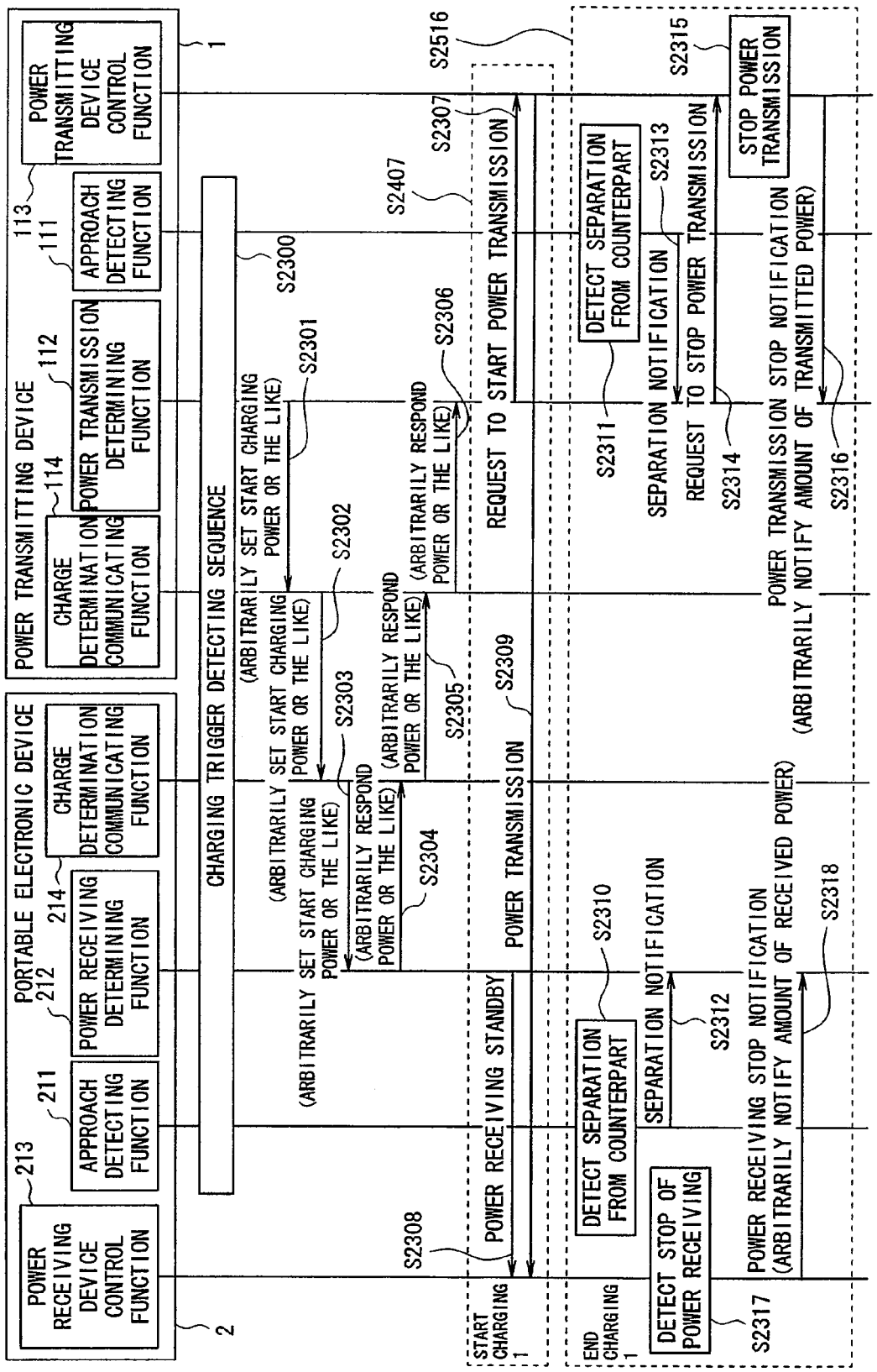
FIG. 7 is a sequence diagram showing processing among functions where devices are separated.

Then, similar to the case shown in FIG. 7, a sequence to start charging is executed (S2407).

If the power receiving device control function 213 of the portable electronic device 2 detects that the rapid bulk electricity storing module is in a charged to full state (S2408), the power receiving device control function 213 outputs a battery full signal to the power receiving determining function 212 (S2409). The power receiving determining function 212 that received the battery full signal from the power receiving device control function 213 outputs a request to stop power transmission (S2410). The request to stop power transmission is inputted into the power transmitting device control function 113 via the charge determination communicating function 214, the charge determination communicating function 114 and the power transmission determining function 112 (S2411, S2412, S2413).

The power transmitting device control function 113 received the request to stop power transmission stops power transmission (S2414) and outputs a power transmission stop notification to the power transmission determining function 112 (S2415). The power transmission stop notification arbitrarily includes notification of the amount of transmitted power. The power receiving device control function 213 detects stop of the power receiving (S2416) and outputs power receiving stop notification to the power receiving determining function 212 (S2417). The power receiving stop notification arbitrarily includes notification of an amount of received power.

The approach detecting function 211 in the portable electronic device 2 and the approach detecting function 111 in the power transmitting device 1 respectively detect that they are separated from each other (S2418, S2420), they output a separation notification from the approach detecting function 211 to the power receiving determining function 212 and from the approach detecting function 111 to the power transmission determining function 112, respectively (S2419, S2421).

Second Embodiment

Description of the Electrical Charging System

Figure 9:
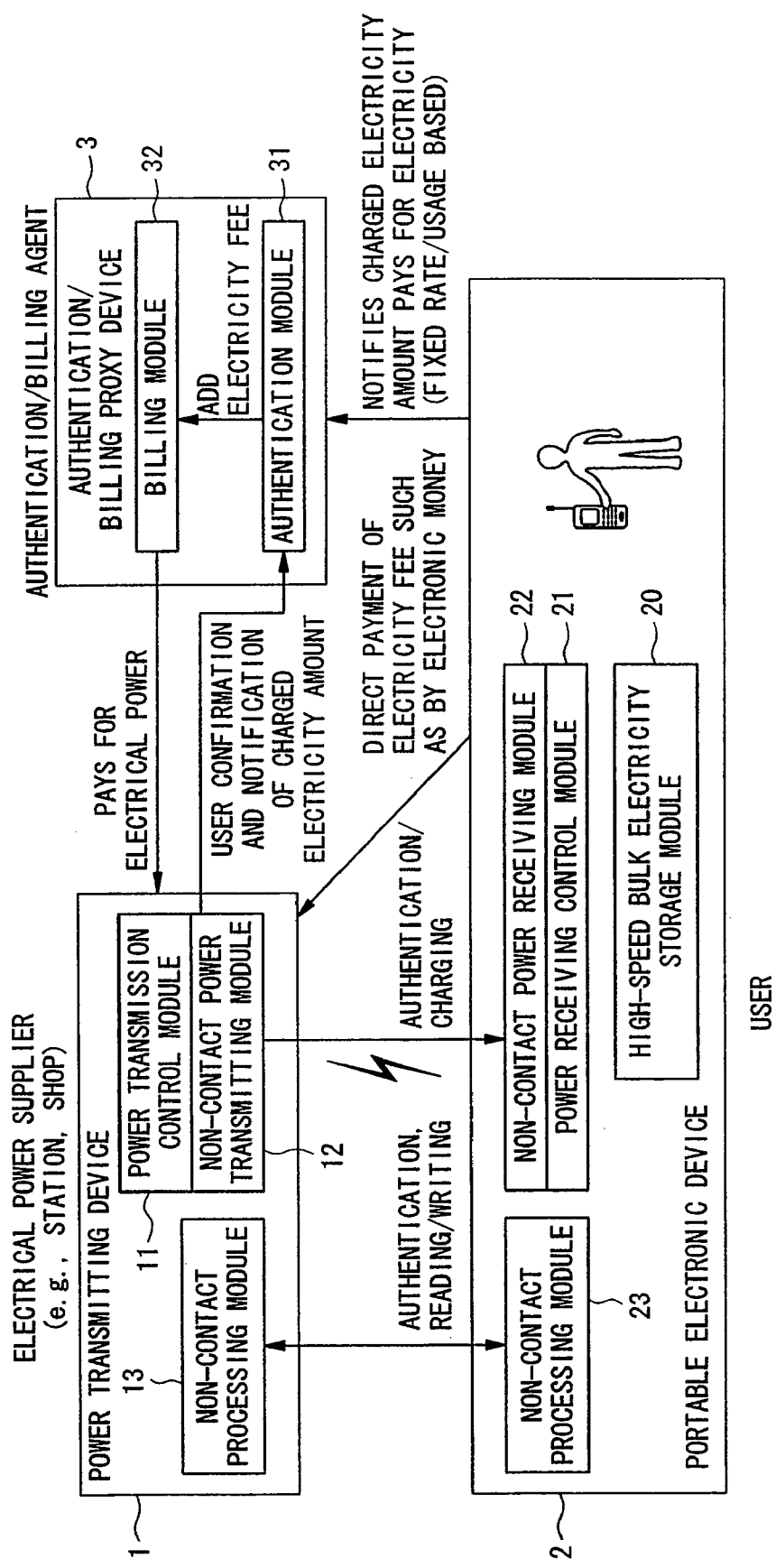
FIG. 9 is a block diagram showing an exemplary configuration including the first to fifth electrical charging systems that adopted the electrical charging system of the present invention.

FIG. 9 is a block diagram illustrating an exemplary configuration including a first, second, third, fourth, and fifth electrical charging systems that adopt the electrical charging system according to the invention. The electrical charging systems illustrated in the figure consists of the configuration shown in FIG. 1 plus an authentication/billing proxy device 3 that is provided in an authentication/billing agent such as a cellular phone service provider. In this system, the portable electronic device 2 is charged by the power transmitting device 1 and billed by the authentication/billing proxy device 3 as necessary.

The power transmitting device 1 includes a non-contact processing module 13 such as a FeliCa (a registered trademark) reader, anon-contact power transmitting module 12, and a power transmission control module 11. The portable electronic device 2 includes a non-contact processing module 23 for non-contact processing operations for FeliCa (a registered trademark), a non-contact power receiving module 22 for charging, a power receiving control module 21 for determination and control of charging, and a bulk electricity storage module 20 that is capable of high-speed charging.

The authentication/billing proxy device 3 includes an authentication module 31 and a billing module 32.

(Description of the Power Transmission Control Module and Power Receiving Control Module)

The power transmission control module 11 in the power transmitting device 1 and the power receiving control module 21 in the portable electronic device 2 are modules for identifying a device to be charged based on policy and history information and, in some cases, for authenticating the device and determining whether charging should be executed.

Figure 10:
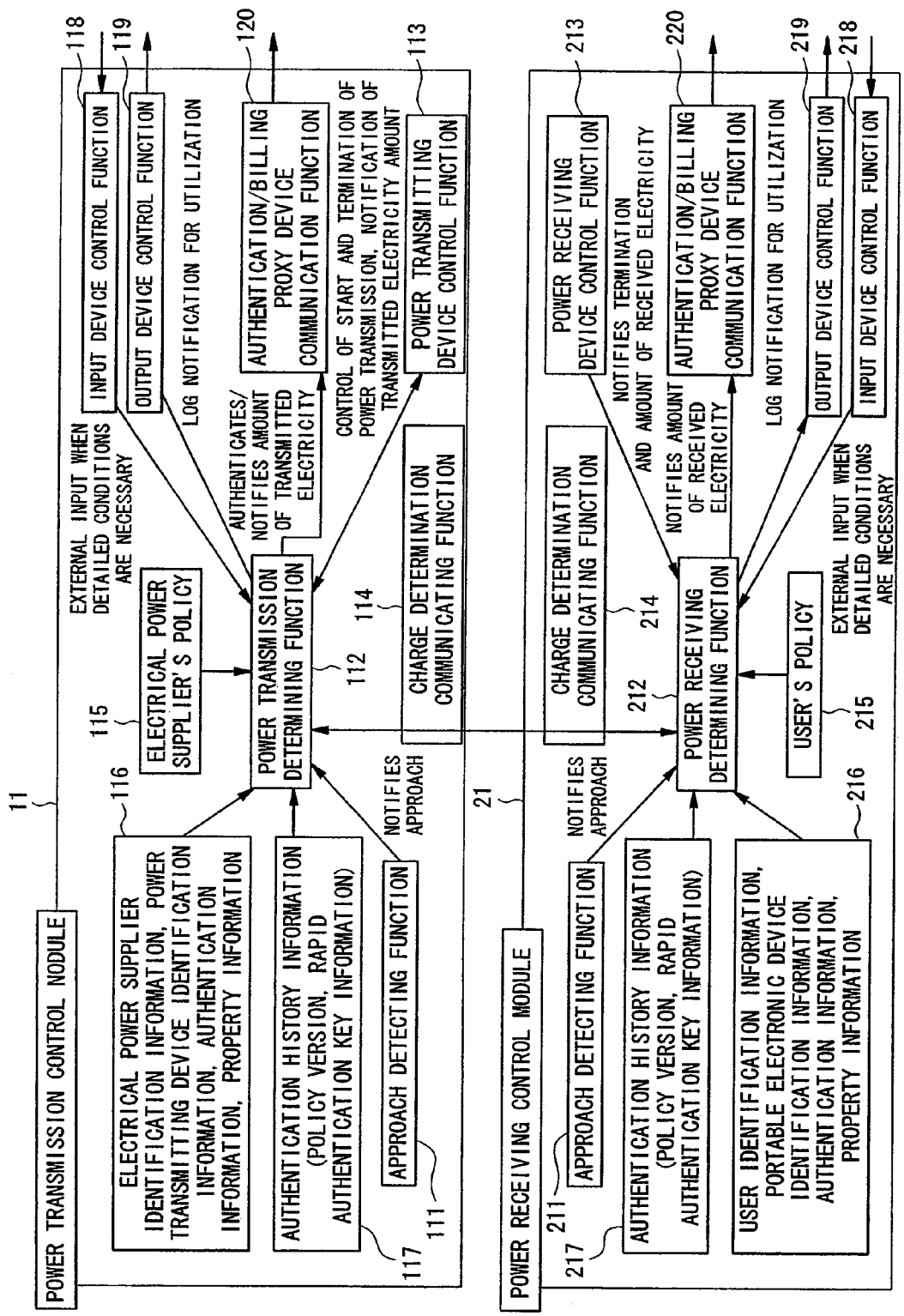
FIG. 10 is a block diagram showing configuration of each of the power transmission control module and the power receiving control module of FIG. 9.

FIG. 10 is a block diagram showing components of the power transmission control module 11 and the power receiving control module 21 in FIG. 9.

The power receiving control module 21 of the portable electronic device 2 includes an approach detecting function 211 for detecting approaching of an external device, a power receiving determination function 212, a power receiving device control function 213, a charge determination communicating function 214, a user's policy 215, an input device control function 218, an output device control function 219, and an authentication/billing proxy device communication function 220. The power receiving control module 21 has preset therein the user's policy 215, information 216 such as user identification information, portable electronic device identification information, authentication information, property information, and authentication history information 217 such as policy version and rapid authentication key information.

The power transmission control module 11 of the power transmitting device 1 includes an approach detecting function 111 for detecting approaching of an external device, a power transmission determining function 112, a power transmitting device control function 113, a charge determination communication function 114, an input device control function 118, an output device control function 119, and an authentication/billing proxy device communication function 120. The power transmission control module 11 has preset therein electrical power supplier's policy 115, information 116 such as electrical power supplier identification information, power transmitting device identification information, authentication information, and property information, and authentication history information 117 such as policy version and rapid authentication key information.

(Description of the Power Receiving Control Module of the Portable Electronic Device)

The power receiving control module 21 of the portable electronic device 2 determines whether power reception from the power transmitting device 1 is possible or not based on user policy information by using a user's identification information, identification information for a portable electronic device, authentication information (e.g., an electronic signature and a PIN code) or property information (e.g., manufacturer and communication provider). In some cases, however, part of a user's policy may be communicated to the power transmitting device 1, which makes part of determination in the power transmitting device 1.

In this system, rapid authentication key information (to be discussed later) is maintained in authentication history information in order to reduce authentication time. By means of the key information, authentication can be made without requesting the authentication/billing proxy device 3 to authenticate within the validity period of the key information.

Actual communication with the power transmitting device including notification of a user's policy or the like is made by way of the charge determination communicating function 214, and actual reception of electrical power is made by way of the power receiving device control function 213.

Basically, determination of power reception is made automatically based on the user's policy in this example. In some cases, however, a user's explicit intention can be confirmed via the input device control function 218. Input of the user's policies is also made via the input device control function 218.

Confirmation of received power amount or a resulting fee by the user and confirmation of the user's policy are made via the output device control function 219.

When a received power amount is informed externally such as in a case the authentication/billing proxy device 3 is utilized, the communication function for authentication/billing proxy device 220 is utilized.

(Description of the Power Transmission Control Module of the Power Transmitting Device)

The power transmission control module 11 of the power transmitting device 1 determines whether power transmission to the portable electronic device 2 is possible or not based on the electrical power supplier's policy by using identification information for the electric power supplier, identification information of the power transmitting device, authentication information (e.g., an electronic signature and a PIN code), or property information (e.g., a manufacturer and a communication provider).

In this system, rapid authentication key information (to be discussed later) is maintained in authentication history information in order to reduce authentication time. By using the key information, authentication can be made without requesting the authentication/billing proxy device 3 to authenticate within the validity period of the key information.

Actual communication with the portable electronic device is made by way of the charge determination communicating function 114 and actual transmission of electrical power is made via the power transmitting device control function 113.

Basically, determination of power transmission is automatically made based on the electric power supplier's policy in this example. In some cases, however, the electric power supplier's explicit intention can be confirmed by way of the input device control function 118. Input of the electric power supplier's policy is also made via the input device control function 118.

Confirmation of power transmission and/or a resulting fee by the electric power supplier and confirmation of the electric power supplier's policy are made via the output device control function 119.

When the authentication/billing proxy device 3 is utilized, authentication is requested via the authentication/billing proxy device communication function 120.

(The Authentication/Billing Proxy Device)

Figure 11:
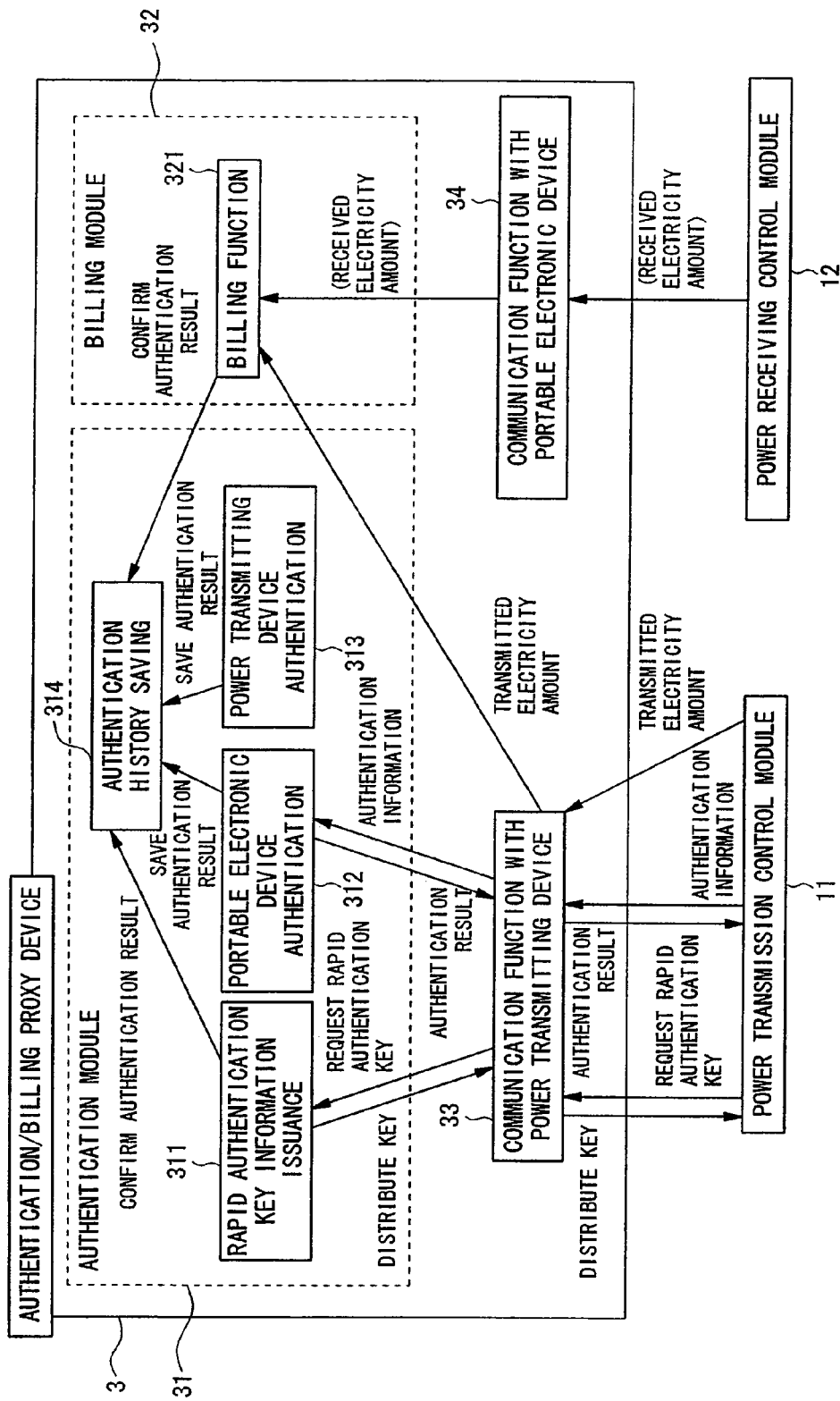
FIG. 11 is a block diagram showing an exemplary configuration of the authentication/billing proxy device of FIG. 9.

FIG. 11 shows a block diagram illustrating an exemplary configuration of the authentication/billing proxy device 3 in FIG. 9.

As shown in FIG. 11, the authentication/billing proxy device 3 includes an authentication module 31 that includes a rapid authentication key information issuing function 311, a portable electronic device authentication function 312, a power transmitting device authentication function 313, and an authentication record saving function 314; a billing module 32 that includes a billing function 321; a power transmitting device communication function 33 for controlling communication with the power transmission control module 11 provided in a power transmitting device; and a portable electronic device communication function 34 for controlling communication with the power receiving control module 21 provided in a portable electronic device.

The authentication/billing proxy device 3 has identification and authentication information for users or portable electronic devices (i.e., the potable electronic device authentication function 312 described above) and identification and authentication information for electric power suppliers or power transmitting devices (i.e., the power transmitting device authentication function 313 described above), capable of authenticating individual devices. These pieces of information are typically utilized for authentication of a portable electronic device, but can be also utilized when a portable electronic device authenticates a power transmitting device.

Since the authentication/billing proxy device 3 has information on users of portable electronic devices and electrical power suppliers that use power transmitting devices, it can bill users based on the amount of electrical power received by a portable electronic device and/or the amount of electrical power transmitted from a power transmitting device.

The portable electronic device 2 and/or the power transmitting device 1 can utilize the authentication/billing proxy device 3 when it requires strict proxy authentication or proxy billing according to policy.

In addition, rapid authentication key information can be issued by the rapid authentication key information issuing function 311 and distributed to the power transmitting device 1 and the portable electronic device 2 in order to reduce time required for the next authentication. That is, when an authentication is successfully completed, rapid authentication key information is issued and rapid authentication will be realized using the information at the next and subsequent times so that authentication by a proxy device is not required.

Although authentication is separately handled in operation at the non-contact processing module (e.g., FeliCa (a registered trademark)) and charging operation, if authentication and billing are made in the course of operation at the non-contact processing module, the authentication/billing and those for charging are not separated but shared so that flow of authentication and billing for the purpose of charging may be omitted. The following description will refer to independent authentication and billing.

(User's Policy)

The user's policy mainly includes five categories: fee settings, billing method settings, charging mode settings, charging determination settings, and security settings. Each of these categories will be discussed.

The fee settings may be setting of an acceptable charging fee (e.g., charging is made if no charge/below n yen per second/below n yen per watt), and/or fee settings with privileges (e.g., an advertisement can be accepted if charging is free/below n yen).

For the billing method settings, payment utilizing a proxy billing device and/or debit payment by means of electronic money can be selected.

With the charging mode settings, strength of receivable electric power and/or amount of power that can be received at a time can be configured.

With the charging determination settings, it is possible to set determination of whether automatic charging is made according to policy at all, as well as setting of upper limit of monthly fee, limitation of electrical power supplier, limitation of power transmitting device, limitation by property information, and settings for requesting an explicit permission from a user.

With the security settings, setting of display/non-display is possible for each piece of user information. User information refers to identification information for users, identification information for portable electronic devices, and property information (e.g., a manufacturer and a communication provider). Display/non-display setting for part of a user's policy (e.g., fee settings, billing method settings and charging mode settings) is also possible. Further, setting for permitting utilization of a rapid authentication system (i.e., a mechanism for omitting authentication by an authentication/billing proxy device) is also available.

Arbitrary items and values can be configured in addition to the settings described above.

(Electrical Power Supplier's Policy)

An electrical power supplier's policy includes mainly five categories: fee settings, billing method settings, charging mode settings, charging determination settings, and security settings. Each of the categories will be described.

The fee settings may be setting of charging fee (e.g., no charge/n yen per second/n yen per watt), fee settings with privileges (e.g., no charge with advertisement/n yen), and/or time-varying fee setting (e.g., no charge for the first one second and n yen per second subsequently). It is also possible to set personalized fees for a user or portable electronic device basis (e.g., charge for users/portable electronic devices with a high use frequency is discounted), and/or personalized fee by property information of portable electronic devices (e.g., by manufacturer and/or communication provider) (e.g., charge for cellular phones from a particular manufacturer or communication provider is discounted).

With billing method setting, it is possible to set a mode utilizing a proxy billing device or whether debit payment by electronic money is accepted.

With the charging mode settings, it is possible to set whether charging is started prior to authentication when a portable electronic device starts negotiation on charging with a power transmitting device, because authentication associated with charging may take time. Strength of transmittable power and/or amount of power that can be transmitted at a time can be also configured.

With the charging determination setting, it is possible to set whether automatic charging is made according to policy at all, upper limit of monthly fee for when electrical power is supplied at no charge, limitation of users, limitation of portable electronic devices, limitation by property information (e.g., by manufacturer and/or communication provider), as well as setting for requesting explicit permission from an electrical power supplier.

With the security setting, display/non-display for each piece of electrical power supplier information can be set. Electrical power supplier information refers to identification information of electrical power suppliers, identification information of power transmitting devices, and property information. Display/non-display settings for part of an electrical power supplier's policy (e.g., fee settings, billing method settings, and charging mode settings) is also possible. Further, setting for permitting utilization of a rapid authentication system (i.e., a mechanism for omitting authentication by an authentication/billing proxy device) is also available.

Arbitrary items and values can be set in addition to those settings.

(Charging Flow)

A flow of charging according to the embodiment will be described.

Figure 12:
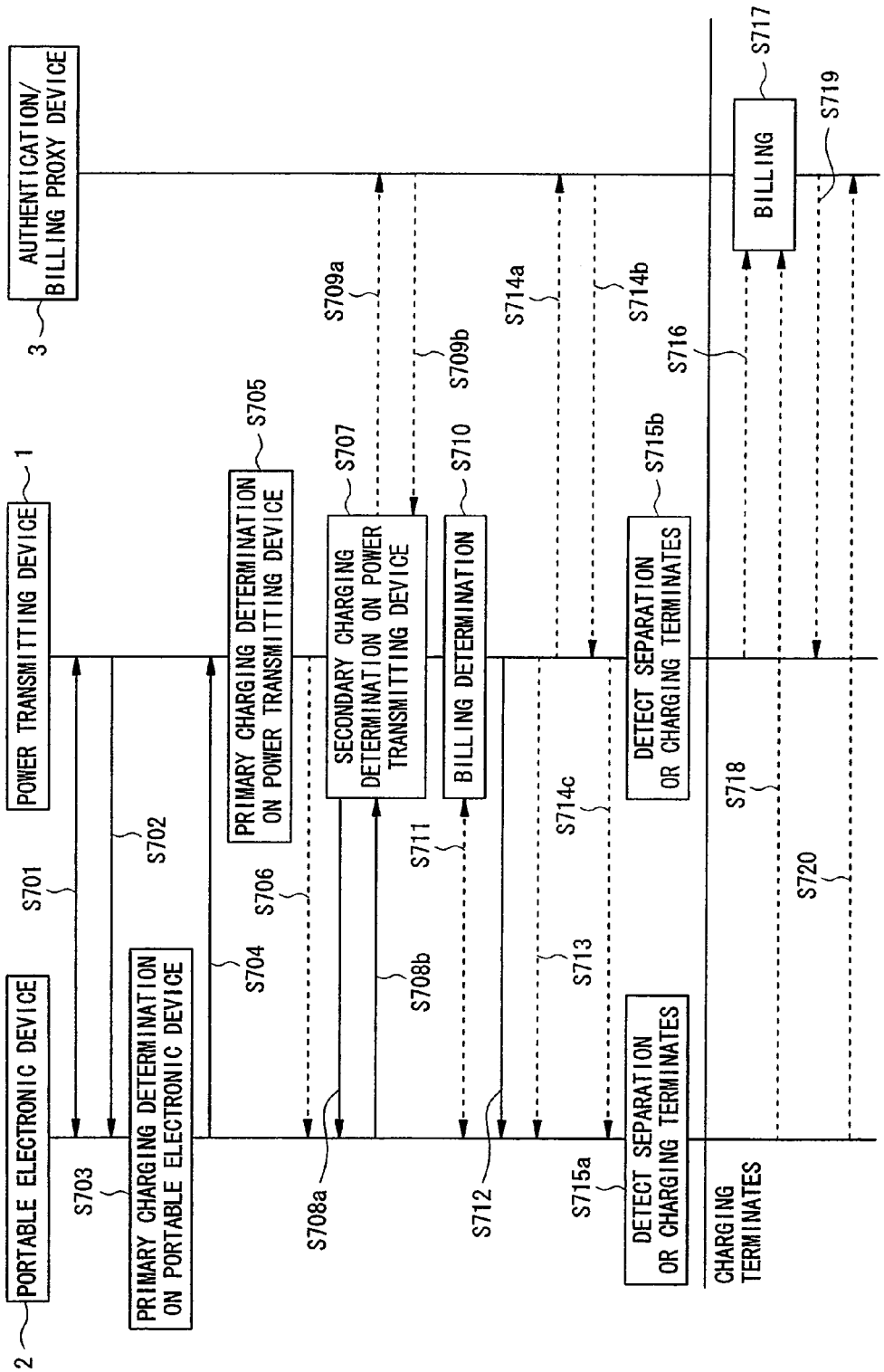
FIG. 12 is a sequence diagram showing processing of the second electrical charging system.
Figure 13:
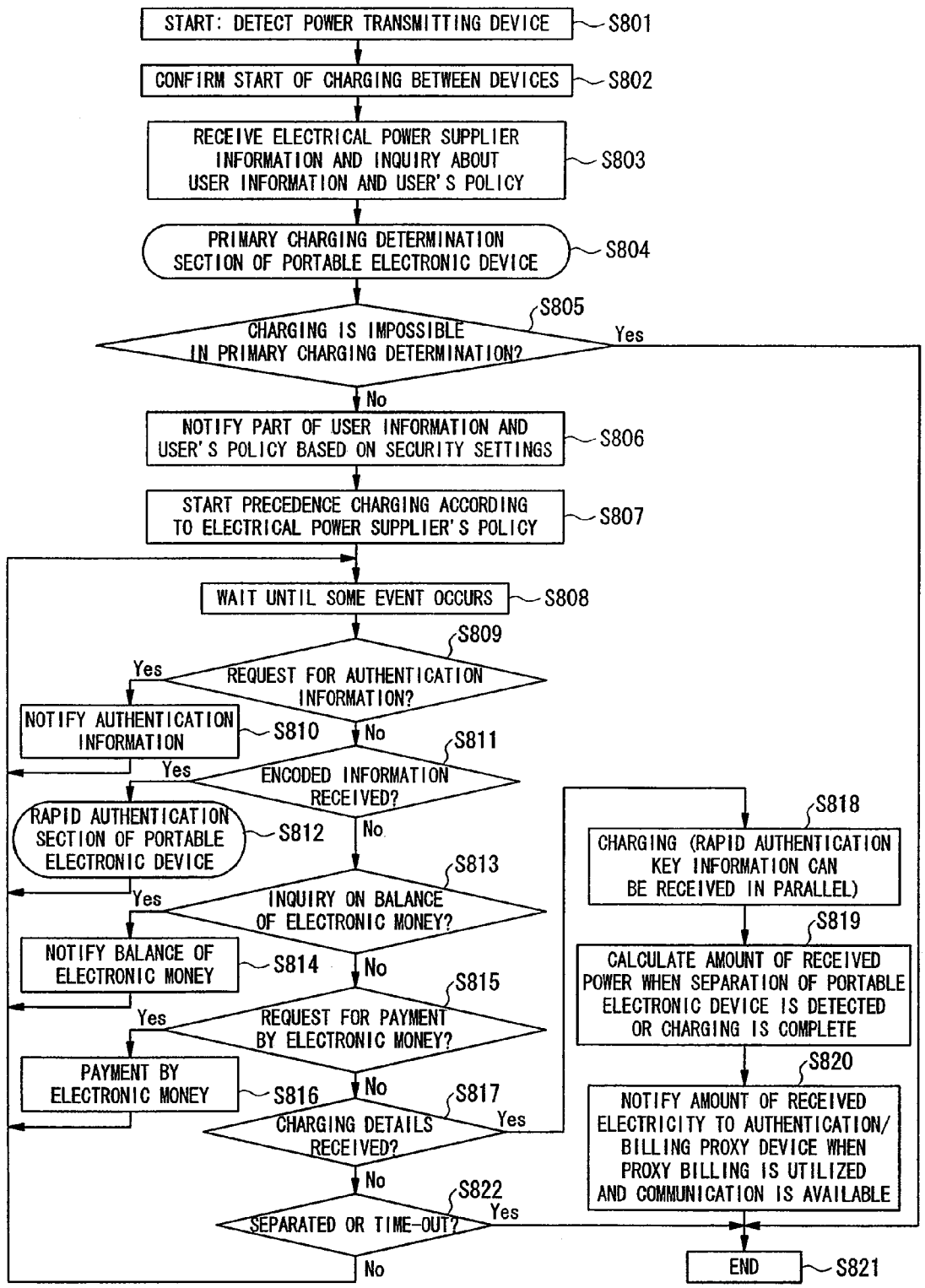
FIG. 13 is a flowchart showing processing of the portable electronic device.
Figure 14:
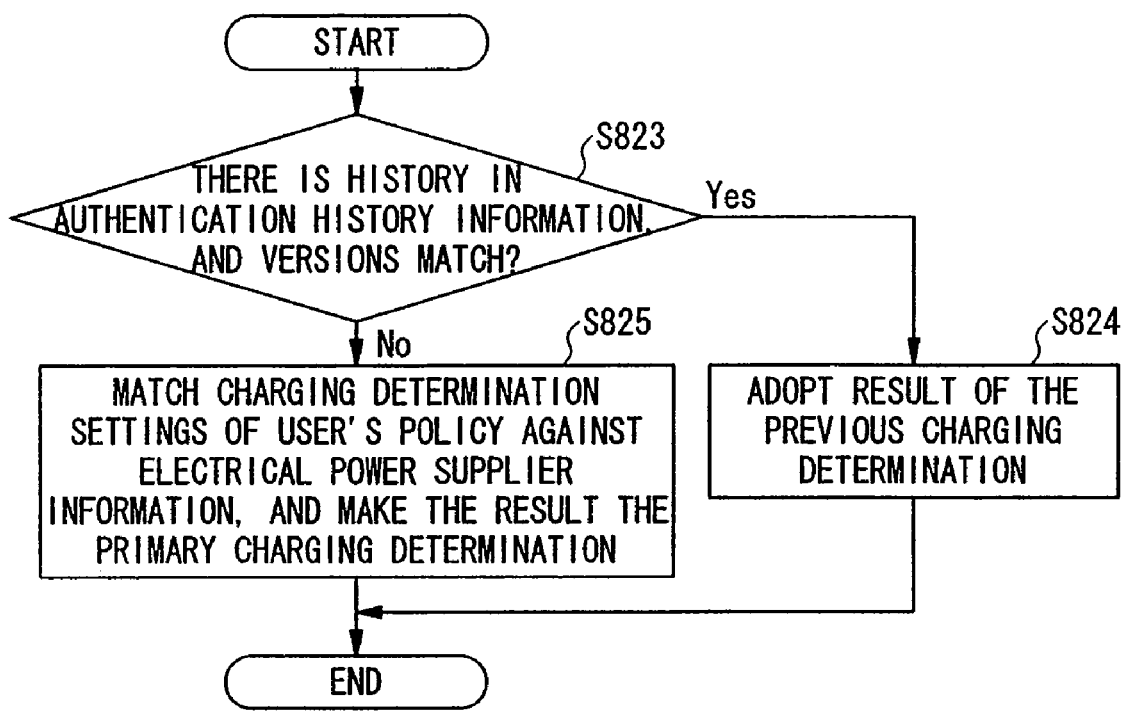
FIG. 14 is a flowchart showing the primary charging determination processing at the side of the portable electronic device.
Figure 15:
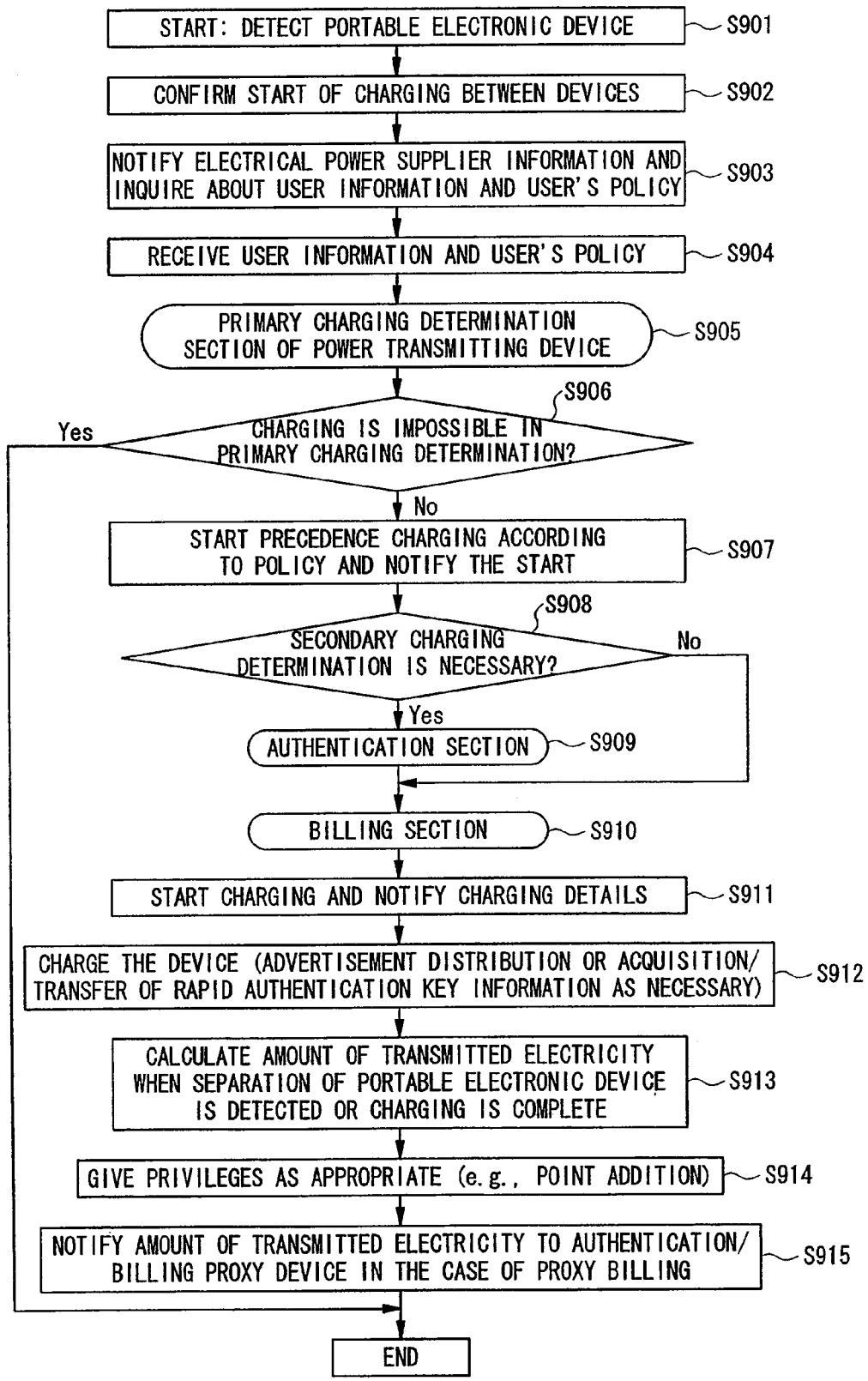
FIG. 15 is a flowchart showing processing of the power transmitting device.
Figure 16:
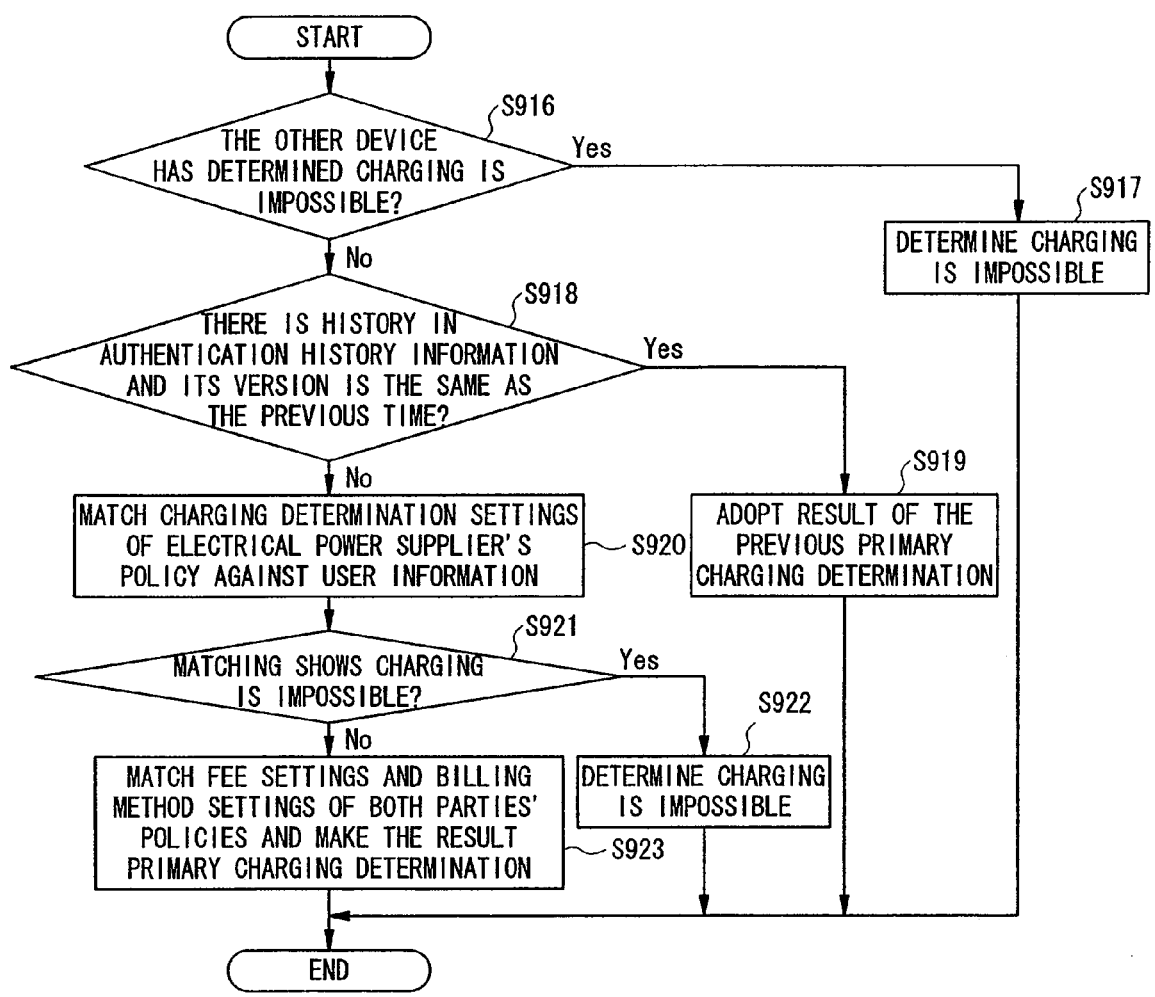
FIG. 16 is a flowchart showing the primary charging determination processing at the side of the power transmitting device.
Figure 17:
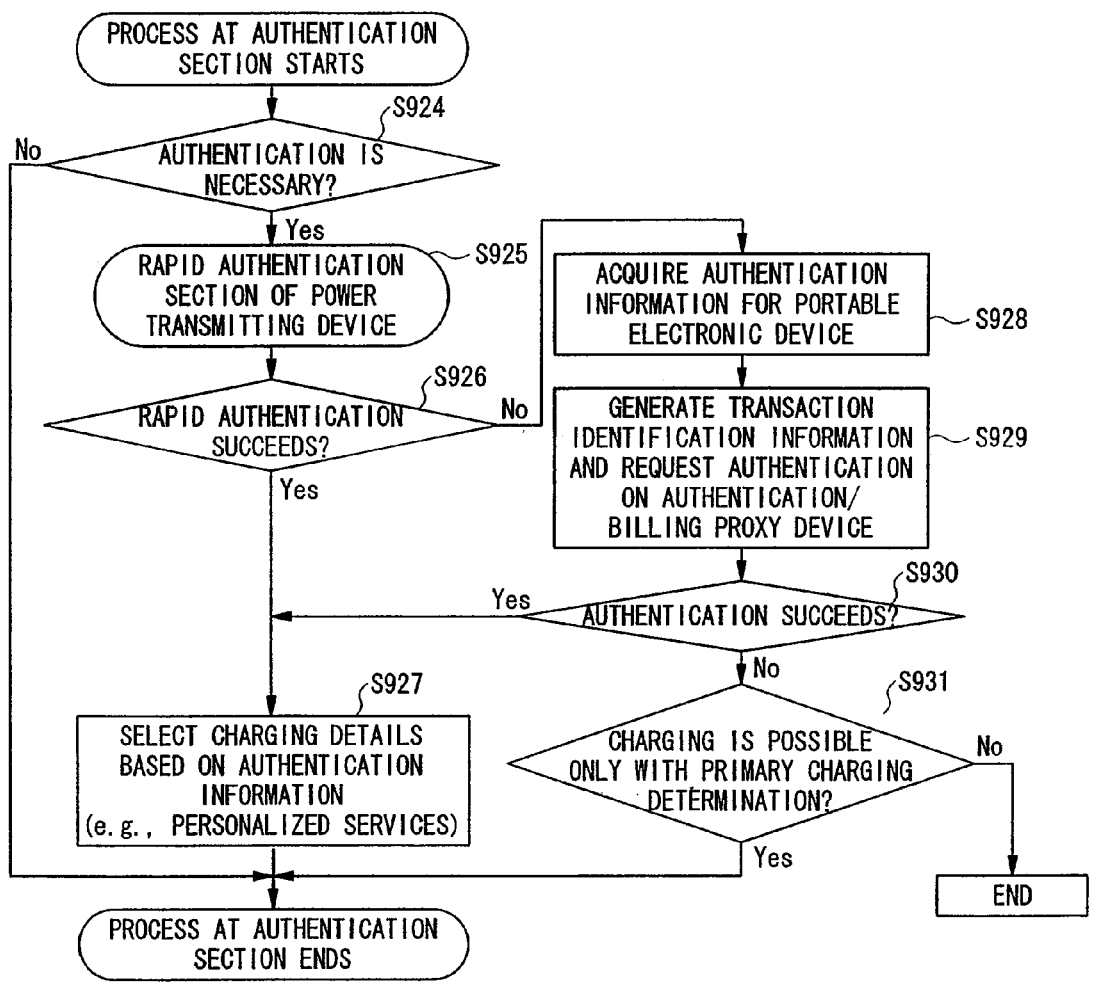
FIG. 17 is a flowchart showing the authentication processing at the side of power transmitting device.
Figure 18:
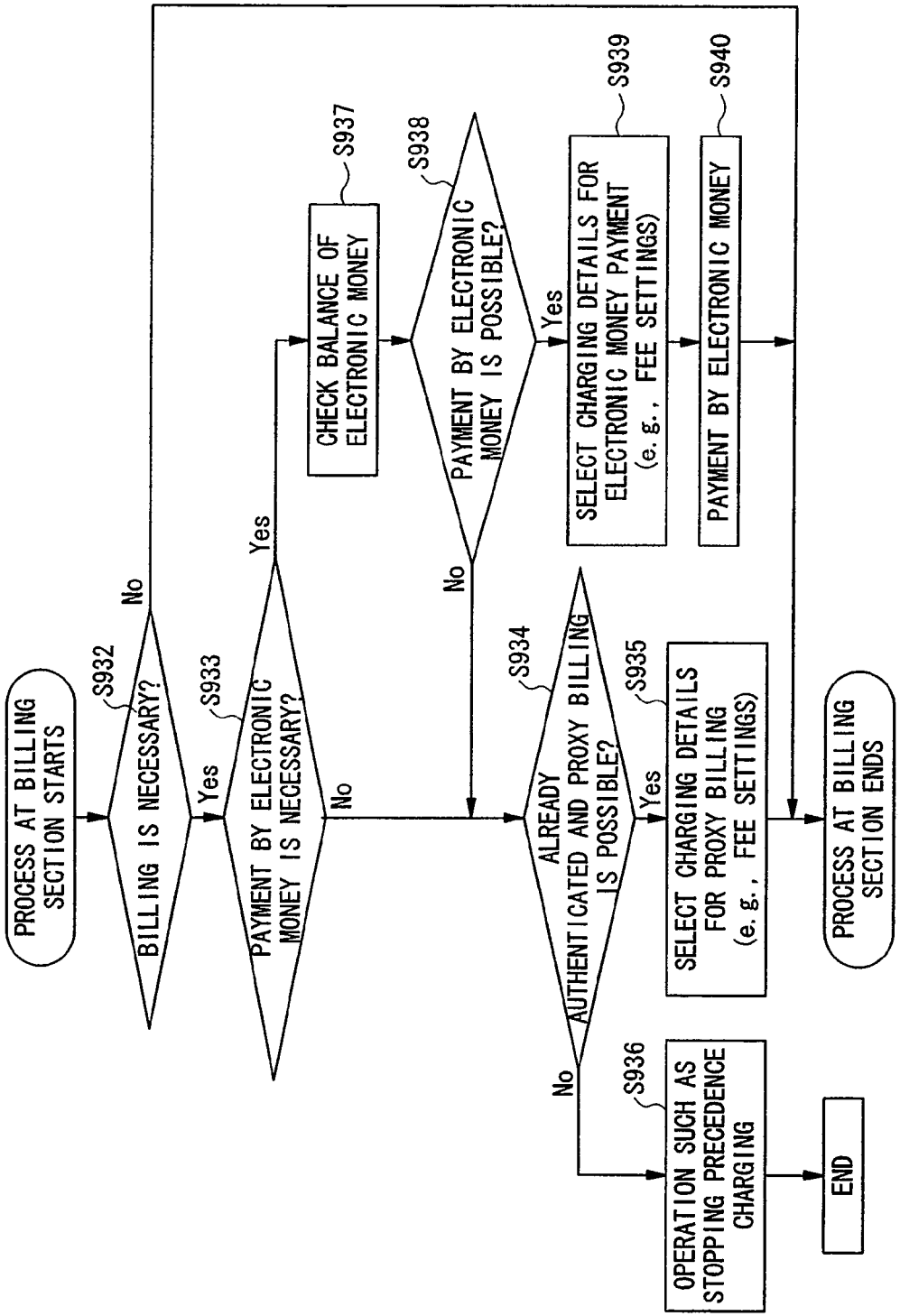
FIG. 18 is a flowchart showing the billing processing at the side of power transmitting device.
Figure 19:
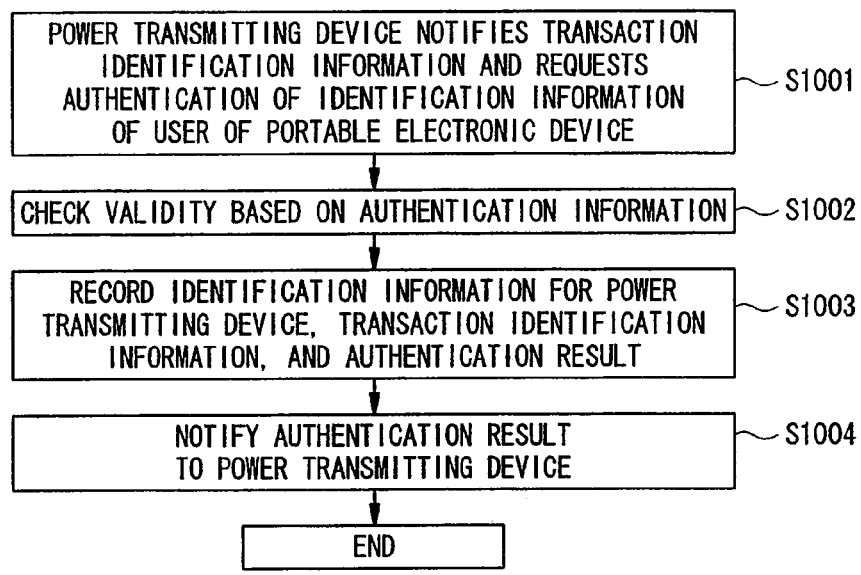
FIG. 19 is a flowchart showing the authentication processing at the authentication/billing proxy device.
Figure 20:
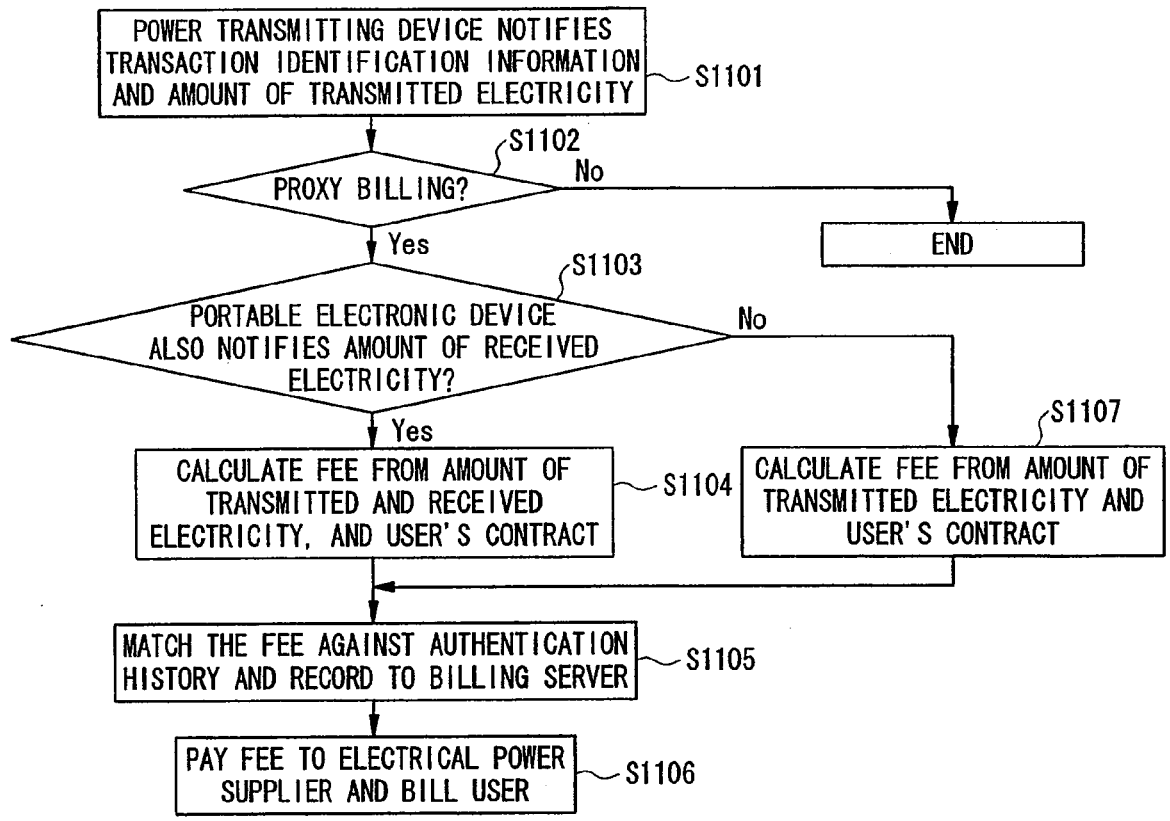
FIG. 20 is a flowchart showing the billing processing at the authentication/billing proxy device.

FIG. 12 illustrates a sequence diagram showing processing at the second electrical charging system. FIG. 13 is a flowchart showing processing at a portable electronic device and FIG. 14 is a flowchart showing primary charging determination process at a portable electronic device. FIG. 15 is a flowchart showing processing at a power transmitting device. FIG. 16 is a flow chart illustrating process of primary charging determination at a power transmitting device. FIG. 17 is a flowchart illustrating authentication process at a power transmitting device. FIG. 18 is a flowchart illustrating billing process at a power transmitting device. FIG. 19 is a flowchart illustrating authentication process at an authentication/billing proxy device and FIG. 20 shows a flowchart of billing process at an authentication/billing proxy device.

General process is as follows. The two devices inform user information, the version of the user's policy as well as electric power supplier information and the version of the electric power supplier's policy one another and thereby each perform primary charging determination. Thereafter, secondary charging determination including authentication and billing is made at the electric power supplier and charging is carried out.

More specific description will be given in the following. In FIG. 12, initially, when the power transmitting device 1 and the portable electronic device 2 detect each other, commencement of charging process is confirmed (step S701) If charging process is performed, the power transmitting device 1 sends an inquiry on electric power supplier information and the user's policy to the portable electronic device 2 (step S702). The "electric power supplier information" includes electric power supplier identification information, power transmitting device identification information, property information, and the version of an electric power supplier's policy. This applies to the following description.

Then, on the portable electronic device 2, primary charging determination on the portable electronic device side is made (step S703). At this point, the version of the policy is checked. Then, the portable electronic device 2 notifies the power transmitting device 1 of user information and the user's policy (step S704). The "user information" includes user identification information, portable electronic device identification information, property information, and the version of the user's policy. This applies to the following description as well.

Upon receiving notification at step S704, the power transmitting device 1 performs primary charging determination on the power transmitting device side (step S705). As a result of the determination, precedence charging may be started (step S706). In some cases, transmission of user's policy may be omitted at step S704 and policy matching may be omitted at step S705.

Then, secondary charging determination is made on the power transmitting device 1, and subsequently, the power transmitting device 1 and the portable electronic device 2 communicate with each other a request for authentication information and corresponding notification (steps S708a and S708b). Rapid authentication may be performed instead of the request and notification.

Thereafter, in some cases, the power transmitting device 1 sends a request for proxy authentication to the authentication/billing proxy device 3 (step S709a), and the authentication/billing proxy device 3 informs the result of authentication to the power transmitting device 1 (step S709b).

Then, determination of billing is made on the power transmitting device (step S710). At this point, in some cases, payment is made by electronic money (step S711). The power transmitting device 1 then informs the charging details to the portable electronic device 2, and charging is started (step S712). Arbitrarily, an advertisement is distributed (step S713). Also, in some cases, rapid authentication key information may be acquired or updated (step S714a), the key information may be distributed (step S714b) and transferred (step S714c).

Charging of the portable electronic device 2 by the power transmitting device 1 terminates when separation of these devices is detected or charging is complete (steps S715a and S715b).

If charging is complete, billing is made by the authentication/billing proxy device 3 (step S717). Here, the power transmitting device 1 may inform the authentication/billing proxy device 3 of the amount of transmitted power (step S716). Also, arbitrarily, the portable electronic device 2 informs the authentication/billing proxy device 3 of the amount of received electric power (step S718). In some cases, regular payment of a fee is made (steps S719 and S720).

In FIG. 13, processing at the portable electronic device is started when a power transmitting device is detected (step S801). Initially, the portable electronic device confirms commencement of charging process with the power transmitting device (step S802). Then, the portable electronic device is informed of electric power supplier information by the power supplier device and receives an inquiry on user information and user policy (step S803). Then, determination process at the primary charging determination section of the portable electronic device is entered (step S804).

Determination process made at the primary charging determination section of the portable electronic device is illustrated in FIG. 14. In the figure, determination is made as to whether there is history in authentication history information and policy versions match (step S823). If the versions match in the determination, result of the previous primary charging determination is adopted (step S824). However, if the versions do not match, charging determination settings of the user's policy is matched against electric power supplier information, and the result thereof is made the primary determination (step S825).

Returning to FIG. 13, if it is not determined that charging is not possible in the primary charging determination, user information and part of user's policy is informed based on security settings (step S805→S806). Then, precedence charging is started according to the policy of the electric power supplier (step S807).

Subsequently, the portable electronic device enters stand-by state until some event occurs (step S808). If authentication information is requested in stand-by state, the authentication information is notified (steps S809→S810). If encoded information is received, processing by the rapid authentication section of the portable electronic device is entered (steps S811→S812). The processing by the rapid authentication section will be described later.

If an inquiry on the balance of electronic money is made, the balance of electronic money is informed (steps S813→S814). If payment by electronic money is requested, payment is made by electronic money (step S815→S816).

If charging details has been received, charging process is entered (steps S817→S818). In charging process, rapid authentication key information can be received concurrently. When separation of the portable electronic device from the power transmitting device is detected or charging is complete, the amount of received electric power is calculated (step S819). In a case proxy billing is utilized and communication is available, the amount of received power is informed to the authentication/billing proxy device (step S820), and the process terminates (step S821).

It is determined whether the devices are separated or a predetermined timeout period has elapsed (step S822), and in either of the cases, the process terminates (steps S822→S821). If it is determined that charging is impossible at step S805, the process terminates as well (steps S805→S821).

In FIG. 15, processing at the power transmitting device is started when a portable electronic device is detected (step S901). First, the power transmitting device confirms commencement of charging process with the portable electronic device (step S902). The power transmitting device informs electric power supplier information to the portable electronic device and inquires about user information and the user's policy (step S903). Then, it receives user information and the user's policy from the portable electronic device (step S904). Thereafter, determination process at the primary charging determination section of the power transmitting device is entered (step S905).

Determination process at the primary charging determination section of the power transmitting device is shown in FIG. 16. In the figure, determination is made as to whether the other device has determined that charging is impossible, and if so, the determination section determines that charging is impossible (steps S916→S917). If there is history in authentication history information and the policy version corresponds with that for the previous time, the result of primary charging for the previous time is adopted (steps S918→S919).

If the other device has not determined that charging is impossible and the policy version does not corresponds with that for the previous time, charging determination setting of electrical power supplier's policy is matched against user information (step S916→S918→S920). In the case charging is impossible as the result of the matching, it is determined that charging is impossible (step S921→S922). Otherwise, fee settings is matched against billing method settings of both parties' policies, and the result is made the primary charging determination (steps S921→S923).

Returning to FIG. 15, it is determined whether charging was impossible in the primary charging determination (step S906), and if charging was not determined to be impossible, precedence charging is started according to policies and the portable electronic device is informed of it (steps S906→S907). Thereafter, it is determined whether secondary charging determination is necessary (step S908). If secondary charging determination is necessary, authentication process at the authentication section is entered (step S909).

Authentication process by the authentication section is illustrated in FIG. 17. In the figure, it is first determined whether authentication process is necessary (step S924), and if necessary, rapid authentication by the rapid authentication section of the power transmitting device is performed (step S925).

If the rapid authentication is successful, charging details is selected based on authentication information (step S926→S927). The charging details may be a personalized service, for example.

However, if the rapid authentication is not successful, authentication information of the portable electronic device is acquired (step S926→S928). Then, transaction identification information is generated and the power transmitting device requests authentication/billing proxy device to perform authentication (step S929). If the authentication is successful, the procedure proceeds to a process similar to that at step S927 (step S930→S927). Meanwhile, if the authentication is not successful, it is determined whether charging is possible only with primary charging determination (step S931), and the process terminates.

Referring back to FIG. 15, if secondary charging determination is not necessary or if authentication process by the authentication section is complete, the procedure proceeds to billing process by the billing section (step S910). Billing process by the billing section is illustrated in FIG. 18. In the figure, it is initially determined whether billing process is necessary (step S932), and if necessary, it is then determined whether payment by electronic money is necessary (step S933).

If payment by electronic money is necessary, the balance of electronic money is checked (step S933→S937). If payment by electronic money is found to be possible, charging details for payment by electronic money is selected (step S938→S939). The charging details may be fee settings, for example. Subsequently, payment is made by electronic money (step S933), and the process terminates.

On the other hand, if the check at step S937 shows that payment by electronic money is impossible or payment by electronic money is not necessary, it is determined whether the portable electronic device is already authenticated and proxy billing is possible (step S934). If proxy billing is possible, charging details to be executed for proxy billing is selected (step S934→S935). The charging details may be setting of fee, for example. Thereafter, the process terminates.

If proxy billing is impossible, operation such as stop of precedence charging is made (step S934 to S936), and the process terminates.

Returning to FIG. 15, the charging details as well as start of charging are notified to the portable electronic device (step S910→S911). Subsequently, charging is made (step S912). During charging, advertisements may be distributed, and/or rapid authentication key information may be acquired and transferred as required.

When separation of the portable electronic device from the power transmitting device is detected, or when charging is complete, the amount of transmitted power is calculated (step S913). Privilege such as addition of points is given as required (step S914). In the case of proxy billing, the amount of transmitted power is notified to the authentication/billing proxy device (step S915).

In FIG. 19, authentication process at the authentication/billing proxy device is executed as follows. When transaction identification information is notified from the power transmitting device or a request for authentication of identification information for a user or a portable electronic device is input, authentication process by the authentication/billing proxy device is started (step S1001). First, validity is determined based on authentication information (step S1002). Then, power transmitting device identification information, transaction identification information, and result of authentication are recorded (step S1003). Lastly, the authentication result is notified to the power transmitting device (step S1004).

In FIG. 20, billing process at the authentication/billing proxy device is performed as follows. When transaction identification information and the amount of transmitted electric power are notified from the power transmitting device, billing process at the authentication/billing proxy device is started (step S1101). It is first determined whether proxy billing will be made (step S1102), and if proxy billing is not made, the process directly terminates.

If proxy billing is to be made, determination is made as to whether the amount of received electrical power is also notified from the portable electronic device (step S1103). If the amount is notified, a fee to be charged is calculated based on the amount of transmitted power, the amount of received power and the user's contract (step S1103→S1104). Subsequently, the fee is matched against authentication record and recorded to the billing server (step S1104→S1105).

If the amount of received electrical power is not notified from the portable electronic device, a fee to be billed is calculated based on the amount of transmitted power and the user's contract (step S1103→S1107). Then, the fee is matched against authentication record and recorded to the billing server (step S1107→S1105).

Lastly, the fee is paid to the electrical power supplier and the user is billed the fee (step S1106).

With operations of the devices described above with reference to FIGS. 12 to 20, processing that can be realized in the system is as follows.

Charging may be started by a number of triggers. A power transmitting device may send beacon at regular intervals and a portable electronic device may send a request for starting charging in response to it, and/or the power transmitting device and the portable electronic device may detect that non-contact processing such as by FeliCa (a registered trademark) has been started and the portable electronic device may send a charging start request. Or, inversely, the power transmitting device may request start of charging to the portable electronic device. In either of the cases, both the portable electronic device and the power transmitting device confirm start of charging (S701 of FIG. 12).

Thereafter, the power transmitting device notifies electrical power supplier information (identification information for an electrical power supplier, identification information for the power transmitting device, and property information) and the version of the electrical power supplier's policy, and requests for user information (the user's identification information, identification information for the portable electronic device, and property information) and the user's policy (step S702 of FIG. 12).

The portable electronic device matches the electrical power supplier information and the version of the electrical power supplier's policy based on charging determination settings described in the user's policy, and makes primary charging determination for charging performed on the user's side. What is determined here may be availability of automatic charging, upper limit of monthly fee, limitation of electrical power supplier, limitation of power transmitting device, explicit permission by the user and the like that are included in charging determination settings of the user's policy (step S703 of FIG. 12).

If charging was made by the same power transmitting device as the previous time and authentication history information thereof is maintained, when the version of the user's policy of the previous charging corresponds with the version of the electrical power supplier's policy (i.e., time of version correspondence), primary charging determination can be omitted and result of the previous primary charging determination can be applied.

If it determines that charging is impossible in primary charging determination, the portable electronic device terminates the charging operation. If it does not determine that charging is impossible, it notifies some or all of the user information and the version of the user's policy selectively based on security settings to the power transmitting device. If the versions correspond with each other, it notifies it as well.

If the versions do not correspond, fee settings, billing method settings, and charging mode settings of the user's policy are notified to the power transmitting device (step S704 of FIG. 12).

The power transmitting device checks the user information and determines whether charging is possible based on the charging determination settings described in the electrical power supplier's policy. What is considered here may be availability of automatic charging, upper limit of monthly fee for when electrical power is supplied for free, limitation of users, limitation by portable electronic devices, property information (e.g., manufacturer and/or communication provider), explicit permission of an electrical power supplier and the like that are contained in the charging determination settings of the electrical power supplier's policy. Subsequently, determination of charging is performed by matching fee settings and billing method settings of the electrical power supplier's policy and the user's policy, and the result is made primary charging determination (step S705 of FIG. 12). If the power transmitting device is notified that the versions correspond with each other, primary charging determination at the electrical power supplier can be omitted and the result of the previous primary charging determination can be applied.

If the power transmitting device determines that charging is impossible in primary charging determination, then charging operation terminates. If it is not determined that charging is impossible and precedence charging policy of the electrical power supplier fits the user's policy, charging can be started in advance before secondary charging determination is made (step S706 of FIG. 12).

Then, necessity of secondary charging determination is determined. Secondary charging determination is required when the user or the portable electronic device is authenticated. If secondary charging determination is determined to be unnecessary, charging is initiated or continued (step S707 of FIG. 12).

In secondary charging determination, the user or the portable electronic device is authenticated according to the electric power supplier's policy. The power transmitting device performs authentication basically by acquiring authentication information (e.g., an electronic signature, a PIN code) from the portable electronic device (steps S708a and S708b of FIG. 12), and issuing identification information for proxy authentication/billing transaction, and inquiring the authentication/billing proxy device remotely located through an encrypted path (steps S709a and S709b of FIG. 12).

The authentication/billing proxy device authenticates the portable electronic device or the user based on authentication information and communicates the result to the power transmitting device. Here, the result of authentication is recorded along with identification information of the power transmitting device and transaction identification information for the benefit of subsequent billing process (see FIG. 19).

However, communication with a remote device may take time. For that reason, the power transmitting device incorporates a rapid authentication system as a mechanism for speeding up authentication process. Although description on it is omitted here as it will be discussed later, communication with an authentication/billing proxy device that is remotely located can be omitted. If rapid authentication fails, normal authentication procedure is followed (steps S708a and S708b of FIG. 12).

After rapid authentication or normal authentication is successfully made, the power transmitting device selects charging details based on authentication information according to the electrical power supplier's policy and the user's policy. For example, identification of an individual through authentication enables discount by point and/or free service to be provided as personalized services.

If authentication fails, the power transmitting device determines whether charging is possible only with result of primary charging determination. If it is determined that charging is impossible, precedence charging is stopped and the process terminates. However, if charging is possible, charging can be started or precedence charging can be continued still with the details of primary charging.

After determination by way of authentication is made as secondary charging determination, billing process is performed (step S710 of FIG. 12). If billing process is unnecessary, charging is started or precedence charging is continued.

Billing can be made with electronic money or proxy billing. Prepaid billing can be also supported by adding some processes to them.

If billing by electronic money is selected in both parties' policies, charging details (e.g., fee settings) for electronic money payment is selected and payment is made (step S711 of FIG. 12). This enables fees to be varied in accordance with billing methods.

In the case of proxy billing, charging details for proxy billing is selected. Billing is made after charging is complete (step S717 of FIG. 12).

If billing policies do not correspond with each other and there is no billing method, precedence charging is stopped and the process terminates.

After billing process ends, the power transmitting device notifies the selected charging details to the portable electronic device, and also starts charging or continues precedence charging (step S712 of FIG. 12).

During charging, communication such as advertisement distribution can be made to the portable electronic device (step S713 of FIG. 12). Also, at this point, if authentication is requested to the authentication/billing proxy device, the portable electronic device and the power transmitting device can acquire rapid authentication key information for the next and subsequent rapid authentications from the authentication/billing proxy device (steps S714a to S714c of FIG. 12).

When the portable electronic device is separated from the power transmitting device or the amount of charged electric power has reached a certain amount that is determined from a policy, charging is terminated (steps S715a and S715b of FIG. 12). Thereafter, the power transmitting device calculates the amount of transmitted power and gives privilege such as point addition to the user as necessary. Privilege information may be administrated by the power transmitting device or by an external device such as a proxy authentication/billing device.

If billing is made through proxy billing, the power transmitting device notifies the amount of transmitted power to the authentication/billing proxy device (step S716 of FIG. 12).

The portable electronic device also calculates the amount of received electrical power after it confirms termination of charging. When proxy billing is utilized and the portable electronic device is capable of communication, the portable electronic device can arbitrarily notify the amount of received power or duration of electrical power reception to the authentication/billing proxy device (step S718 of FIG. 12).

Lastly, the authentication/billing proxy device sums fees for charging utilization and bills the user and makes payment to the electrical power supplier (see steps S717, S719, S720 of FIG. 12 and FIG. 20).

(Second Electrical Charging System; Policy Matching, without Billing)

Operation of the second electrical charging system will be described with reference to FIGS. 21 to 23. These figures show operations of the approach detecting function 111, the power transmission determining function 112 and the power transmitting device control function 113 that are included in the power transmitting device 1, as well as operations of an approach detecting function 211, a power receiving determining function 212, and a power receiving device control function 213 that are included in the portable electronic device 2.

Figure 21:
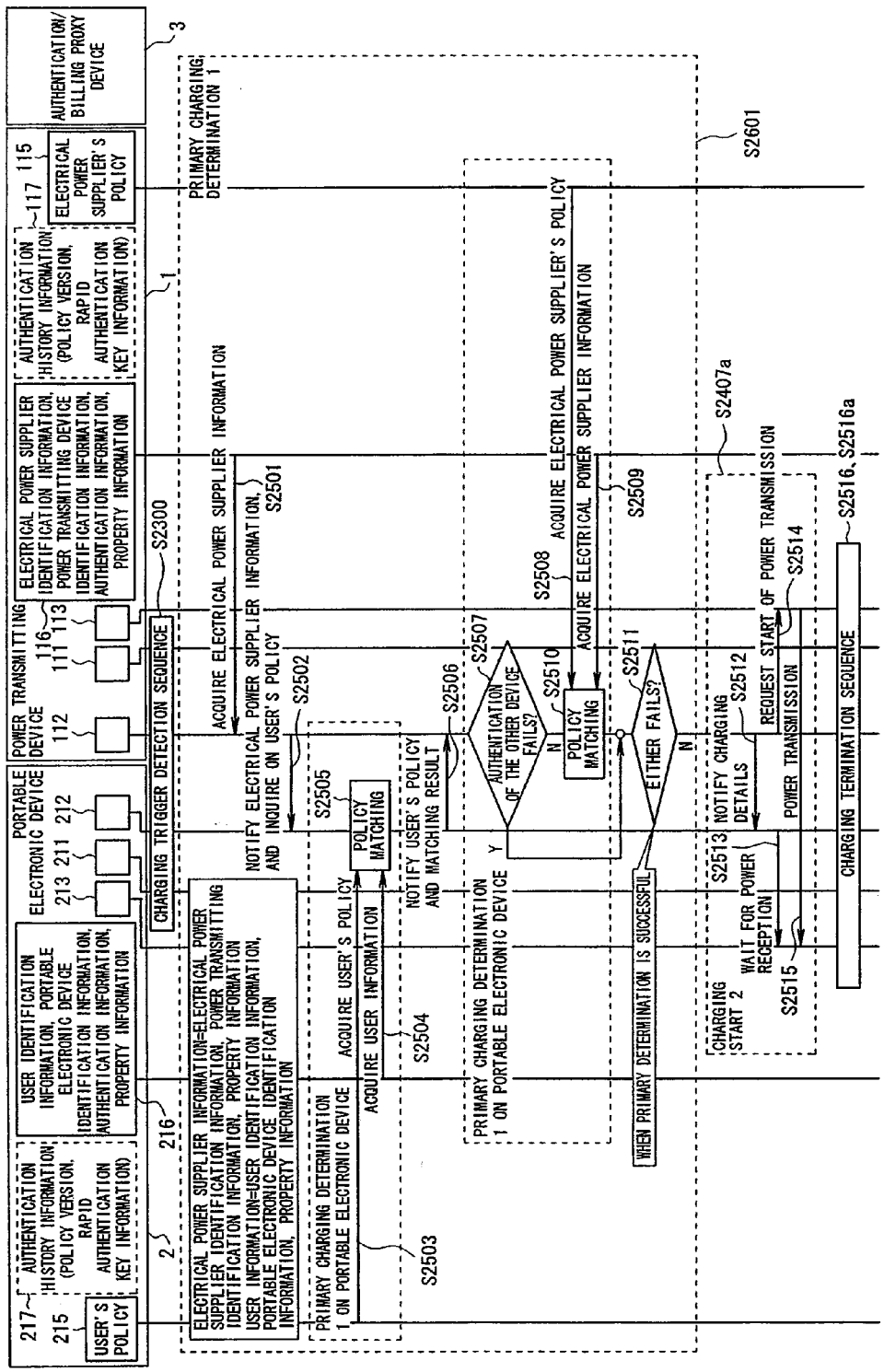
FIG. 21 is a sequence diagram showing operation of the second electrical charging system.

In FIG. 21, after the sequence of detecting a charging start trigger (any one of processes shown in FIGS. 4 to 6) described above is performed (S2300), the power transmission determining function 112 acquires electrical power supplier information (S2501), notifies the acquired information to the power receiving determination function 212 and also inquires about the user's policy (S2502).

Then, the power receiving determination function 212 acquires the user's policy and user information (S2503 and S2504) and matches policies (S2505). The power receiving determination function 212 notifies the result of matching to the power transmission determining function 112 (S2506).

The power transmission determining function 112 determines if authentication of the other device failed (S2507), and if the authentication did not fail, it acquires the electrical power supplier policy and electrical power supplier information (S2508 and S2509), and matches polices (S2510). On the other hand, if authentication of the other party failed, policy matching is not performed.

If neither of authentication of the other party nor policy matching failed, it is determined that primary determination is successful and the power transmission determining function 121 notifies charging details (e.g., the amount of electrical power available for charging) to the power receiving determining function 212 (S2511 and S2512). Upon receiving the notification, charging determining function 121 outputs power reception stand-by signal (S2513). The power transmission determining function 112 outputs a request for starting power transmission to the power transmitting device control function 113 (S2514), and the power transmitting device control function 113 transmits power to the power receiving device control function 213 (S2515). With this power transmission, the power source, that is, the high-speed bulk electricity storage module is charged. Thereafter, the sequence of charging termination in FIG. 7 or FIG. 8 is entered (S2516).

Figure 22:
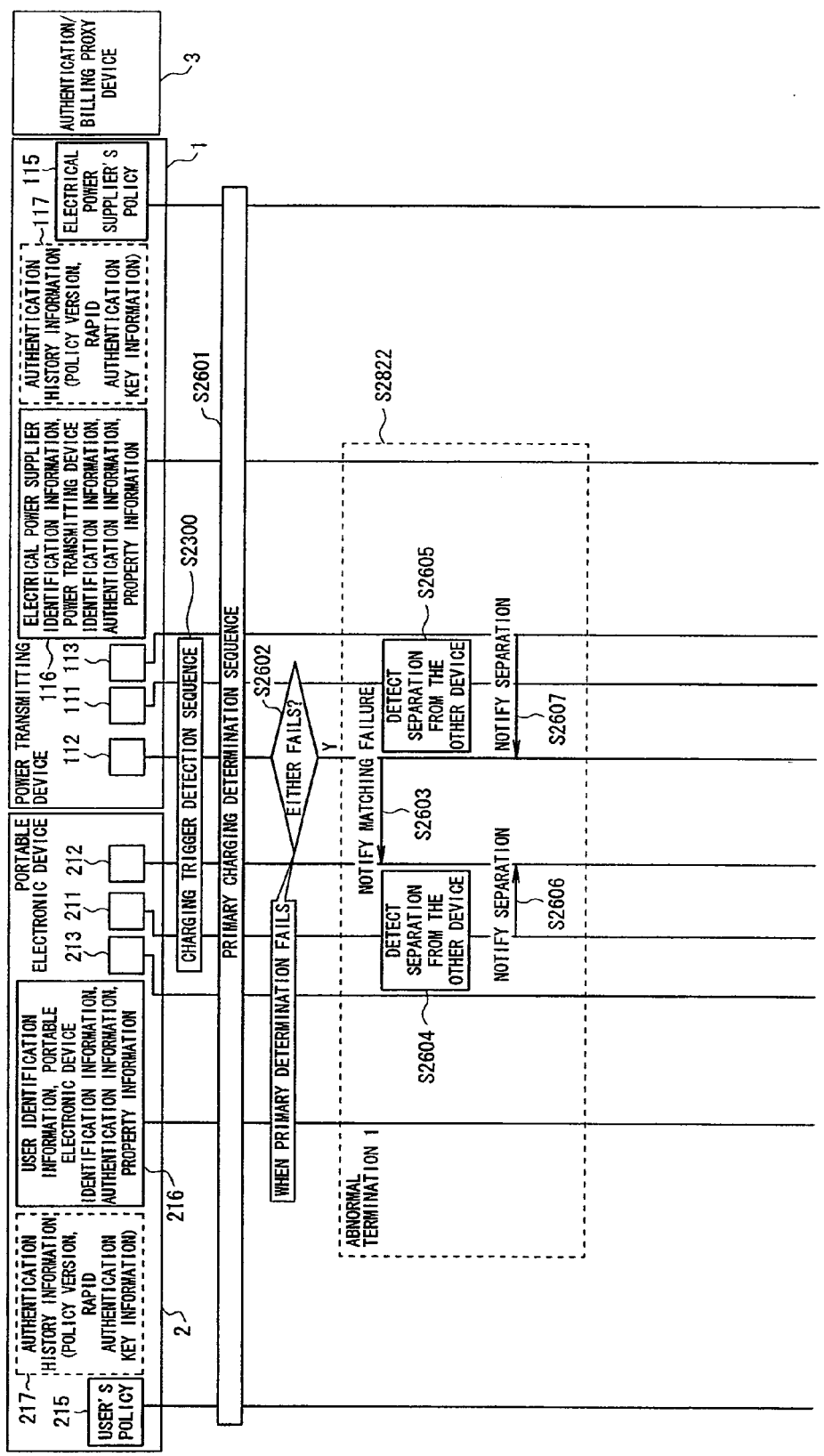
FIG. 22 is a sequence diagram showing operation where the primary determination processing is not succeeded in FIG. 21.

When primary determination process is not successful, operations shown in FIG. 22 will be performed. In the figure, if any policy matching fails, it is determined that primary determination process was not successful, and the power transmission determining function 112 sends notification of matching failure to the power receiving determining function 212 (S2602 and S2603). Subsequently, when the approach detecting function 211 of the portable electronic device 2 and the approach detecting function 111 of the power transmitting device 1 detect separation from each other (S2604 and S2605), the approach detecting function 211 and the approach detecting function 111 output notification of separation to the power receiving determining function 212 and power transmission determining function 112, respectively (S2606 and S2607).

Figure 23:
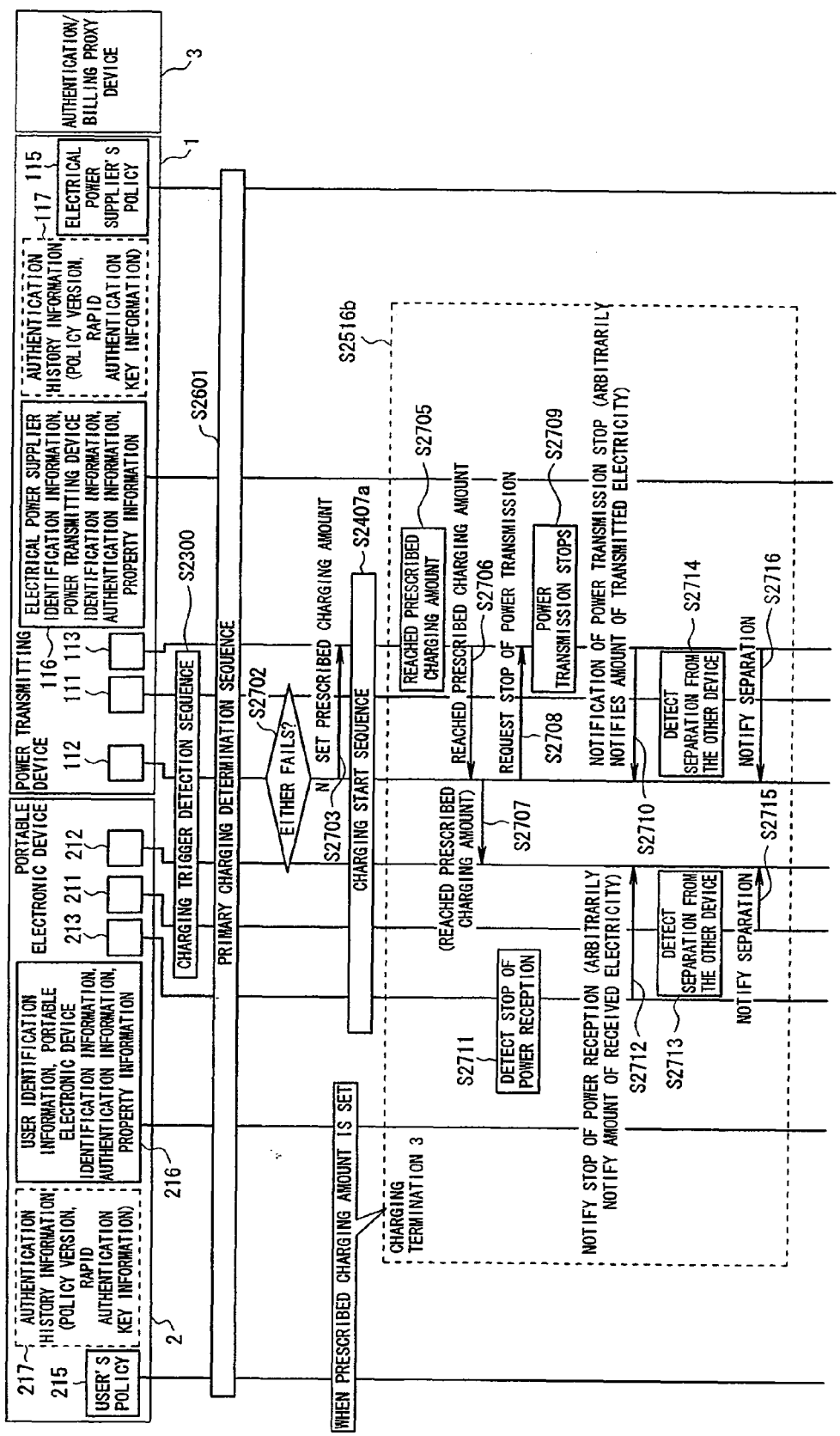
FIG. 23 is a sequence diagram showing operation where the regulated amount of charging is set.

When a prescribed charging amount is to be set, operations as shown in FIG. 23 will be performed. In the figure, if neither of authentication of the other party nor policy matching failed and the power transmission determining function 112 has notified a prescribed charging amount to the power transmitting device control function 113 (S2702 and S2703), a charging start sequence similar to FIG. 21 will be entered (S2407a). Thereafter, when the power transmitting device control function 113 determines that the prescribed amount has been reached (S2705), it outputs notification indicating it (S2706). The notification is sent to the power receiving determining function 212 via the power transmission determining function 112 (S2707).

Subsequently, the power transmission determining function 112 sends a request for stopping power transmission to the power transmission control function 113 (S2708), and in response to it, the power transmission control function 113 stops power transmission (S2709). The power transmission control function 113 sends power transmission stop notification to the power transmission determining function 112 (S2710). The power receiving device control function 213 detects stop of power reception (S2711), and outputs power reception stop notification to the power receiving determining function 212 (S2712).

When the approach detecting function 211 of the portable electronic device 2 and the approach detecting function 111 of the power transmitting device 1 detect separation from each other (S2713 and S2714), the approach detecting functions 211 and 111 output notification of separation to the power receiving determining function 212 and the power transmission determining function 112, respectively (S2715 and S2716).

(Third Electrical Charging System: Speed-Up of Policy Matching, without Billing)

Figure 25:
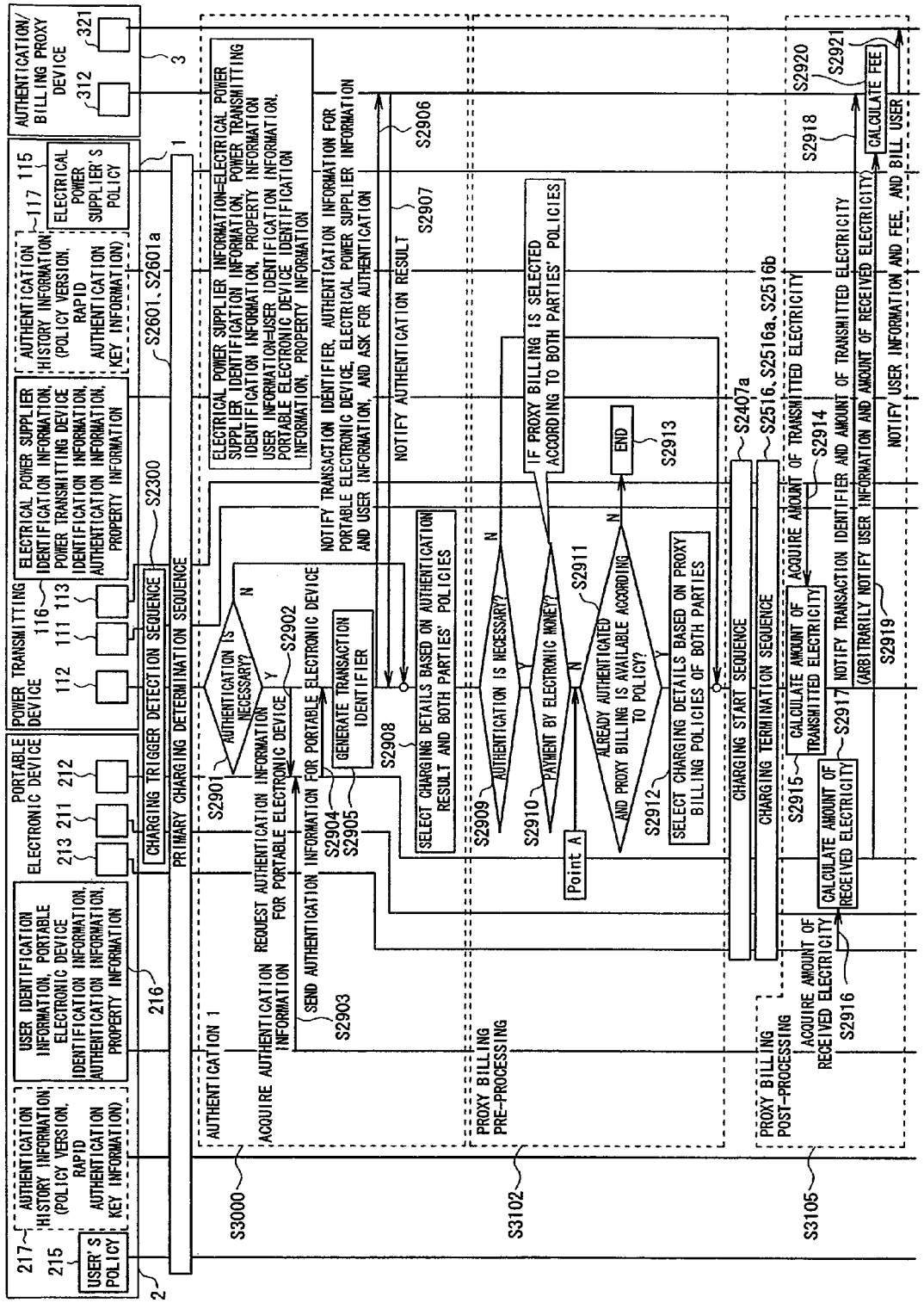
FIG. 25 is a sequence diagram showing operation where proxy billing processing is executed by the authentication/billing proxy device.
Figure 26:
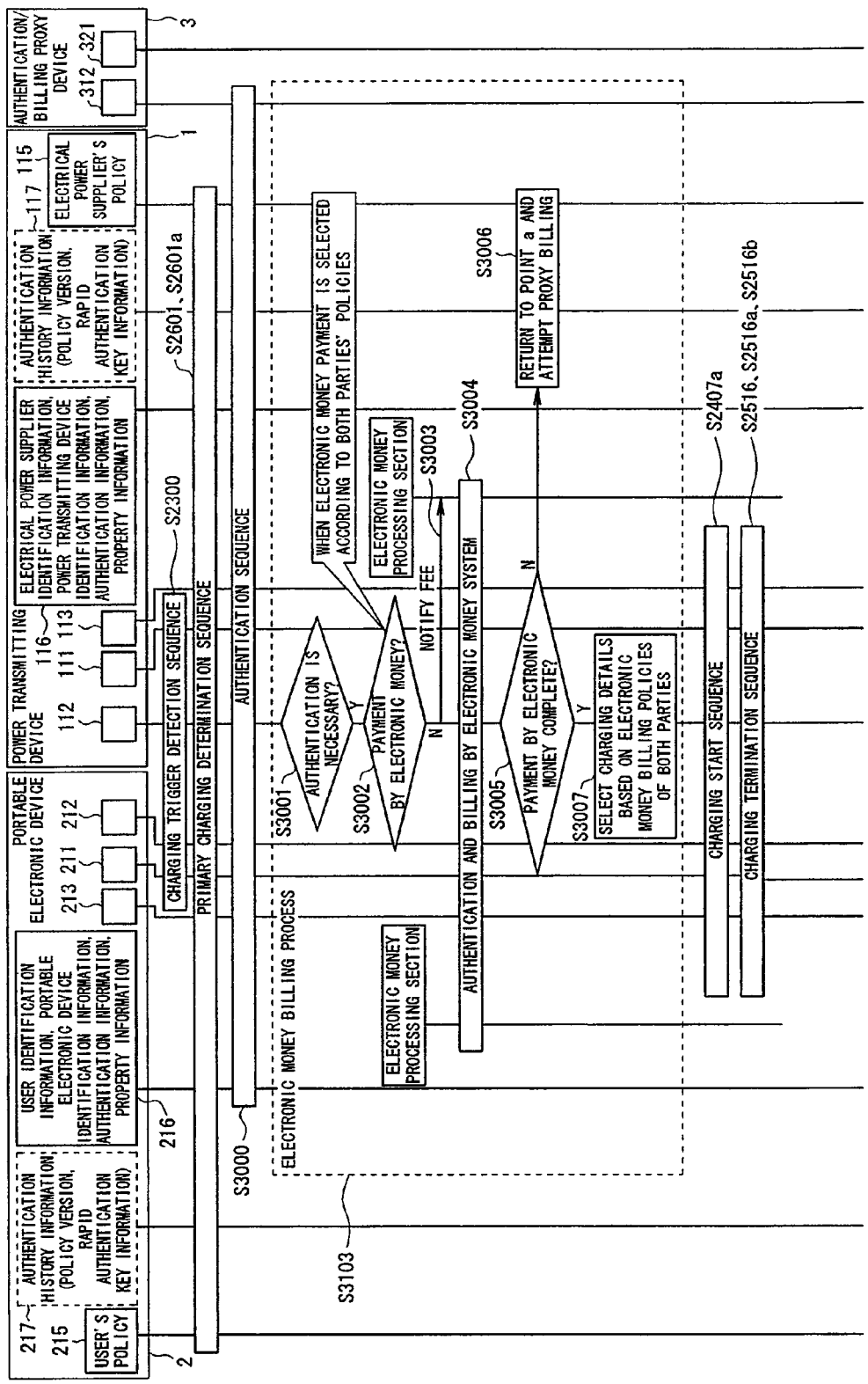
FIG. 26 is a sequence diagram showing operation where billing processing is executed by electric money payment.

Operation of the third electrical charging system will be described with reference to FIGS. 24 to 26. These figures illustrate operations of the approach detecting function 111, power transmission determining function 112, and power transmitting device control function 113 that are included in the power transmitting device 1, and operations of the approach detecting function 211, power receiving determining function 212, and power receiving device control function 213 included in the portable electronic device 2. FIGS. 25 and 26 also illustrate operations of the portable electronic device authentication function 312 and billing function 321 of the authentication/billing proxy device 3.

Figure 24:
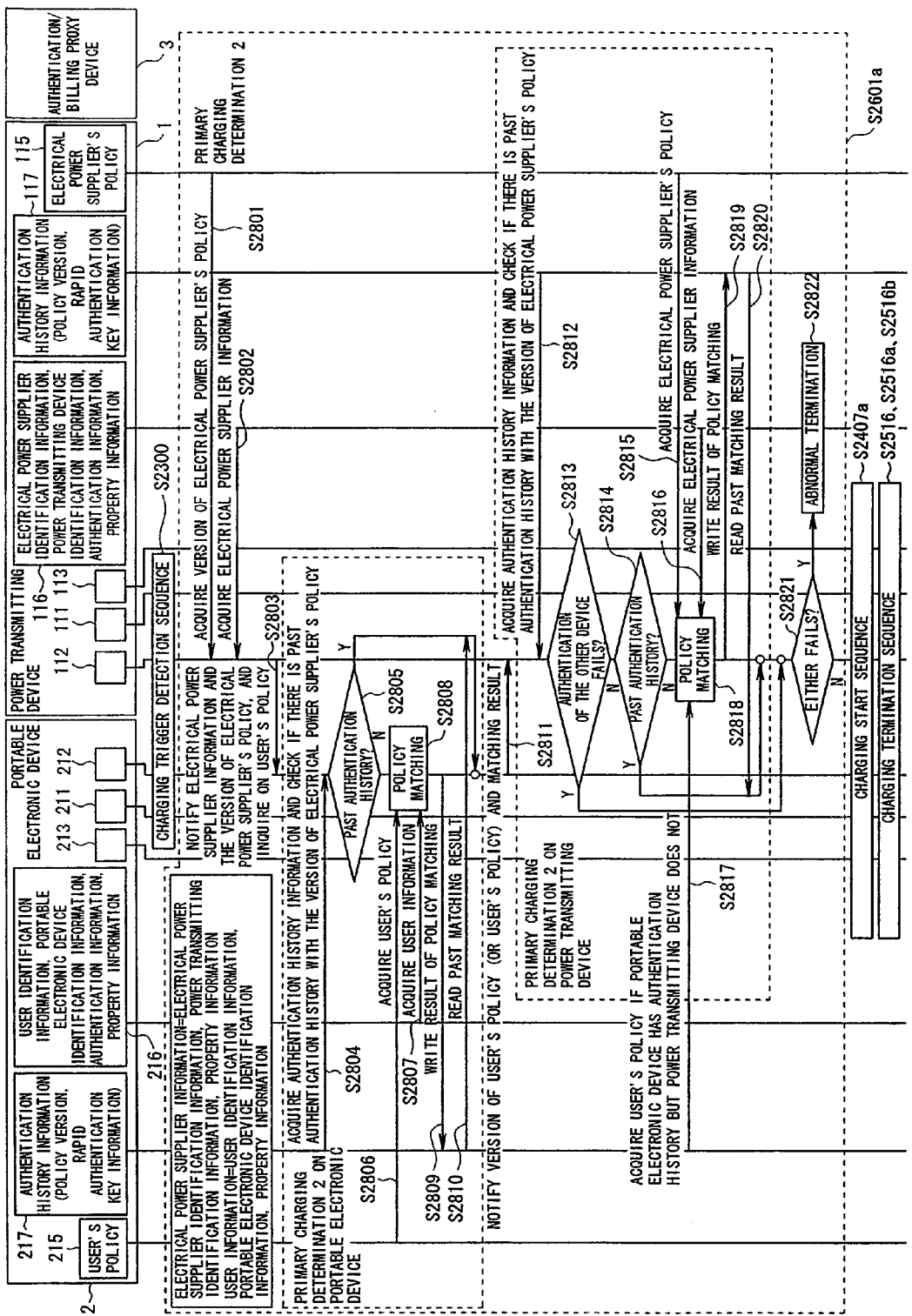
FIG. 24 is a sequence showing operation of the third electrical charging system.

In FIG. 24, after the sequence of detecting a charging start trigger described above (any one of processes shown in FIGS. 4 to 6) is performed (S2300), the power transmission determining function 112 acquires the version of the electrical power supplier's policy and electrical power supplier information (S2801 and S2802), and notifies them to the power receiving determining function 212 and also requests for the user's policy (S2803).

Upon receiving the notification, the power receiving determining function 212 acquires authentication history information and checks if there is previous authentication history based on the version of electrical power supplier's policy (S2804). If there is no past authentication history, the power receiving determining function 212 acquires the user's policy and user information (S2805→S2806, S2807) and matches policies (S2808). Matching here is made using the electrical power supplier information rather than electrical power supplier's policy. The power receiving determining function 212 writes the result of policy matching to authentication history information (217) along with the version of the electrical power supplier's policy (S2809). If there is past matching history, it is read from authentication history information (217) as the result of policy matching (S2810).

After generating or acquiring the policy matching result, the power receiving determining function 212 notifies the version of user's policy or the user's policy as well as the policy matching result to the power transmission determining function 112 (S2811).

Upon receiving the notification, the power transmission determining function 112 acquires authentication history information, and checks to see if there is past authentication history based on the version of the electrical power supplier's policy (S2812). If the check shows that authentication of the other party does not fail and there is no past authentication history, the power transmission determining function 112 acquires the electrical power supplier's policy and electrical power supplier information (S2813, S2814→S2815, S2816), and matches policies (S2818). In this case, if the power transmitting device does not maintain authentication history, or if it maintains authentication history but either of the version of user's policy or that of electrical power supplier's policy is different, it acquires the user's policy from the portable electronic device and matches it against the electrical power supplier's policy (S2817, S2818). The power transmission determining function 112 then writes the result of policy matching to authentication history information (117) (S2819). If there is past matching history, it is read from authentication history information (117) as the policy matching result (S2820). In a case authentication of the other device failed or if there is past authentication history, policy matching is not performed.

Neither of authentication of the other device nor policy matching fails (S2820), the sequence of charging start is entered as in FIG. 23 (S2821→S2407a). Thereafter, charging will terminate according to any of sequences shown in FIGS. 6 to 8 (S2516, S2516a, and S2516b). If authentication of the other device failed or policy matching failed, the process is abnormally terminated as in FIG. 22 (S2822).

(Expansion of the Second and Third Electrical Charging Systems: When Billing is Involved)

The following will describe with reference to FIG. 25 a case where proxy authentication/billing process by the authentication/billing proxy device is performed. In the figure, after the sequence of detecting a charging start trigger described above (any one of processes shown in FIGS. 4 to 6) is performed (S2300), the sequence of primary charging determination (S2601 and S2601a) described above with reference to FIG. 21 or 24 is performed.

If authentication is required thereafter, the power transmission determining function 112 requests from the power receiving determining function 212 for authentication information of the portable electronic device (S2901→S2902). Upon receiving the request, the power receiving determining function 212 acquires the authentication information and sends the same to the power transmission determining function 112 (S2903 and S2904).

After receiving the authentication information, the power transmission determining function 112 generates a transaction identifier that identifies the charging operation of interest (S2905). The power transmission determining function 112 notifies the generated transaction identifier to the portable electronic device authentication function 312 of the authentication/billing proxy device together with authentication information for the portable electronic device, electrical power supplier information, and user information, and requests it to perform authentication (S2906).

Upon receiving the notification, the portable electronic device authentication function 312 performs authentication and sends the result to the power transmission determining function 112 (S2907).

If it receives the notification or if authentication is not necessary, the power transmission determining function 112 selects charging details based on the authentication result and both parties' policies (S2908). The charging details may be "charging is allowed if the user has a phone from a certain cellular phone manufacturer", which is agreed upon in the policies of both parties. Although the authentication/billing proxy device and the power transmitting device are separate here, they can be integrated into one device depending on the size of the system.

Then, if billing is necessary and payment is not made by electronic money, and further the devices have been already authenticated and proxy of billing is possible according to policy, the power transmission determining function 112 selects charging details based on proxy billing policies of both parties (S2909→S2910→S2911→S2912). The charging details may be "the user can charge the device for 10 yen per charge" which is agreed upon in the parties' policies, for example. If billing is required and payment is not made by electronic money, but the devices are already authenticated and billing proxy according to policies is not possible, the process terminates (S2909→S2910→S2911→S2913).

If selection of charging details has ended or billing is not necessary, the sequence of starting charging (S2407a) will be entered that was described above with reference to FIG. 21. Then, the sequence of terminating charging is entered that has been described above with reference to FIG. 7, 8, or 23 (S2516, S2516a, S2516b).

The power transmission determining function 112 then acquires the amount of transmitted power and calculates the same (S2914 and S2915). The power receiving determining function 212 also acquires the amount of received power and calculates the same (S2916 and S2917).

Thereafter, the power transmission determining function 112 notifies the transaction identifier and the amount of transmitted power to the portable electronic device authentication function 312 (S2918). The power receiving determining function 212 arbitrarily notifies user information and the amount of received power to the portable electronic device authentication function 312 (S2919). Upon receiving them, the portable electronic device authentication function 312 calculates the fee (S2920) and notifies user information and the fee to the billing function 321 (S2921). In response, billing is made by the billing function 321.

The following will describe with reference to FIG. 26 a case where billing process with electronic money payment is performed. In the figure, after the sequence of detecting a charging start trigger described above (any one of processes shown in FIGS. 4 to 6) is performed (S2300), the sequence of primary charging determination described above with FIG. 21 or 24 is performed (S2601 and S2601a). Subsequently, the authentication sequence described with FIG. 25 is performed (S3000).

Then, if billing is necessary and electronic money payment is selected in accordance with both parties' policies, the power transmission determining function 112 notifies the fee to the electronic money processing section (S3001→S3002→S3003). And authentication and billing process by an electronic money system is made (S3004).

If payment by electronic money is not complete, the procedure returns to point A in FIG. 26 and executes proxy billing (S3005→S3006). If payment by electronic money is complete, charging details based on electronic money billing policies of both parties is selected (S3005→S3007).

Figure 8:
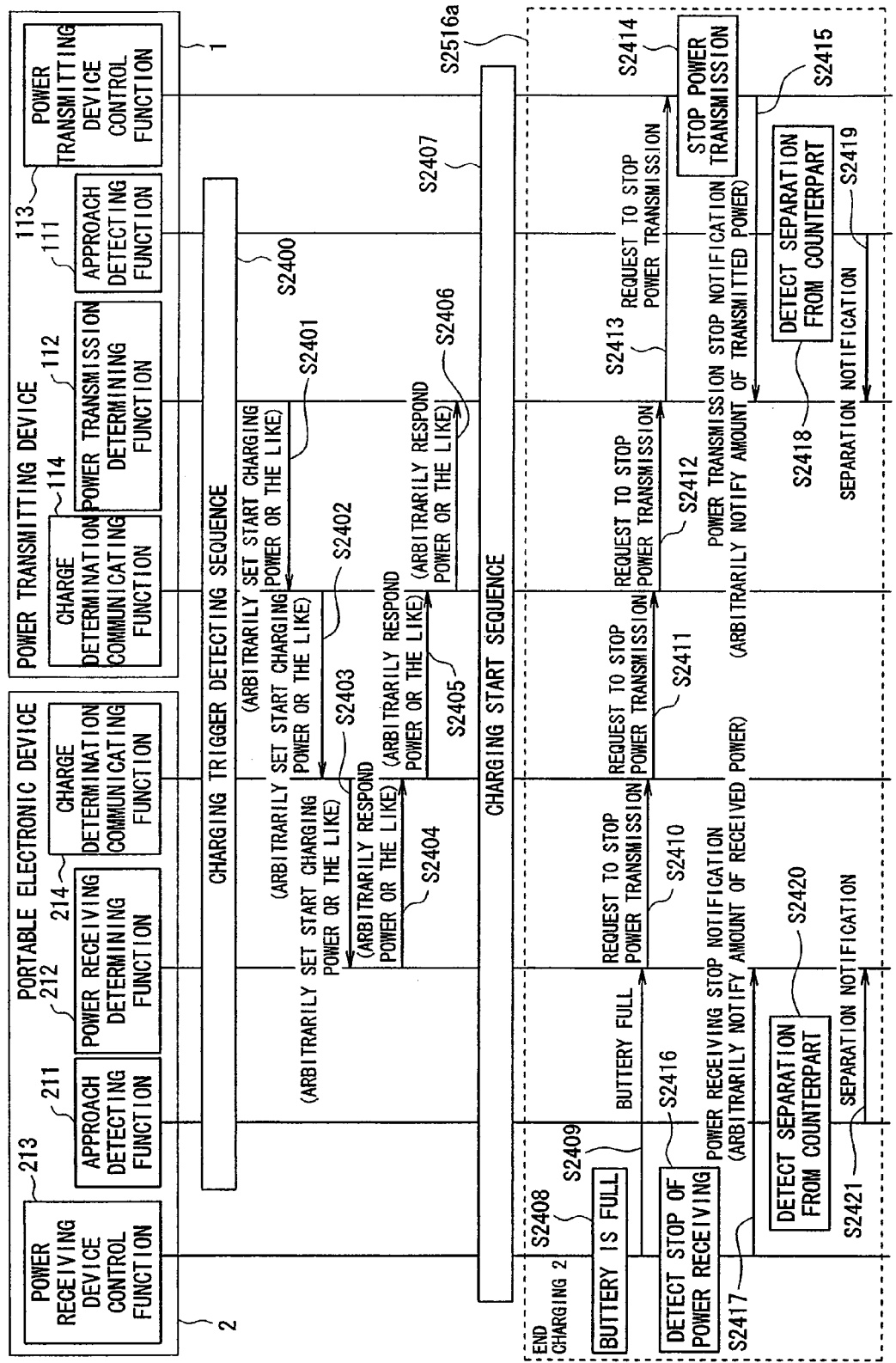
FIG. 8 is a sequence diagram showing processing among functions in a charged to full state.

Thereafter, the procedure proceeds to the charging start sequence described with FIG. 21 (S2704a), and the charging termination sequence described with FIG. 7, 8 or 23 (S2516, S2516a, S2516b).

(The Fourth Electrical Charging System: Precedence Charging)

Figure 27:
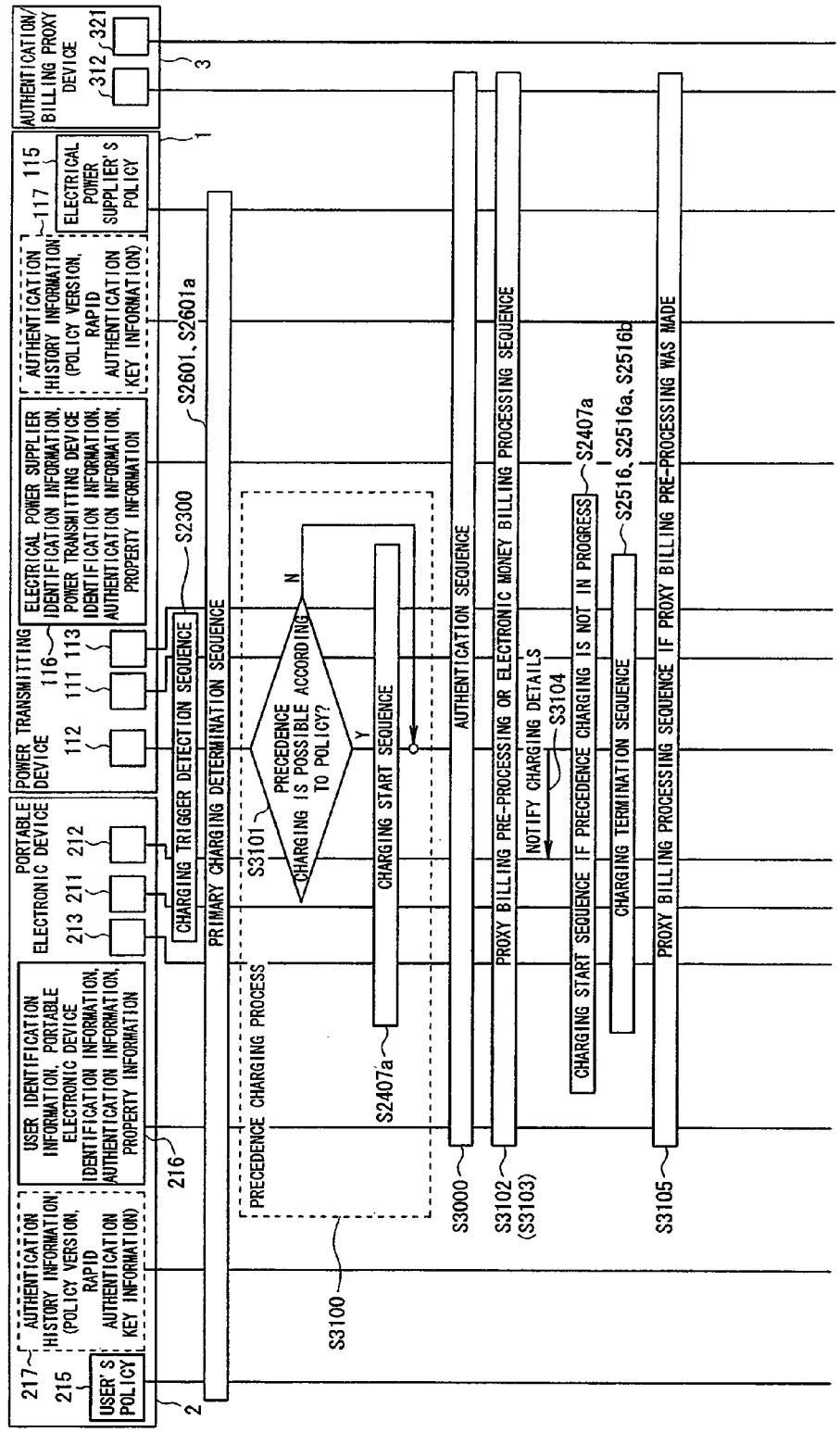
FIG. 27 is a sequence diagram showing operation of the fourth electrical charging system.

Operation of the fourth electrical charging system will be described with reference to FIG. 27. The figure illustrates operations of the approach detecting function 111, power transmission determining function 112, and power transmitting device control function 113 that are included in the power transmitting device 1, operations of the approach detecting function 211, power receiving determining function 212, and power receiving device control function 213 that are included in the portable electronic device 2, and operations of the portable electronic device authentication function 312 and billing function 321 of the authentication proxy device 3.

In the figure, after the sequence of detecting a charging start trigger described above (any one of processes shown in FIGS. 4 to 6) is performed (S2300), the primary charging determination sequence described with FIG. 21 or 24 is performed (S2601 and S2601a).

Subsequently, the power transmission determining function 112 determines whether precedence charging is possible in accordance with policies (S3101), and if precedence charging is possible, the procedure proceeds to the sequence of starting charging described above with FIG. 21 prior to authentication and billing, which are time-consuming processes (S2407a).

Further, after proceeding to the authentication sequence, which was described with FIG. 25, (S3000), the sequence of proxy billing pre-processing (S3102) described above with FIG. 25 or electronic money billing described with FIG. 26 (S3102) is performed.

Further, the power transmission determining function 112 notifies the charging details to the power receiving determining function 212 (S3104), and if precedence charging (S3100) is not being performed, the procedure proceeds to the charging starting sequence, which was described with FIG. 21, (S2407a).

Subsequently, the procedure proceeds to the charging termination sequence (S2516, S2516a, S2516b), which was described with reference to FIG. 7, 8 or 23. If proxy billing pre-processing (S3102) is performed, the procedure proceeds to the sequence of proxy billing post-processing (S3105), which was described with reference to FIG. 25.

(Fifth Electrical Charging System: Rapid Authentication).

Figure 28:
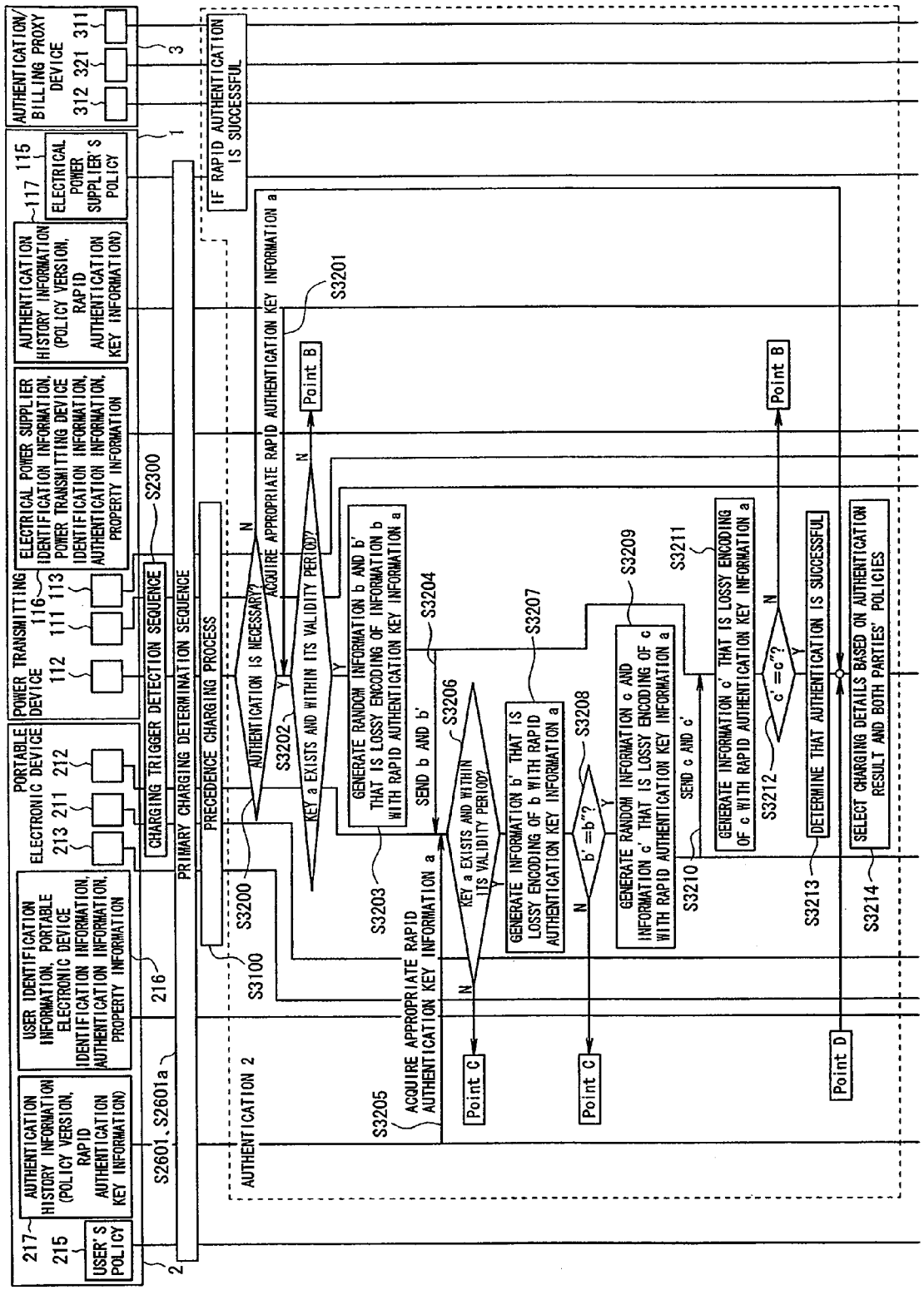
FIG. 28 is a sequence diagram showing operation where rapid authentication is succeeded in the fifth electrical charging system.
Figure 29:
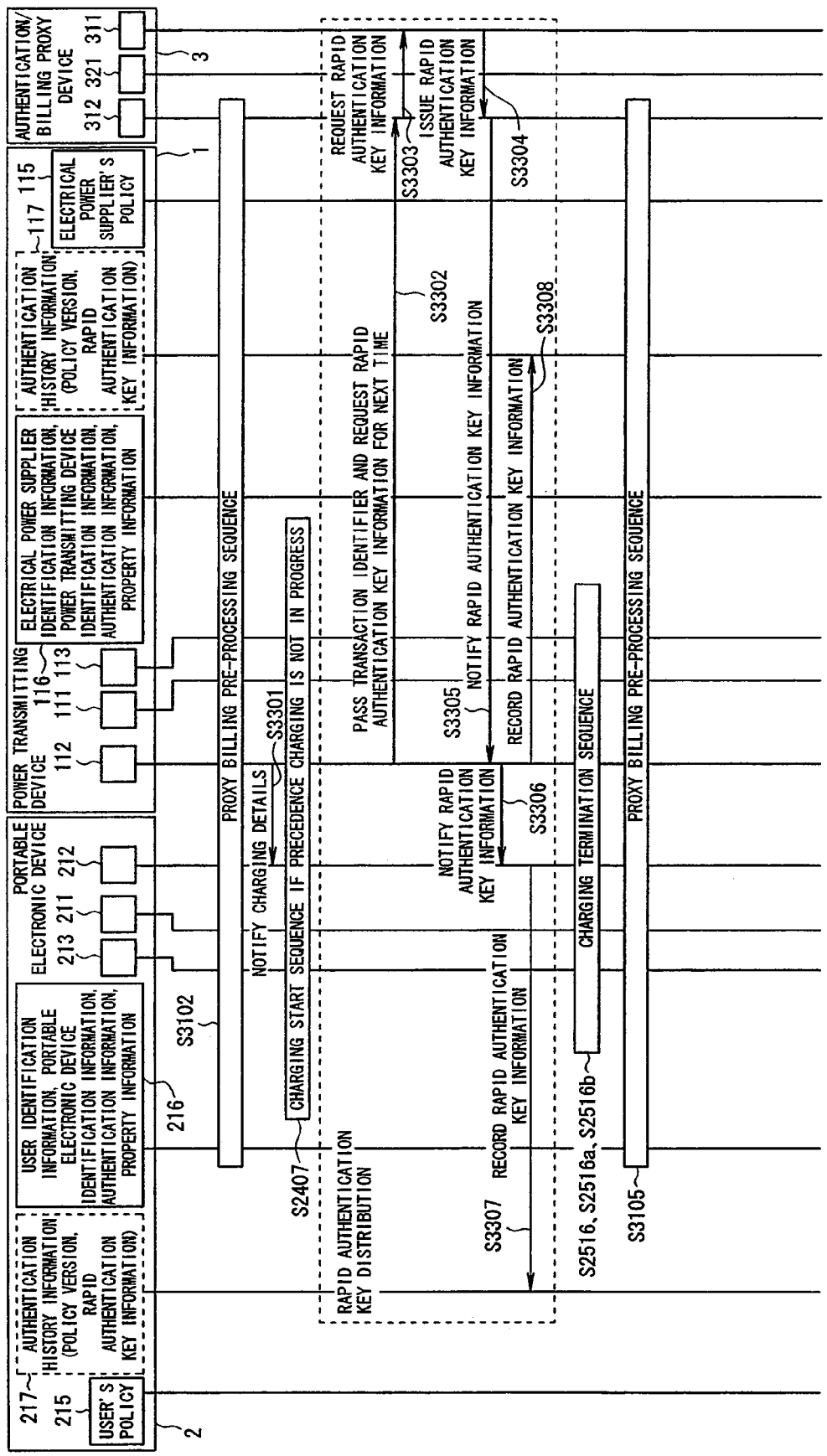
FIG. 29 is a sequence diagram showing operation where rapid authentication is succeeded in the fifth electrical charging system.
Figure 30:
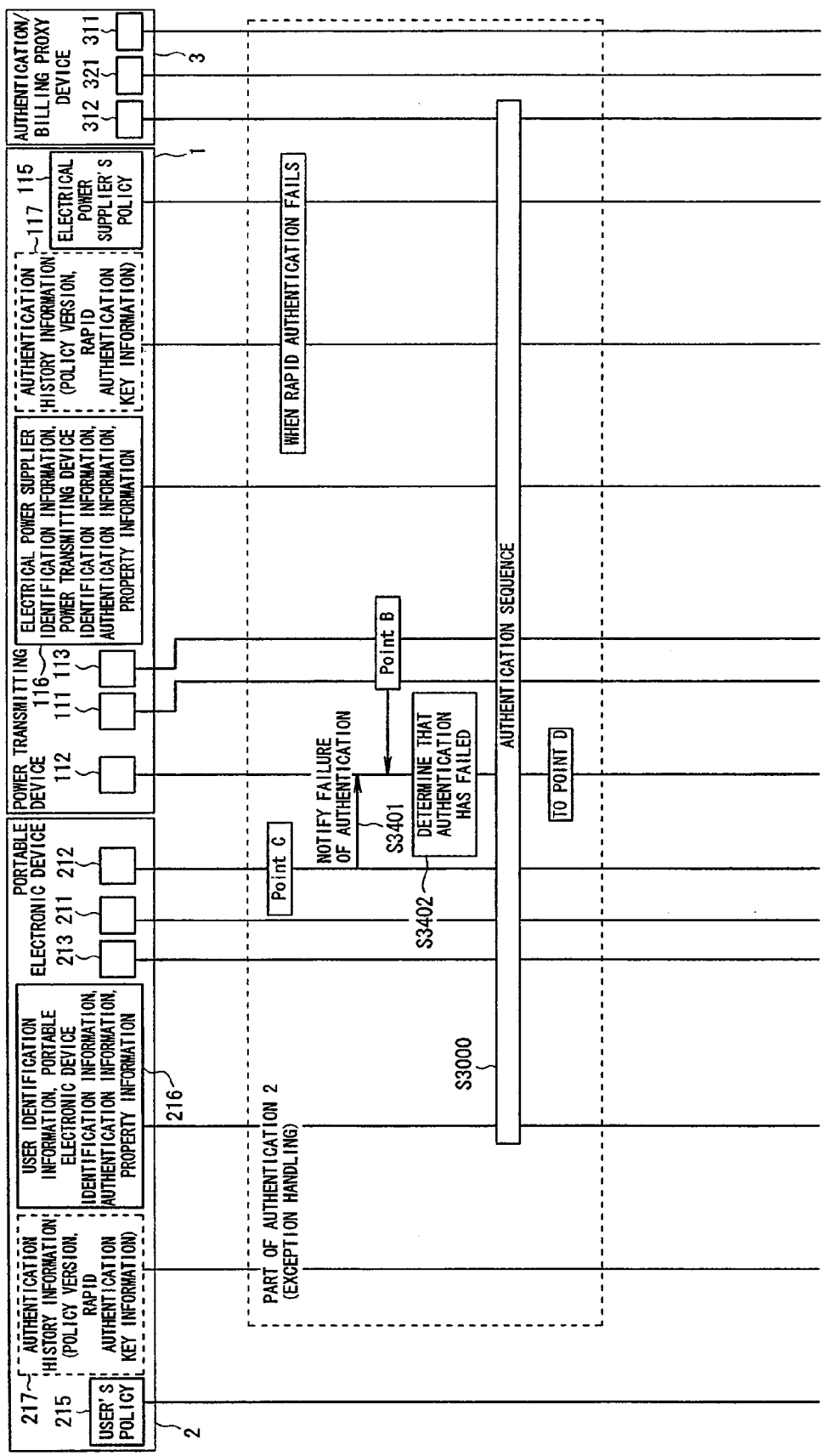
FIG. 30 is a sequence diagram showing operation where rapid authentication is not succeeded in the fifth electrical charging system.

Operation of the fifth electrical charging system will be described with reference to FIGS. 28 to 30. These figures show operations of the approach detecting function 111, power transmission determining function 112, and power transmitting device control function 113 that are included in the power transmitting device 1, operations of the approach detecting function 211, power receiving determining function 212, and power receiving device control function 213 that are included in the portable electronic device 2, and operations of the rapid authentication key information issuance function 311, portable electronic device authentication function 312, and billing function 321 that are included in the authentication proxy device 3. FIGS. 28 and 29 illustrate operation for when rapid authentication is successful, whereas FIG. 30 illustrates operation for when rapid authentication is not successful.

In FIG. 28, after the sequence of detecting a charging start trigger described above (any one of processes shown in FIGS. 4 to 6) is performed (S2300), the primary charging determination sequence, which was described with reference to FIG. 21 or 24, is performed (S2601 and S2601a). Further, precedence charging process, which was described with FIG. 27, is performed (S3100).

The power transmission determining function 112 determines whether authentication is necessary (S3200), and if necessary, it searches authentication history information (117) for appropriate rapid authentication key information a and retrieves the same if it exists (S3201). If key information a exists and it is within a certain time limit, the power transmission determining function 112 generates random information b and information b' that is lossy encoding of information b with rapid authentication key information a (S3202→S3203). The power transmission determining function 112 sends information b and information b' to the power receiving determining function 212 (S3204).

Upon obtaining information band information b', the power receiving determining function 212 searches authentication history information (217) for appropriate rapid authentication key information a, and retrieves the same if it exists (S3205). If key information a exists and it is within a certain time limit, the power receiving determining function 212 applies lossy encoding to random information b with rapid authentication key information a to generate information b" (S3206→S3207). If the information b" generated and information b' are identical, it is determined that the power transmitting device is the same device as the previous authentication and charging. Thereafter, the power receiving determining function 212 generates random information c and information c' that is lossy encoding of information c with rapid authentication key information a (S3208→S3209). The power receiving determining function 212 then sends information c and information c' to the power transmission determining function 112 (S3210).

Upon obtaining information c and information c', the power transmission determining function 112 applies lossy encoding to information c with rapid authentication key information a to generate information c" (S3211). If information c" generated and information c' are identical, it can be determined that the portable electronic device is the same device as the previous authentication and charging, and thus both the devices can determine that the other device is the same as the previous charging, and it is thus determined that authentication is successful (S3212→S3213). And the power transmission determining function 112 selects charging details based on the authentication result and both parties' policies (S3214).

Turning to FIG. 29, proxy billing pre-processing described above with reference to FIG. 25 is performed (S3102). Thereafter, the power transmission determining function 112 notifies charging details to the power receiving determining function 212 (S3301), and if precedence charging process (S3100) is not being performed, the charging start sequence described above with FIG. 7 is entered (S2407).

Then, the power transmission determining function 112 notifies a transaction identifier to the portable electronic device authentication function 312 and requests rapid authentication key information for the next authentication (S3302). Upon receiving the notification, the portable electronic device authentication function 312 requests rapid authentication key information to the rapid authentication key information issuance function 311 (S3303).

Upon receiving the request, the rapid authentication key information issuance function 311 issues rapid authentication key information and sends the same to the portable electronic device authentication function 312 (S3304). After receiving the rapid authentication key information, the portable electronic device authentication function 312 notifies rapid authentication key information a' and its validity period to the power transmission determining function 112 (S3305).

Upon receiving the rapid authentication key information a' and its validity period, the power transmission determining function 112 notifies the power receiving determining function 212 of rapid authentication key information a' and its validity period (S3306). Upon receiving rapid authentication key information a' and its validity period, the power receiving determining function 212 records them (S3307). The power transmission determining function 112 also records the rapid authentication key information a' and its validity period (S3308).

Thereafter, the charging termination sequence described above with FIGS. 6 to 8 (S2516, S2516a, and S2516b) is entered, and lastly, the sequence of proxy billing post-processing, which was described with FIG. 25, is followed (S3105).

Meanwhile, if rapid authentication is not successful, operations shown in FIG. 30 will be performed. At the power receiving determining function 212, if key information a does not exist or key information a is not within a certain time limit (see S3206 of FIG. 28), or information b" and information b' are not identical (see S3208 of FIG. 28), the power receiving determining function 212 notifies failure of authentication to the power transmission determining function 112 (S3401).

When it receives the notification, the power transmission determining function 112 determines that authentication failed (S3402). If key information a does not exist or it is not within a certain time limit at the power transmission determining function 112 (see S3202 of FIG. 28), or if information c" and information c' are not identical (see S3212 of FIG. 28), the power transmission determining function 112 also determines that authentication failed (S3402).

Then, after the authentication sequence described above with FIG. 25 is performed (S3000), charging details is selected based on the authentication result and both parties' policies (S3214 of FIG. 28). Subsequent operation is similar to that described above with reference to FIG. 29.

Thus, it is possible to reduce burden on users of caring about charging by means of high-speed charging that is performed between the portable electronic device and the power transmitting device in non-contact operations other than for the purpose of charging.

Moreover, by using charging policies of the user of the portable electronic device and the electrical power supplier in charging determination, detailed fee settings and/or security settings is possible and flexible charging, authentication, and billing are enabled without obtaining explicit permission of charging from the user each time. Further, longer charging time can be secured within a short non-contact processing operation of one to three seconds, thanks to omission of policy transmission and matching process that are enabled by matching of policy versions, precedence charging prior to authentication that is enabled by separation of charging determination into two levels of primary charging determination and secondary charging determination, and rapid authentication by means of rapid authentication key information.

(Rapid Authentication System)

A rapid authentication system is a mechanism that performs authentication in a short time by not making an inquiry to an authentication/billing proxy device at second and subsequent authentication if previous authentication terminated successfully through an inquiry to a remotely located authentication/billing proxy device.

Figure 31:
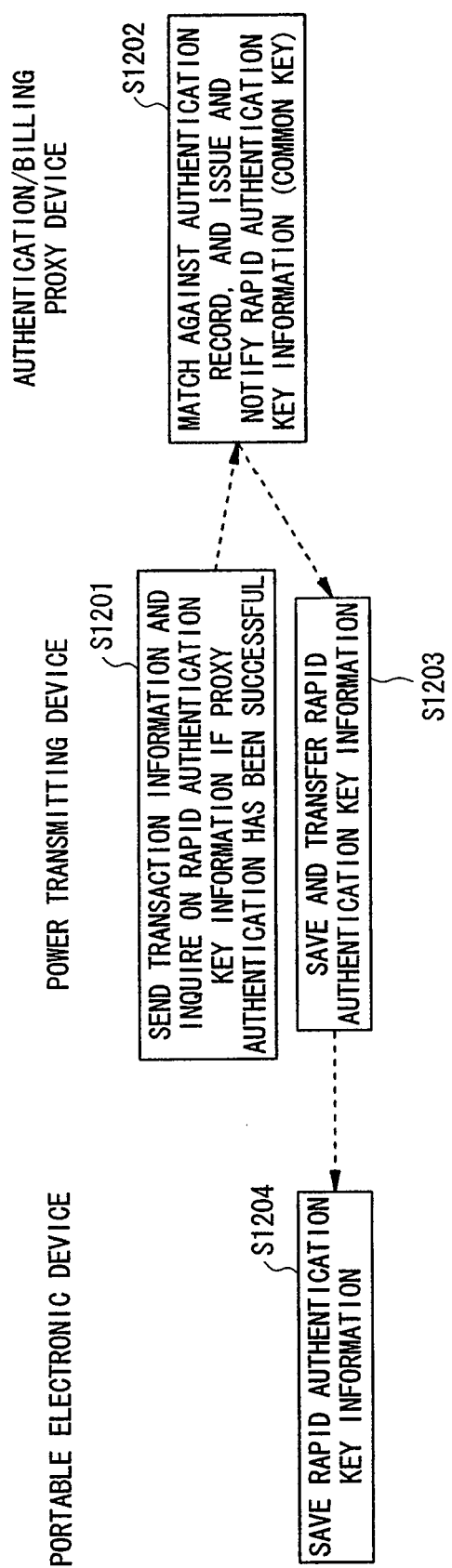
FIG. 31 is a diagram showing a flow of distributing rapid authentication key information.
Figure 32:
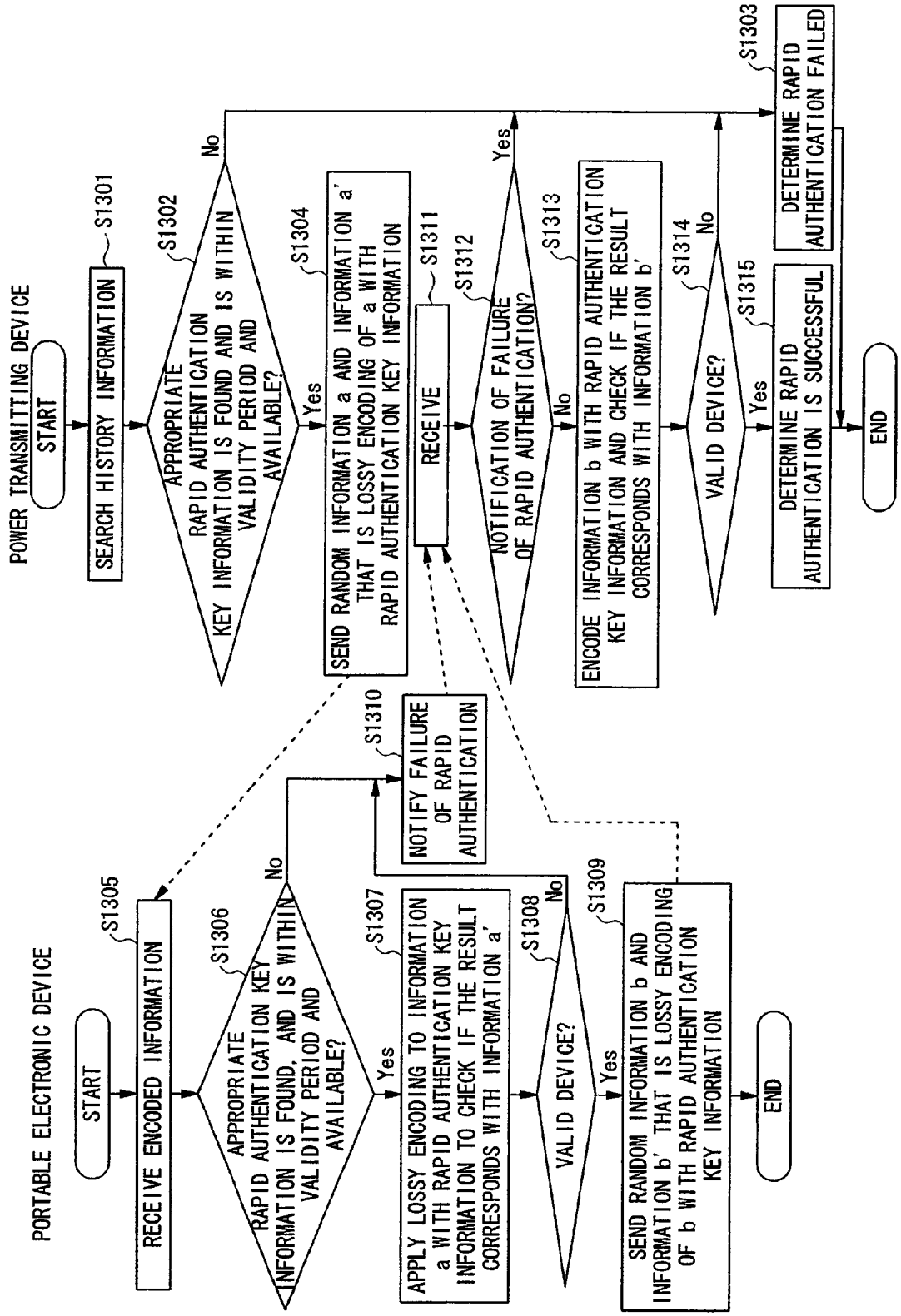
FIG. 32 is a diagram showing a processing flow of each device in the rapid authentication system.

FIG. 31 is a diagram showing the flow of distributing rapid authentication key information, and FIG. 32 illustrates the process flow of devices of a rapid authentication system.

Referring to FIG. 31, the flow of distributing rapid authentication key information will be described. In the figure, if proxy authentication has been successful, the power transmitting device sends transaction identification information as well as a request for rapid authentication key information to the authentication/billing proxy device (step S1201). Upon receiving them, the authentication/billing proxy device matches them against authentication record, issues rapid authentication key information (i.e., a common key) and notifies the same to the power transmitting device (step S1202). When it receives the notification, the power transmitting device saves the rapid authentication key information and transfers the notification to the portable electronic device (step S1203). The portable electronic device saves the rapid authentication key information (step S1204).

An example of rapid authentication on the portable electronic device and the power transmitting device is shown in FIG. 32. Initially, the power transmitting device searches history information (step S1301). If there is appropriate rapid authentication key information and it is within a validity period and available, the power transmitting device sends random information a and information a' that is lossy encoding of information a with rapid authentication key information to the portable electronic device (step S1302→S1304). Otherwise, it is determined that rapid authentication has failed (step S1302→S1303).

Upon receiving the encoded information (step S1305), if there is corresponding rapid authentication key information and it is within validity period and available, the portable electronic device applies lossy encoding to information a with the rapid authentication key information and checks whether the resulting information corresponds with information a' (step S1306→S1307). Otherwise, it notifies failure of authentication to the power transmitting device (step S1306→S1310).

If the check shows that the power transmitting device is valid, the portable electronic device sends random information b and information b' that is lossy encoding of information b with rapid authentication key information to the power transmitting device (step S1308→S1309). If the power transmitting device is not valid, the portable electronic device notifies the power transmitting device that rapid authentication failed (step S1308→S1310).

The power transmitting device receives the notification from the portable electronic device (step S1311). If the notification indicates failure of rapid authentication, it determines that rapid authentication has failed (step S1312→S1303). Otherwise, the power transmitting device applies lossy encoding to information b with rapid authentication key information and checks if the result corresponds with information b' (step S1312→S1313). If the check shows that the portable electronic device is valid, it is determined that rapid authentication has been successful (step S1314→S1315). If the portable electronic device is determined not to be valid, it is determined that rapid authentication has failed (step S1314→S1303).

With operations of the devices thus described with FIGS. 31 and 32, such operations can be realized in the rapid authentication system as follows.

First, if authentication terminates successfully, the authentication/billing proxy device issues information called rapid authentication key information by utilizing time during charging and distributes it to the portable electronic device and the power transmitting device (see FIG. 31).

Rapid authentication key information ensures that devices with rapid authentication key information have been authenticated by the authentication/billing proxy device within a certain period. It is issued by the authentication/billing proxy device, however, the portable electronic device and the power transmitting device can control use of the key information.

A public key and a secret key of Public Key Infrastructure (PKI) method can be individually distributed to a portable electronic device and a power transmitting device in any order as rapid authentication key information, and a common key can also be shared by a portable electronic device and a power transmitting device.

Rapid authentication key information assumes a value that varies each time it is issued and has a validity period, capable of restricting portable electronic devices, users, power transmitting devices, and power suppliers that can use the information.

Rapid authentication key information issued by the authentication/billing proxy device is distributed to the power transmitting device and the portable electronic device, and at this point, the path between the power transmitting device and the authentication/billing proxy device need to be encrypted. When separate rapid authentication key information is distributed to the portable electronic device and the power transmitting device such as in PKI method, the path between the portable electronic device and the authentication/billing proxy device also need to be encrypted.

In the second and subsequent authentication, rapid authentication key information is employed. Here, authentication is made by the portable electronic device and the power transmitting device confirming that the other entity has required rapid authentication key information, without communicating rapid authentication key information itself. For example, in a method using PKI as rapid authentication key information, both parties confirm that they have pieces of rapid authentication key information that forms a pair, and in a method using common key, they confirm that they have the identical key. The following description will refer to a common-key method.

The power transmitting device searches authentication history information it maintains for rapid authentication key information that corresponds to the portable electronic device of interest. If the rapid authentication key information exists, is within its validity period, and can be used with security settings of the electrical power supplier's policy, the power transmitting device generates random information a, and applies lossy encoding to information a with rapid authentication key information by means of a predetermined algorithm to generate encoded information a'. And it sends information a and encoded information a' to the portable electronic device. Otherwise, it determines that rapid authentication has failed and thus terminates rapid authentication, entering normal authentication.

After it confirms that received information is encoded information from the power transmitting device, the portable electronic device searches authentication history information it maintains for rapid authentication key information corresponding to the power transmitting device of interest. If the rapid authentication key information exists, is within its validity period, and is useable with security settings of the user's policy, the portable electronic device proceeds to confirmation of the encoded information. Otherwise, it informs the power transmitting device that rapid authentication has failed, and rapid authentication is terminated on the power transmitting device and normal authentication is started.

Confirmation of encoded information uses rapid authentication key information. The portable electronic device applies lossy encoding to received information a with rapid authentication key information using a known algorithm and checks whether the result corresponds with received encoded information a'. If it corresponds, the other device can be determined to be a valid device having required rapid authentication key information.

If the device is valid, the portable electronic device generates random information b and applies lossy encoding to it with rapid authentication key information using a predetermined algorithm to generate encoded information b'. And it sends information b and encoded information b' to the power transmitting device. Otherwise, it notifies failure of authentication to the power transmitting device, in which rapid authentication is terminated and normal authentication is started.

When the power transmitting device receives encoded information, it determines validity of the portable electronic device by means of rapid authentication key information as in determination on the portable electronic device. If it confirms that the portable electronic device is valid, it determines that rapid authentication is successful and terminates rapid authentication. Otherwise, it determines that rapid authentication has failed and terminates rapid authentication, starting normal authentication.

If rapid authentication is successful, the power transmitting device arbitrarily notifies the success to the authentication/billing proxy device at the time of charging or billing. The authentication/billing proxy device can arbitrarily extend the validity period or issue new rapid authentication key information, and can inform the information to the power transmitting device and the portable electronic device.

With such operation, the power transmitting device can carry out authentication rapidly without requesting the authentication/billing proxy device to authenticate.

Third Embodiment

Charging Between Portable Electronic Devices

If a portable electronic device keeps a function corresponding to the abovementioned power transmitting device (such as a power transmitting function), the portable electronic device can be an electrical power supplier. That is, a portable electronic device can transmit power to charge the other portable electronic device.

When charging is executed between portable electronic devices, the same processing as that described with reference to FIG. 9 to FIG. 32 is executed. In such cases, a portable electronic device functions as a power transmitting device in the figures. When either of the portable electronic devices works as an authentication/billing proxy device or makes a payment with electronic money, however, that device may be restricted. For example, such a portable electronic device needs to be able to communicate with an authentication/billing proxy device and also needs to be registered previously as a power transmitting device. Such a portable electronic device may also need to be registered previously to make a payment with electronic money.

Fourth Embodiment

Advertisement Model

An electrical power supplier can use an electrical charging occasion as advertising means in return for supplying a user with electrical power for free or for a little amount of money instead of billing for the power.

For example, if a fee setting of an electrical power supplier side policy is set as "free of charge if advertisement is attached", and if a fee setting of a user's policy is set as "charge the device if the charging is free of charge with advertisement attached", the user can electrically charge the device in return for receiving the advertisement.

Distribution of advertisement is executed in electrical charging or the like. The portable electronic device has a function of receiving and saving the advertisement and a function to enable a user to view and use the advertisement, and displays the advertisement for a certain period of time. If required, the portable electronic device can work with a Web browser or the other external functions.

An example will be described with reference to FIG. 33. The electrical charging system shown in the figure is the configuration of FIG. 1 with an advertisement distribution administrating device 4 added. In the electrical charging system, the advertisement distribution administrating device 4 of the advertisement distribution administrator distributes advertisement to the power transmitting device 1 of the electrical power supplier, and the portable electronic device 2 of the user is charged by the power transmitting device 1, while the power transmitting device 1 distributes advertisements and regularly or irregularly notifies the advertisement distribution administrating device 4 of an advertisement distribution state including the number of distributing occasions of advertisements, date and time of distributing advertisements and a period of distributing advertisements.

(Advertisement Distribution Administrating Device)

The advertisement distribution administrating device 4 consists of an advertisement billing module 41 for billing, an advertisement distribution module 42 for executing distribution of advertisements, and an advertisement administrating module 43 for receiving notification of an advertisement distribution state.

The advertisement distribution administrating device 4 obtains and stores advertisement information for distributing an advertisement to a portable electronic device from the advertisement provider. It also distributes the advertisement information to the power transmitting device.

It can receive information on an advertisement distribution state including the number of distributing occasions of advertisements, a period of distribution, attribute information of the portable electronic device to which an advertisement is distributed (manufacturer, model, telecommunications carrier), and date and time of distribution from the power transmitting device by using the advertisement administrating module 43.

Information on an advertisement distribution state is used by an advertisement provider and an advertisement distribution administrator, and the advertisement distribution fee can be set according to the advertisement distribution state. An administration distribution fee is set by an advertisement provider and an advertisement distribution administrator.

The advertisement provider prepares advertisement information (URL, image information or the like) and passes the information to the advertisement distribution administrator. The advertisement provider pays an advertisement distribution fee to the advertisement distribution administrator according to advertisement distribution details/state.

An advertisement provider, an advertisement distribution administrator and an electrical power provider need not to be the same. If they are the same, the advertisement billing module is eliminated.

(Power Transmitting Device, Portable Electronic Device)

The power transmitting device 1 consists of a non-contact processing module 13 such as a FeliCa (registered trademark) reader, anon-contact power transmitting module 12, and a power transmission control module 11.

The portable electronic device 2 consists of a non-contact processing module 23 for non-contact processing operation of FeliCa (registered trademark) or the like, anon-contact power receiving module 22 to charge power, a power receiving control module 21 to determine and control charging, and a bulk electricity storing module 20 which can rapidly charge.

Figure 33:
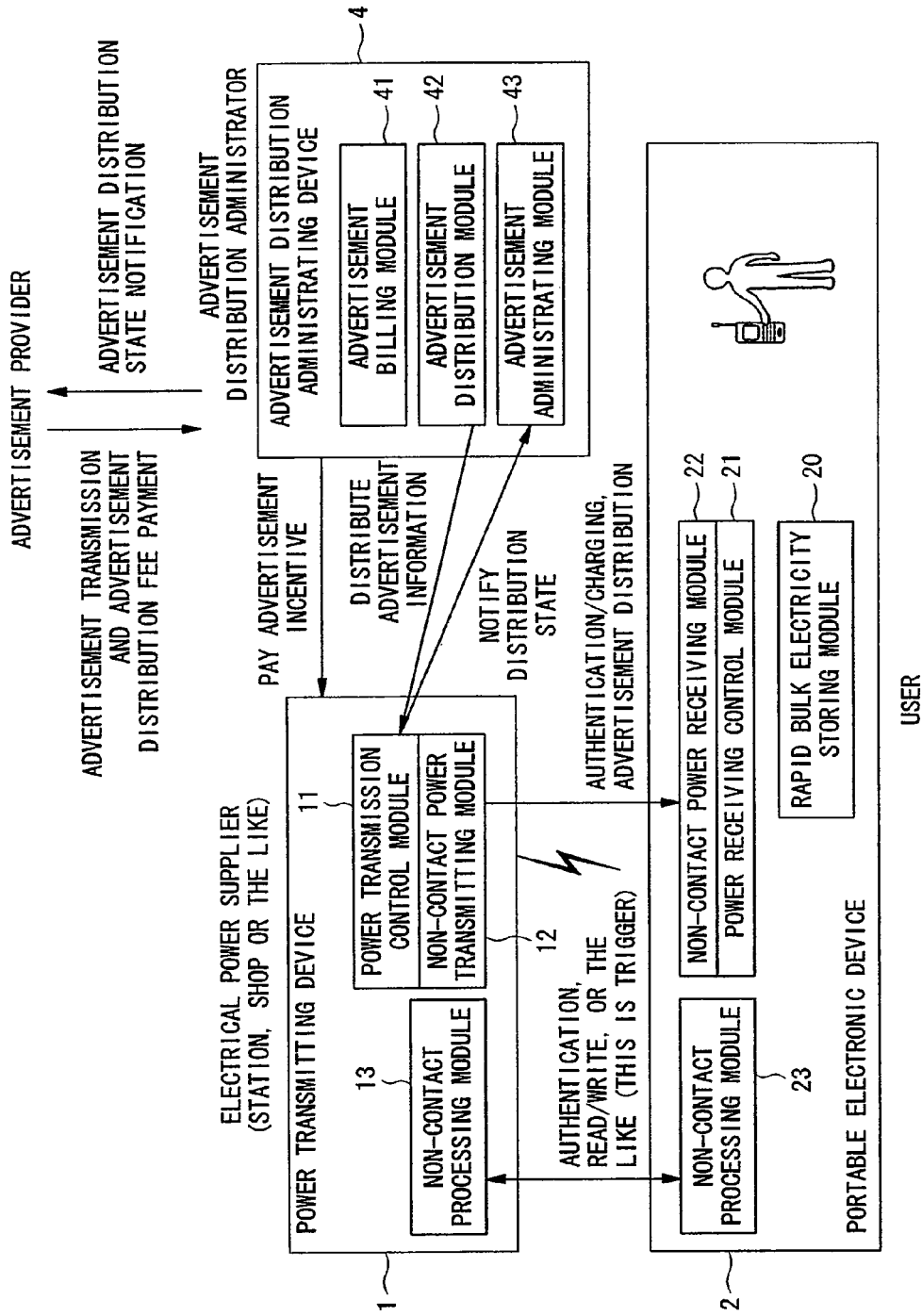
FIG. 33 is a block diagram showing an exemplary configuration of an electrical charging system with an advertisement distribution administrating device added.
Figure 34:
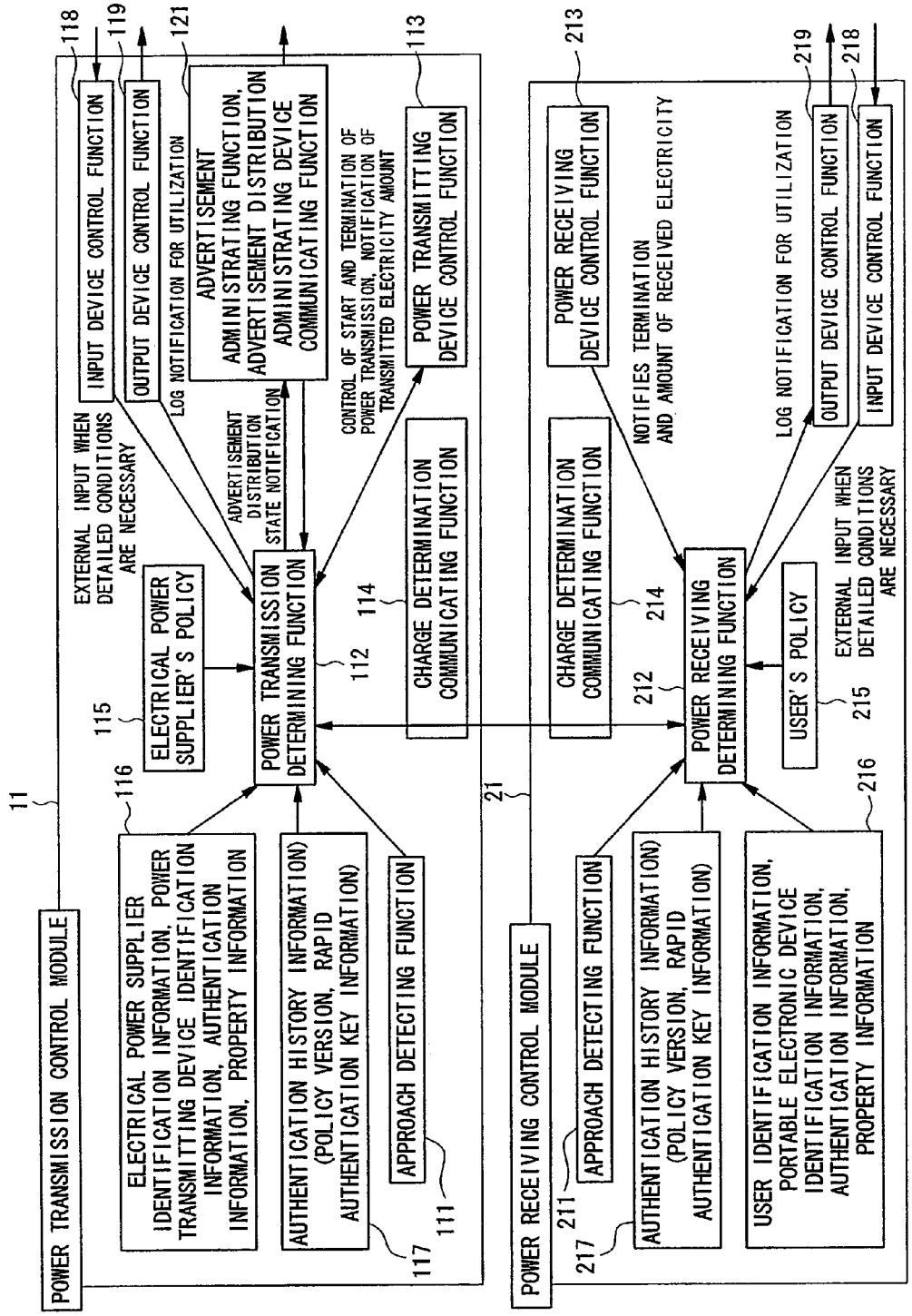
FIG. 34 is a block diagram showing each component of the power transmission control module in the power transmitting device and the power receiving control module in the portable electronic device of FIG. 33.

FIG. 34 is a block diagram showing each component of the power transmission control module 11 in the power transmitting device 1 and the power receiving control module 21 in the portable electronic device 2 of FIG. 33. By referring to the figure, configuration of the power receiving control module 21 and the power transmission control module 11 is almost the same as that in the second embodiment. The power transmission control module 11 is provided with an advertisement administrating function and an advertisement distribution administrating device communicating function 121. As a user is not billed for charging in the embodiment, a function regarding to billing a user is not provided for the device, unlike a case of the second embodiment.

The advertisement administrating function and an advertisement distribution administration communicating function 121 can store advertisement information to be distributed to a portable electronic device, and can distribute advertisement to a portable electronic device corresponding to a policy which enables to receive advertisement. The function 121 can store information on a distribution state of administration including date and time, the number and a period of distributing advertisement to a portable electronic device, and send them to the advertisement distribution administrating device. That enables the advertisement distribution administrating device to receive information on an administration distribution state including the number of distributing advertisements, attribute information of the portable electronic device to which advertisement is distributed, date and time of distribution from the power transmitting device.

(Charging Flow)

Figure 35:
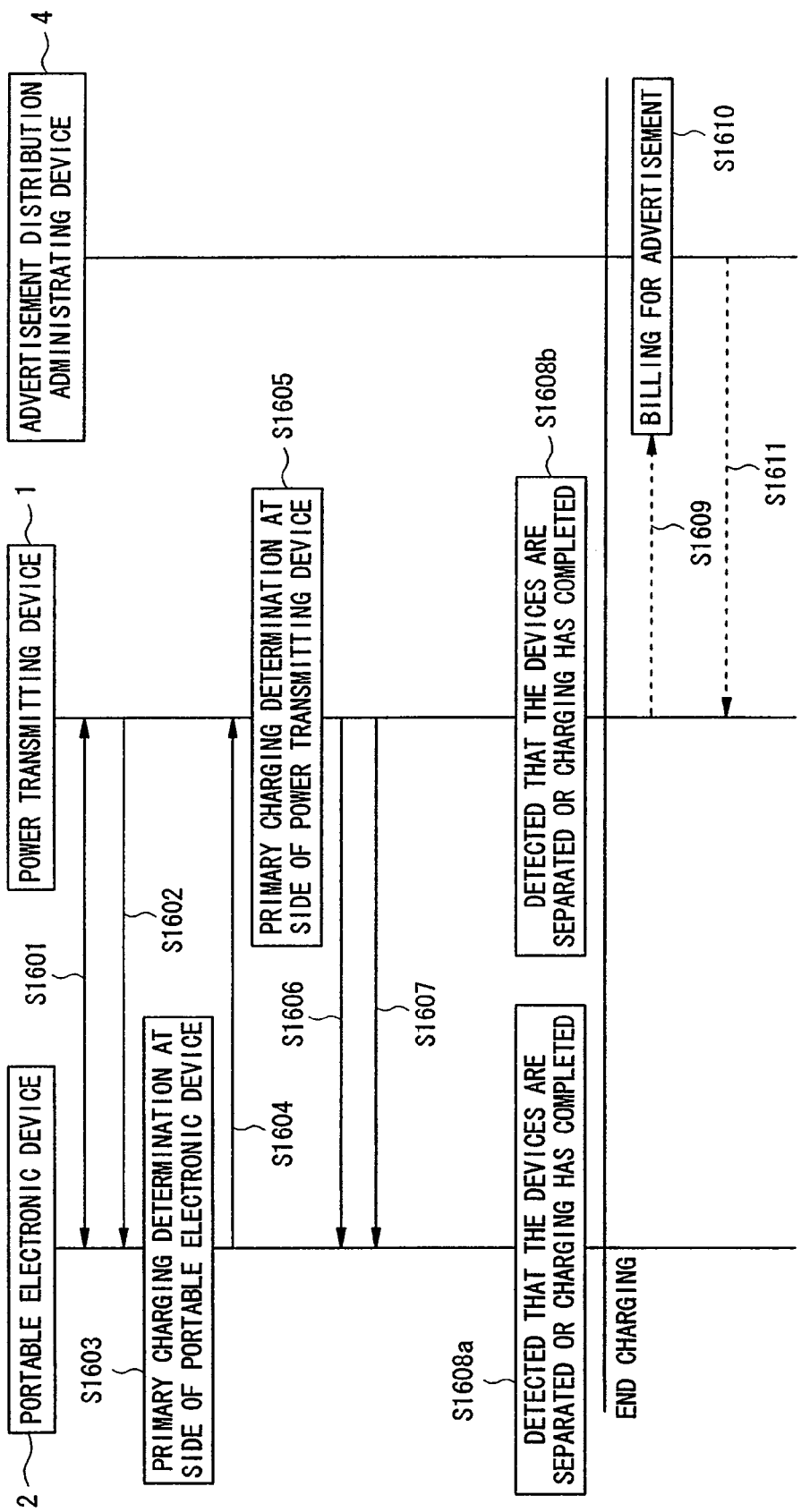
FIG. 35 is a sequence diagram showing processing in the electrical charging system of FIG. 33.
Figure 36:
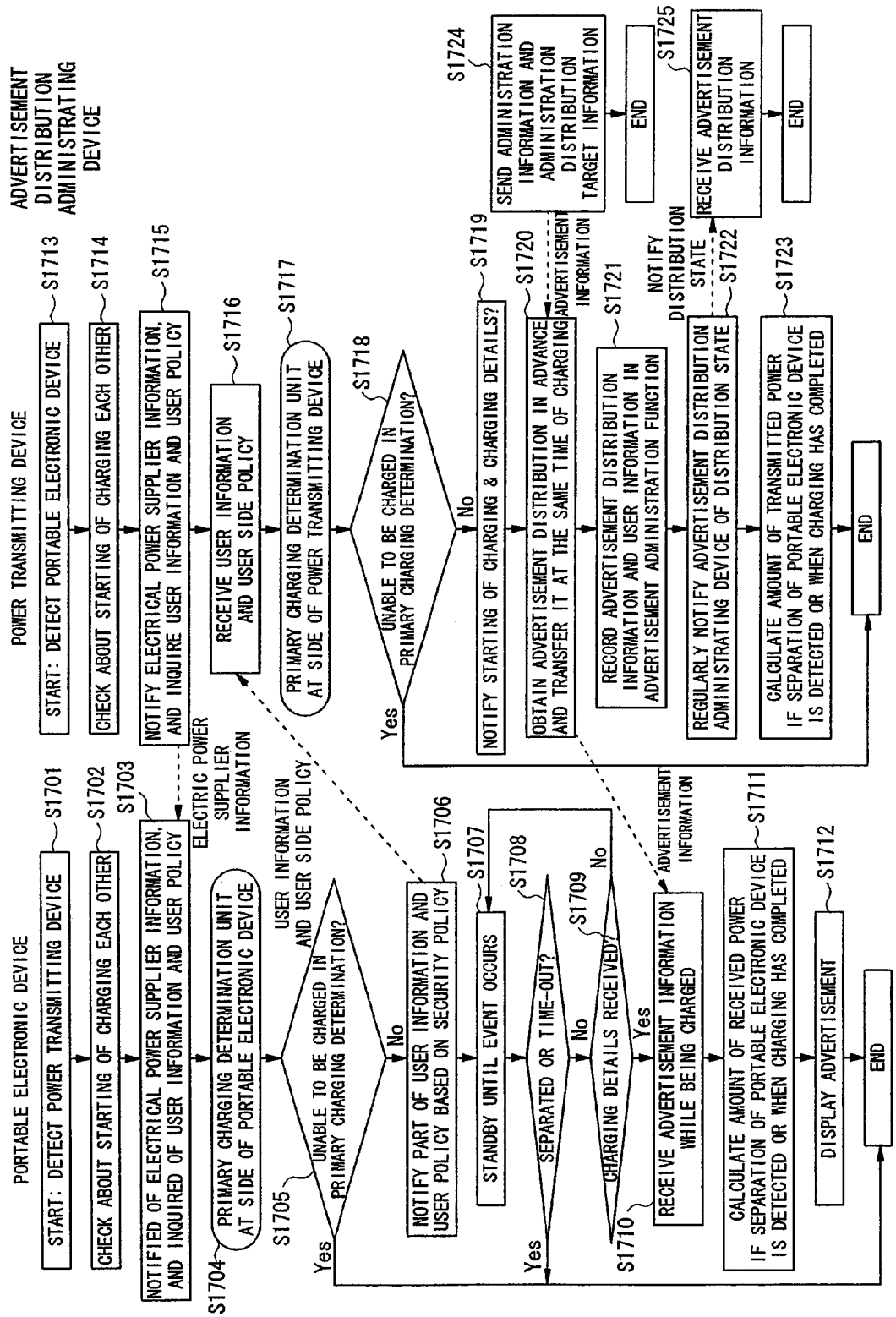
FIG. 36 is a flowchart showing processing of each device in the electrical charging system of FIG. 33.

FIG. 35 is a sequence diagram showing processing in the electrical charging system. FIG. 36 is a flowchart showing processing of each device in the electrical charging system.

First, in FIG. 35, when a power transmitting device 1 and a portable electronic device 2 detect each other, they check start of charging (step S1601). If charging is executed, the power transmitting device 1 sends an inquiry of electrical power provider information and a user's policy to the portable electronic device 2 (step S1602).

Then, the portable electronic device 2 executes the primary charging determination at the side of the portable electronic device (step S1603). Next, the portable electronic device 2 notifies the power transmitting device 1 of user information and user's policy (step S1604).

The power transmitting device 1 received the notification at step S1604 executes the primary charging determination at the side of the power transmitting device (step S1605). Then, the power transmitting device 1 notifies the portable electronic device 2 of charging details and the charging starts (step S1606). Advertisement distribution is executed (step S1607).

The charging from the power transmitting device 1 to the portable electronic device 2 ends when it is detected that the devices are separated from each other or when the charging has completed (step S1608a, S1608b).

When the charging ends, the power transmitting device 1 regularly notifies the advertisement distribution device 4 of advertisement distribution information (step S1609). Then, billing is executed for the advertisement (step S1610) And an advertisement incentive is regularly paid (step S1611).

In FIG. 36, processing at the side of the portable electronic device starts when the power transmitting device is detected (step S1701). First, the portable electronic device 2 checks the start of the charging with the power transmitting device (step S1701). Then, the portable electronic device is notified of electrical power supplier information from an electrical power supplier device and receives an inquiry for user information and a user policy (step S1703). Next, the portable electronic device 2 transfers to determination processing of the primary charging determination unit at the side of the portable electronic device (step S1704).

Unless it is determined as unable to be charged by the primary charging determination, the portable electronic device 2 notifies of a part of user information and a user policy based on a security setting (step S1705→S1706). Then, the portable electronic device 2 stays in a standby state until an event occurs (step S1707).

Here, determination is made whether the devices are separated from each other or whether a predetermined time has passed and time-out occurs or not (step S1708). If it is determined as unable to be charged at step S1705, the processing also ends.

When the portable electronic device 2 receives the charging details, it transfers to the charging and receives advertisement information (step S1709→S710). When the portable electronic device detects that it is separated from the power transmitting device or when the charging has completed, the portable electronic device calculates the amount of received power (step S1711). Then, it displays the received advertisement on a screen and the processing ends (step S1712).

On the other hand, processing at the side of the power transmitting device starts, if the power transmitting device detects a portable electronic device (step S1713). First, the power transmitting device checks start of the charging with the portable electronic device (step S1714). Then, it notifies the portable electronic device of electrical power supplier information and inquires of user information and a user policy (step S1715). Next, it receives the user information and the user policy from the portable electronic device (step S1716). And it transfers to determination of the primary charging determination unit at the side of the power transmitting device (step S1717).

The power transmitting device determines whether it is determined as unable to be charged by the primary charging determination or not (step S1718), and if it is determined as unable to be charged, the processing ends there as it is. On the other hand, if it is not determined as unable to be charged, the abovementioned charging details are notified to the portable electronic device together with a message of starting the charging (step S1718→S1719).

Advertisement information and advertisement distribution information are sent from the advertisement distribution administrating device to the power transmitting device (step S1724), and the power transmitting device received the information transfers the information to the portable electronic device at the time of the charging (step S1720). The power transmitting device registers advertisement distribution information and user information by the advertisement administrating function (step S1721).

The power transmitting device regularly notifies the advertisement distribution administrating device of a distribution state (step S1722). The advertisement distribution administrating device receives the notification (step S1725).

When the power transmitting device detects that it is separated from the power transmitting device or when the charging has completed, it calculates the amount of transmitted power (step S1723) and the processing ends.

(Operation of Advertisement Billing System)

Figure 37:
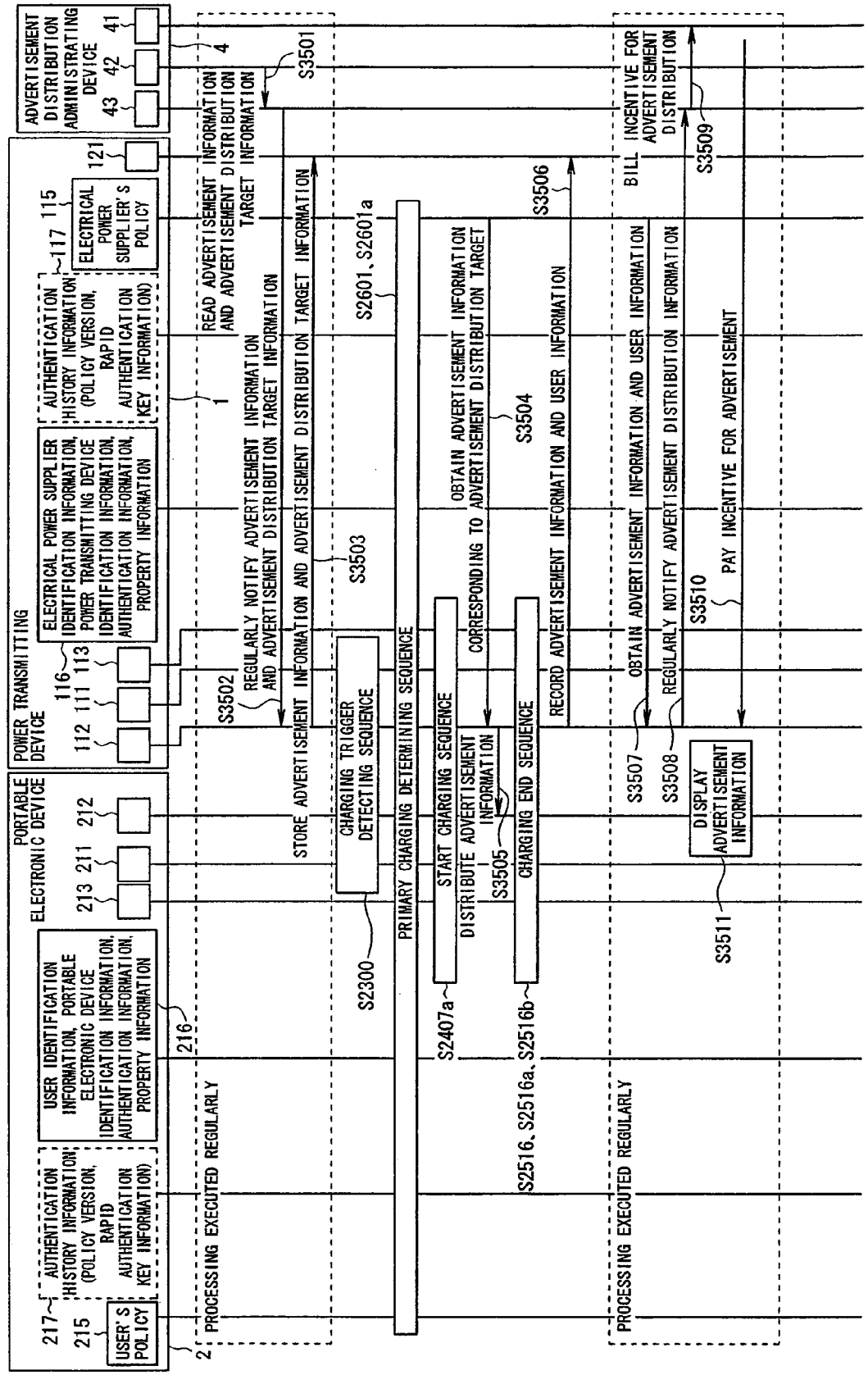
FIG. 37 is a sequence diagram showing operation of the electrical charging system of the fourth embodiment.

Next, operation of the electrical charging system of the abovementioned configuration will be described with reference to FIG. 37. The figure shows operation of each of the approach detecting function 111, the power transmission determining function 112, the power transmitting device control function 113, and the advertisement administrating function 121 in the power transmitting device 1, operation of each of the approach detecting function 211, the power receiving determining function 212, and the power receiving device control function 213 in the portable electronic device 2, and operation of each of the advertisement/billing module 41, the advertisement distribution module 42, and the advertisement administrating module 43 in the administration distribution device 4.

The advertisement administrating module 43 reads advertisement information and advertisement distribution target information from the advertisement distribution module 42 (S3501). Next, the advertisement administrating module 43 regularly notifies the power transmission determining function 112 of the advertisement information and the advertisement distribution target information (S3502). The power transmission determining function 112 regularly received the advertisement information and the advertisement distribution target information stores these information in the advertisement administrating function 121 (S3503). The processing is regularly executed independent from a series of charging operation.

Next, after the abovementioned sequence of detecting trigger to start the charging (any one piece of processing in FIG. 4 to FIG. 6) is executed (S2300), a primary charging determining sequence (S2601, S2601a) described with reference to FIG. 21 or FIG. 24 is executed. Further, it is transferred to the same sequence of starting the charging as in that shown in FIG. 21 (S2704a).

When the power transmission determining function 112 obtains advertisement information corresponding to the advertisement distribution target from the advertisement administrating function 121 (S3504), it creates advertisement information for distribution by matching the obtained advertisement information with advertisement information previously stored in the advertisement administrating function 121, and distributes the created advertisement information to the power receiving determining function 212 (S3505). Then, it transfers to the abovementioned charging end sequence shown in FIG. 7 or FIG. 8 (S2516). The power transmission determining function 112 records the advertisement distribution information and user information into the advertisement administrating function 121 (S3506).

When the power transmission determining function 112 obtains the advertisement distribution information and the user information from the advertisement administrating function 121 (S3507), it regularly notifies the advertisement administrating module 43 of the advertisement distribution information (S3508). The advertisement administrating module 43 that received the notification bills incentive to the advertisement distributor (S3509). The power transmission determining function 112 receives a notice of payment of the incentive for the advertisement from the advertisement billing module 41 (S3510). The power receiving determining function 212 displays the received advertisement information at any timing (S3511). The processing is regularly executed independently from a series of charging operation.

Summary of Fourth Embodiment

Processing which can be realized in the system with processing of each device described with reference to FIG. 33 to FIG. 37 will be shown below.

First, in the system, a user's policy of a portable electronic device is set to grant electrical charging attached with advertisement, and set an electrical power supplier side policy of a power transmitting device executes electrical charging attached with advertisement (i.e., free of charge for the user).

The advertisement information is stored in the advertisement distribution administrating device and distributed to the power transmitting device regularly, or if required.

When the portable electronic device notifies of a user's policy and make the primary charging determination executed in the power transmitting device, and if it is determined as able to be charged attached with advertisement, the power transmitting device starts charging (step S1604, S1605, S1606 in FIG. 35).

The power transmitting device distributes the advertisement information during the charging. Advertisement information includes an URL which is linked to an advertisement page and an advertisement image file. They can use non-contact processing such as FeliCa (registered trademark), a communication network of the telecommunication carrier, and the other communication appliances other than the charge determination communicating function.

After charging ends, the advertisement distribution information is notified from the power transmitting device to the advertisement distribution administrating device. Although the advertisement distribution information is obtained each time an advertisement is distributed by the power transmitting device, it can be stored in the power transmitting device for a certain period of time and be notified to the advertisement distribution administrating device or it can be sent each time an advertisement is distributed.

The advertisement billing module of the advertisement distribution administrating device regularly or irregularly can collect advertisement distribution fee from the advertisement provider and pay an advertisement incentive to the electrical power supplier according to the advertisement distribution state.

The abovementioned processing enables the portable electronic device to execute charging for free of charge, and the advertisement provider to distribute an advertisement to the portable electronic device if it pays advertisement distribution fee. The electrical power supplier can obtain commission to cooperate in distributing the advertisement as advertisement incentive.

Although the embodiment is a model of an advertisement for supplying electrical power for free of charge, the fee is not limited to be free, and the other models can be considered such as one for setting low charging fee setting if an advertisement is provided, compared with a fee setting in the case of no advertisement attached.

Fifth Embodiment

Fifth Embodiment: Fixed Rate Model

A model will be described for providing a service with a fixed fee (including free of charge) instead of a charging fee setting, a privileged fee setting, a time changing fee setting, or the like.

If a user previously applies to a fixed fee charging service, the authentication/billing proxy device records that the user uses the service in a fixed fee system. The user sets as a fixed fee in a fee setting of the user's policy. If the user does not set as a fixed fee, the authentication/billing proxy device determines as such, the setting will be a fixed fee billing. That is, billing is executed according to the setting of paying a certain amount of money without regard of the amount of charging. The charging can be executed according to the setting regarding to the number of charging or the charging time or any combination thereof.

In the description of the model, almost all of FIG. 9 to FIG. 32 that is referenced in the abovementioned embodiment 2 can be used.

(Charging Flow)

Only difference between the processing flow of the system and that of the second embodiment will be described. Here, FIG. 12 that is referenced in the description of the second embodiment will be used in the description.

At step S704 in FIG. 12, if the power transmitting device 1 recognizes that it is under a fixed fee system from the fee setting by the primary charging determination after a user's policy is notified from the portable electronic device 2 to the power transmitting device 1, the power transmitting device 1 executes authentication for authentication/billing proxy device 3 at the secondary charging determination or executes rapid authentication. Payment by electric money is not made here.

After charging ends, the power transmitting device 1 notifies the authentication/billing proxy device 3 of the amount of charging (step S716 of FIG. 12).

The authentication/billing proxy device 3 regularly collects a fixed fee from a user (step S720 of FIG. 12), and pays the amount of electricity to the electrical power supplier based on the amount of transmitted power from the power transmitting device 1 for the period (step S719 of FIG. 12).

With the processing above, a user of the portable electronic device can electrically charge the device at a fixed fee without worrying about a charging fee.

(Summary)

The abovementioned first electrical charging system enables a user to charge a power source of a portable electronic device without being attentive to charging by realizing the charging in non-contact processing operation for the purpose other than charging.

The abovementioned second electrical charging system enables electrical charging without obtaining explicit grant for charging at a user side and an electrical power supplier side by matching a charging policy at the user side included in the portable electronic device and a power transmitting policy at the electrical power supplier side included in the power transmitting device.

Further, the abovementioned third electrical charging system can reserve much more charging time by providing functions and procedures of comparing policy versions and shortening a time for notification or matching of the policies after the first time.

The abovementioned fourth electrical charging system can reserve much more charging time by enabling charging prior to the start of the secondary charging determination after the success of the primary charging determination.

Further, the abovementioned fifth electrical charging system can reserve much more charging time by providing functions and procedures of speeding up proxy authentication by using rapid authentication key information, and shortening an authentication time.

(Method of Transmitting Power)

In the power transmitting device of the electrical charging system, a power transmitting method below is realized. That is, a power transmitting method for charging the abovementioned power source in non-contact processing for the purpose other than charging including a detecting step of detecting an approach of the power receiving device with a chargeable power source, and a charging control step of transmitting power for charging the abovementioned power source in response to detecting the approach of the abovementioned power receiving device at the abovementioned detecting step is realized.

In this manner, charging of the power receiving can be realized while in non-contact processing operation for the purpose other than charging such as authentication or making a payment. By using a non-contact power transmitting technique and a high-speed bulk electricity storage technique, charging can be rapidly executed bit by bit in a short time of non-contact processing operation about one to three seconds. That can reduce a load to a user to be attentive to charging the device.

(Method for Receiving Power)

In the portable electronic device of the abovementioned electrical charging system, a power receiving method as below is realized. That is, a power receiving method for charging a chargeable power source, including a detecting step of detecting an approach to a power transmitting device, and a charging step of receiving power transmitted from the power transmitting device detected at the abovementioned detecting step and charging the abovementioned power source, wherein the abovementioned power source is charged in non-contact processing for the purpose other than charging is realized.

In this manner, a power receiving device can be charged in non-contact processing operation for the purpose other than charging such as authentication and making payment. By using a non-contact power transmitting technique and a high-speed bulk electricity storage technique, charging can be rapidly executed bit by bit in a short time of non-contact processing operation about one to three seconds. That can reduce a load to a user to be attentive to charging the device.
(Method for Charging)

In the abovementioned electrical charging system, an electrical charging method as below is realized. That is, electrical charging method for charging the abovementioned power source in non-contact processing for the purpose other than charging including a detecting step for detecting an approach of the power receiving device with a chargeable power source and a charging control step of transmitting power for charging the abovementioned power source in response to detecting the approach of the abovementioned power receiving device at the abovementioned detecting step, and a billing step of executing billing according to the amount of charging of the power source is realized.

In this manner, charging can be realized while in non-contact processing operation for the purpose other than charging such as authentication and making a payment. By using a non-contact power transmitting technique and a high-speed bulk electricity storage technique, charging can be rapidly executed bit by bit in a short time of non-contact processing operation about one to three seconds. That can reduce a load to a user to be attentive to charging.

INDUSTRIAL APPLICABILITY

The present invention can be used in charging a battery provided for a portable electronic device such as a cellular phone, a notebook PC, a PDS as a power source.

What is claimed is:

1. An electrical charging system comprising:
    a power transmitting device comprising:
        a detecting unit for detecting an approach of a portable electronic device with a chargeable power source, and determining whether or not the chargeable power source can be charged according to a predetermined power providing policy including at least one of a fee setting, a billing system setting, an electrical charging system setting, a charging determination setting, and a security setting; and
        a charging control unit for transmitting power for charging said power source, in response to the detecting unit detecting the approach of the portable electronic device, in a non-contact processing operation of at least one of an admission operation and a payment operation with the portable electronic device based on the predetermined power providing policy, and wherein the admission operation is an operation other than an authorization for transmitting the power; and
    an authentication/billing proxy device comprising:
        a billing unit for executing billing according to the amount of charging the chargeable power source of the portable electronic device.

2. The electrical charging system according to claim 1, further comprising:
    an authenticating unit for executing authentication by exchanging data with the portable electronic device having a chargeable power source for a user of the portable electronic device;
    wherein the authenticating unit issues authentication information to eliminate necessity of next authentication for a predetermined period after first authentication successfully ends, for rapid authentication by use of the authentication information.

3. An electrical charging method comprising:
    detecting an approach of a portable electronic device with a chargeable power source, according to a predetermined power providing policy including at least one of a fee setting, a billing system setting, an electrical charging system setting, a charging determination setting, and a security setting;
    transmitting power for charging said power source, in response to detecting the approach of said portable electronic device in the detecting, in a non-contact processing operation of at least one of an admission operation and a payment operation with the portable electronic device based on the predetermined power providing policy, and wherein the admission operation is an operation other than an authorization for transmitting the power; and
    executing billing according to the amount of charging of said power source of the portable electronic device.

4. An electrical charging system, comprising:
    a power transmitting device;
    a portable electronic device with a chargeable power source; and
    an authentication/billing proxy device for executing billing according to an amount of charging the chargeable power source of the portable electronic device;
    wherein the power transmitting device is configured to charge the power source in non-contact processing including a predetermined power providing policy including at least one of a fee setting, a billing system setting, an electrical charging system setting, a charging determination setting, and a security setting;
    wherein the power transmitting device is configured to charge the power source in a non-contact processing operation of at least one of an admission operation and a payment operation with the portable electronic device and processing including at least one of the predetermined power providing policy of the power transmitting device and a predetermined power receiving policy of the portable electronic device; and
    wherein the admission operation is an operation other than an authorization for the power transmitting device to charge the power source.

* * * * *